United States Patent
Kim et al.

(10) Patent No.: US 10,721,767 B2
(45) Date of Patent: Jul. 21, 2020

(54) METHOD AND APPARATUS FOR PERFORMING CONTENTION-BASED AND NON-CONTENTION-BASED BEAM FAILURE RECOVERY IN A WIRELESS COMMUNICATION SYSTEM

(71) Applicant: Samsung Electronics Co., Ltd., Suwon-si, Gyeonggi-do (KR)

(72) Inventors: Sangbum Kim, Suwon-si (KR); Soenghun Kim, Suwon-si (KR); Jaehyuk Jang, Suwon-si (KR); Seungri Jin, Suwon-si (KR); Donggun Kim, Suwon-si (KR); Alexander Sayenko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/245,082

(22) Filed: Jan. 10, 2019

(65) Prior Publication Data

US 2019/0215863 A1   Jul. 11, 2019

(30) Foreign Application Priority Data

Jan. 10, 2018   (KR) .................... 10-2018-0003521

(51) Int. Cl.
*H04L 5/00*       (2006.01)
*H04W 74/02*      (2009.01)
(Continued)

(52) U.S. Cl.
CPC ....... *H04W 74/02* (2013.01); *H04W 36/0027* (2013.01); *H04W 36/0044* (2013.01);
(Continued)

(58) Field of Classification Search
USPC ........................................................ 375/262
See application file for complete search history.

(56) References Cited

U.S. PATENT DOCUMENTS

2018/0124825 A1   5/2018 Lee et al.
2018/0270894 A1*  9/2018 Park ...................... H04W 76/27
(Continued)

FOREIGN PATENT DOCUMENTS

WO     2016163845 A1   10/2016

OTHER PUBLICATIONS

ISA/KR, "International Search Report," International Application No. PCT/KR2019/000413, dated Apr. 17, 2019, 3 pages.
(Continued)

*Primary Examiner* — Eva Y Puente

(57) ABSTRACT

The present disclosure relates to a communication technique for converging a 5G communication system, which is provided to support a higher data transmission rate beyond a 4G system with an IoT technology, and a system therefor. The disclosure may be applied to intelligent services (e.g., smart home, smart building, smart city, smart car or connected car, health care, digital education, retail business, security and safety related service, or the like) based on the 5G communication technology and the IoT related technology. The disclosure relates to a method for recovering a beam into a correct beam according to a position of a terminal using a non-contention-based and contention-based beam failure recovery method in order to recover a beam failure in which communication is disconnected due to movement of a terminal or the like in a wireless communication system performing beam-based communication services.

20 Claims, 48 Drawing Sheets

(51) Int. Cl.
*H04W 36/00* (2009.01)
*H04W 76/19* (2018.01)
*H04W 36/06* (2009.01)

(52) U.S. Cl.
CPC ....... *H04W 36/0077* (2013.01); *H04W 36/06* (2013.01); *H04W 76/19* (2018.02); *H04L 5/0048* (2013.01)

(56) References Cited

U.S. PATENT DOCUMENTS

| | | | |
|---|---|---|---|
| 2019/0200248 A1* | 6/2019 | Basu Mallick | H04B 7/0695 |
| 2019/0254082 A1* | 8/2019 | Takeda | H04W 52/367 |
| 2019/0280756 A1* | 9/2019 | Fan | H04W 74/0833 |

OTHER PUBLICATIONS

Fujitsu, "Discussion on beam failure recovery," R1-1719619, 3GPP TSG-RAN WG1 Meeting #91, Reno, Nevada, Nov. 27-Dec. 1, 2017, 5 pages.
Nokia et al., "Beam Recovery in NR," R1-1720891, 3GPP TSG-RAN WG1 Meeting #91, Reno, Nevada, Nov. 27-Dec. 1, 2017, 6 pages.
Nokia, et al., "Beam Recovery in NR," R2-1713412, Update of R2-1711450, 3GPP TSG-RAN WG2 Meeting #100, Reno, Nevada, Nov. 27-Dec. 1, 2017, 4 pages.
Qualcomm Incorporated, "Remaining Details on RACH Procedure," R1-1720653, 3GPP TSG-RAN WG1 Meeting #91, Reno, Nevada, Nov. 27-Dec. 2, 2017, 22 pages.

* cited by examiner

FIG. 3C
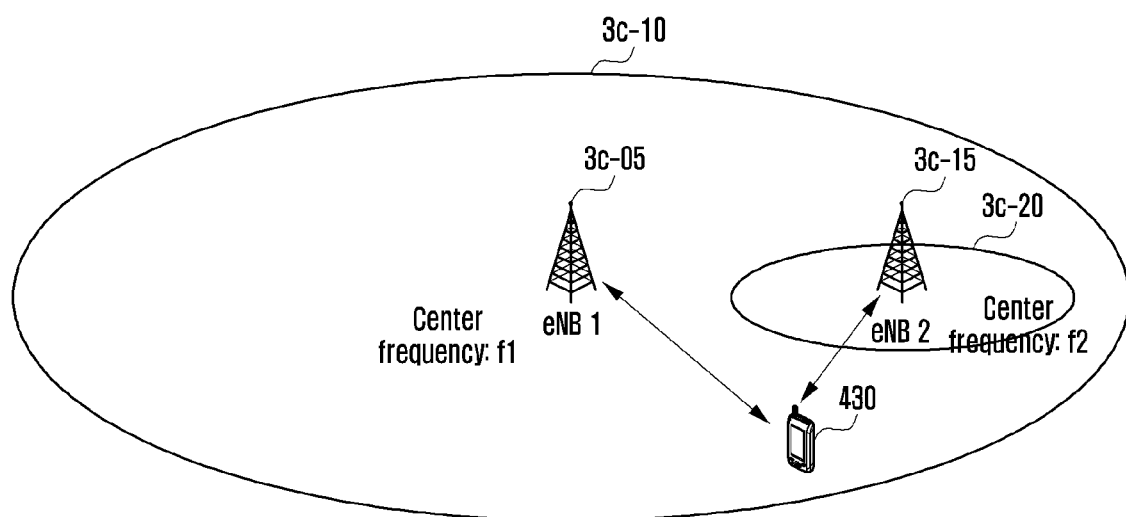
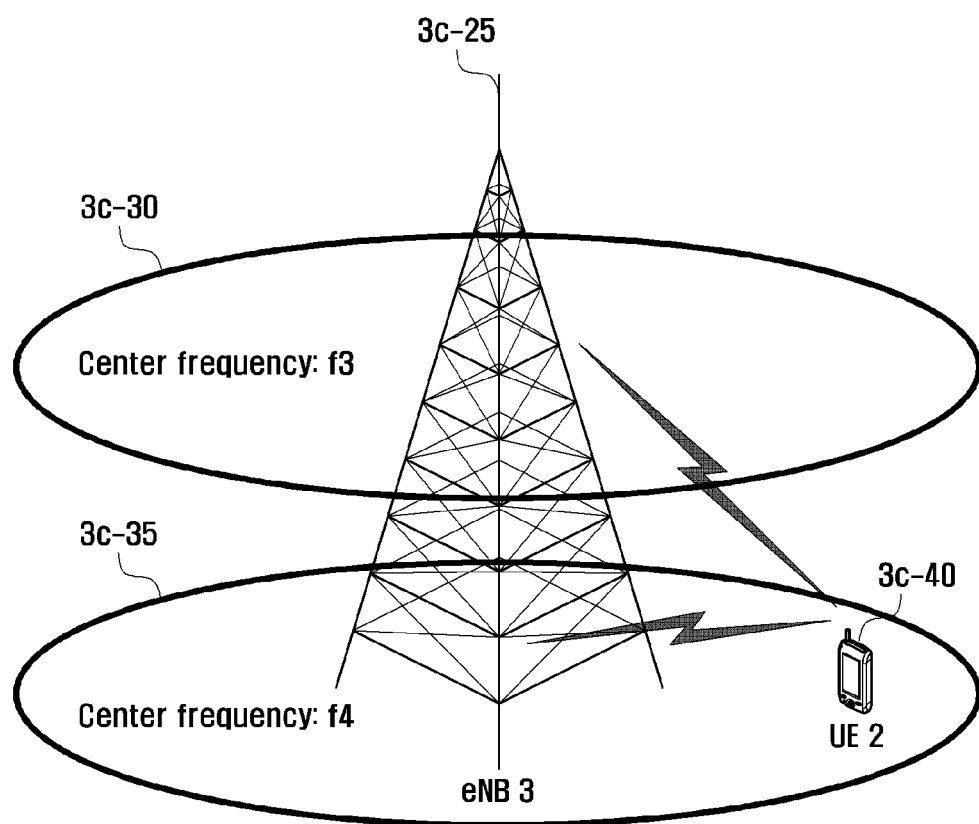

FIG. 4B
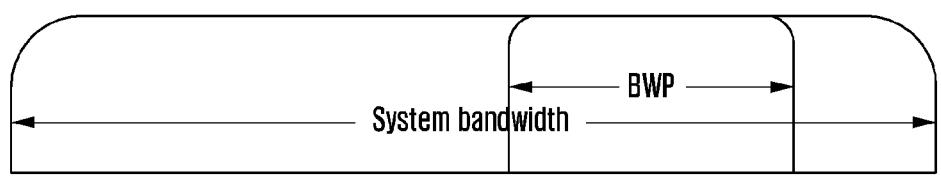
(a)
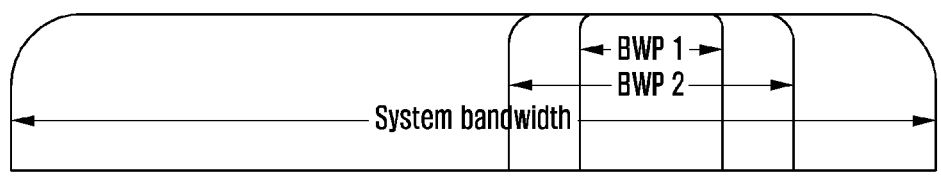
(b)
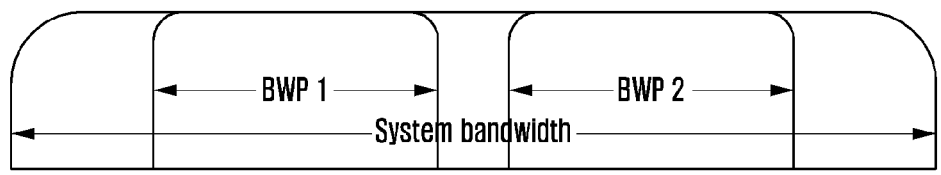
(c)

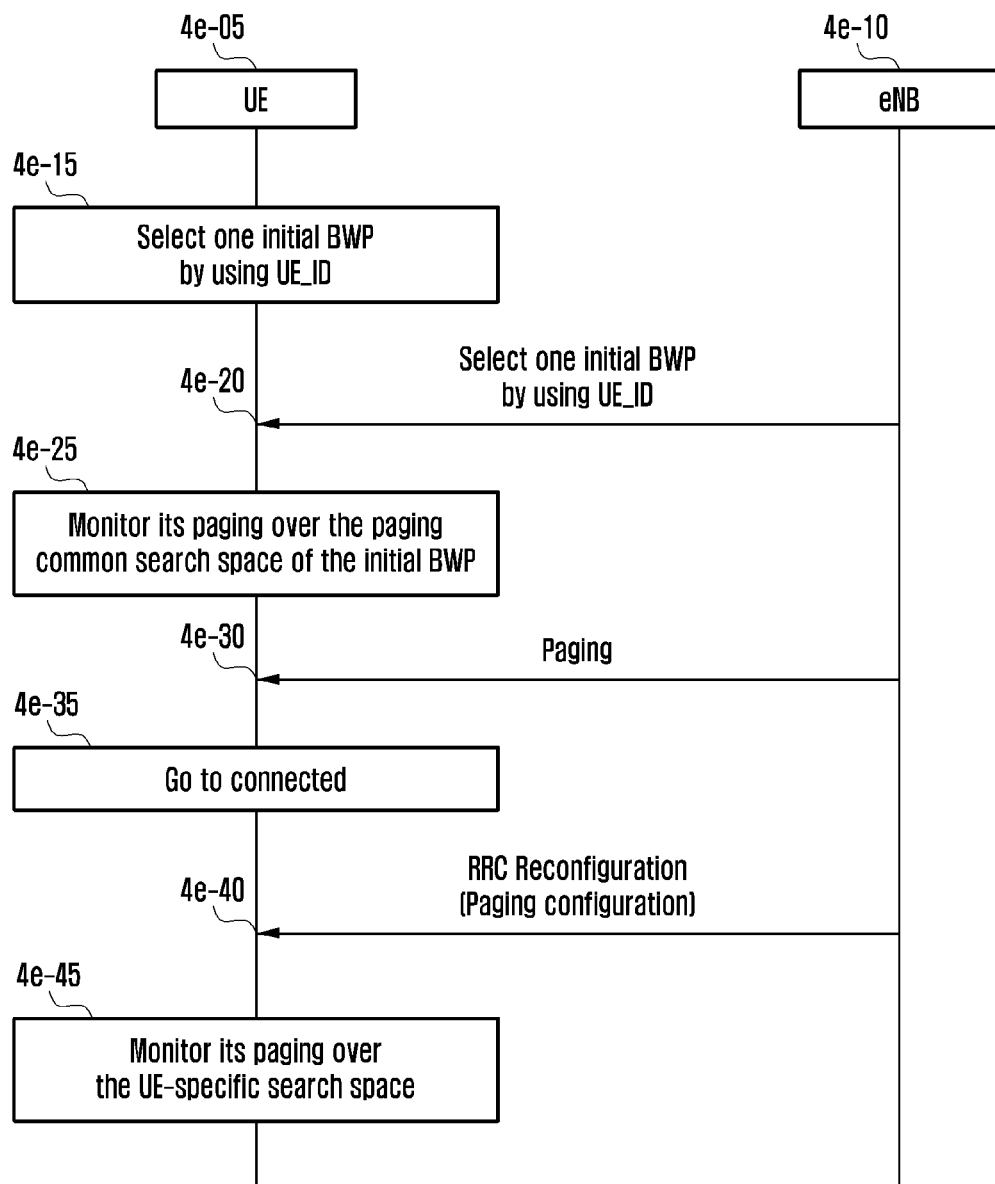

METHOD AND APPARATUS FOR PERFORMING CONTENTION-BASED AND NON-CONTENTION-BASED BEAM FAILURE RECOVERY IN A WIRELESS COMMUNICATION SYSTEM

CROSS-REFERENCE TO RELATED APPLICATION

This application is based on and claims priority under 35 U.S.C. § 119(a) of a Korean patent application number 10-2018-0003521, filed on Jan. 10, 2018, in the Korean Intellectual Property Office, the disclosure of each of which is incorporated by reference herein in its entirety.

BACKGROUND

1. Field

Various embodiments of the disclosure relate to a method and an apparatus for recovering a beam currently in use when the beam currently in use is unavailable (or fails) in a wireless communication system performing beam-based communication.

2. Description of Related Art

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system. To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive MIMO, full dimensional MIMO (FD-MIMO), array antenna, analog beam-forming, and large scale antenna technologies have been discussed. Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc., is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the machine to machine (M2M), and the machine type communication (MTC), have been implemented by techniques such as the beamforming, the MIMO, and the array antenna. The application of the cloud radio access network (cloud RAN) as the big data processing technology described above may also be considered as an example of the fusing of the 5G communication technology with the IoT technology.

On the other hand, in the wireless communication system, communication may be broken due to movement of a terminal while communicating using a beam, which is referred to as beam failure. Therefore, there is a need for a method for recovering a beam into a correct beam according to the position of the terminal.

SUMMARY

The disclosure is directed to provision of a method for recovering a beam currently in use when the beam currently in use is unavailable (or fails) in a wireless communication system performing beam-based communication.

The disclosure is directed to provision of an RRC message transmission method and procedure required to transmit and receive an RRC message in various cases of a terminal in an RRC inactive mode, which can reduce signaling overhead and save a battery of the terminal by proposing a method for switching a next generation mobile communication system between an RRC connected mode, the RRC inactive mode (or lighted connected mode), and an RRC idle connected mode.

The disclosure is directed to provision of a method for processing a priority bit rate when packet duplication is deactivated by clearly defining an operation of applying, by a terminal, the priority bit rate to a logical channel for the packet duplication when the terminal receives packet duplication activation or deactivation from a base station through MAC CE in association with packet-replicated data transmission newly introduced in a next generation mobile communication system, and focusing on a detailed operation in the MAC when receiving the packet duplication activation or deactivation.

The disclosure is directed to provision of a method for receiving, by a terminal, a paging message based on a method for configuring and changing BWP of partial bandwidth part applying technology performing communication using only some of system frequency bandwidths that one terminal in one cell uses, in a next generation mobile communication system.

In accordance with an aspect of the present disclosure, a method by a terminal in a wireless communication system comprises receiving, from a base station, a message including configuration information related to beam failure recovery (BFR), identifying whether the message includes contention-free random access (RA) resources for the BFR based on beam failure being detected, performing a contention-free RA procedure for the BFR based on the contention-free RA resources in case that the message includes the contention-free RA resources, performing a contention-based RA procedure for the BFR in case that the message does not include the contention-free RA resources, and maintaining the contention-free RA resources based on the contention-free RA procedure being completed.

In accordance with an aspect of the present disclosure, a method by a base station in a wireless communication system comprises transmitting, to a terminal, a message including configuration information related to beam failure recovery (BFR) and performing a random access (RA) procedure for the BFR with the terminal based on beam failure being detected by the terminal, wherein a contention-free RA procedure for the BFR is performed based on contention-free RA resources in case that the message includes the contention-free RA resources for the BFR, wherein a contention-based RA procedure for the BFR is performed in case that the message does not include the contention-free RA resources, and wherein the contention-free RA resources are maintained at the terminal based on the contention-free RA procedure being completed.

In accordance with an aspect of the present disclosure, a terminal in a wireless communication system comprises a transceiver configured to transmit and receive signals and a controller configured to receive, via the transceiver from a base station, a message including configuration information related to beam failure recovery (BFR), identify whether the message includes contention-free random access (RA) resources for the BFR based on beam failure being detected, perform a contention-free RA procedure for the BFR based on the contention-free RA resources in case that the message includes the contention-free RA resources, perform a contention-based RA procedure for the BFR in case that the message does not include the contention-free RA resources, and maintain the contention-free RA resources based on the contention-free RA procedure being completed.

In accordance with an aspect of the present disclosure, a base station in a wireless communication system comprises a transceiver configured to transmit and receive signals and a controller configured to transmit, via the transceiver to a terminal, a message including configuration information related to beam failure recovery (BFR), and perform a random access (RA) procedure for the BFR with the terminal based on beam failure being detected by the terminal, wherein a contention-free RA procedure for the BFR is performed based on contention-free RA resources in case that the message includes the contention-free RA resources for the BFR, wherein a contention-based RA procedure for the BFR is performed in case that the message does not include the contention-free RA resources, and wherein the contention-free RA resources are maintained at the terminal based on the contention-free RA procedure being completed.

Objects of the disclosure are not limited to the above-mentioned objects. That is, other objects that are not mentioned may be obviously understood by those skilled in the art to which the disclosure pertains from the following description.

According to an embodiment of the disclosure, the terminal can quickly recover a beam, thereby quickly recovering a communication disconnection.

According to another embodiment of the disclosure, the RRC inactive mode of the terminal and the base station can be reported to the core network, and the problem occurring when the base station fails to recover the context of the terminal in the RRC inactive mode can be resolved.

In addition, according to another embodiment of the disclosure, when the packet duplication activation and deactivation MAC CE is received in the next generation mobile communication system, the operation of the terminal is defined to be able to clarify the operations of the terminal and the base station for the packet duplication activation and deactivation. In addition, it is possible to classify the operation of the terminal even for the uplink transmission path change and the bearer change, in particular, the change between the split bearer and the non-split bearer.

In addition, according to another embodiment of the disclosure, when the plurality of paging message are present in one slot, the terminal may monitor the BWP to select one of the plurality of paging messages present at the paging reception timing.

The effects that may be achieved by the embodiments of the disclosure are not limited to the above-mentioned objects. That is, other effects that are not mentioned may be obviously understood by those skilled in the art to which the disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3C is a diagram schematically illustrating a multiple connection operation and a carrier aggregation operation of the existing LTE system according to embodiments of the present disclosure;

FIG. 3I is a diagram illustrating an operation of processing a priority bit rate when an uplink transmission path of a terminal is switched as a 3-2th embodiment of the present disclosure;

FIG. 4B is a diagram for explaining a scenario in which a partial frequency band is applied in a next generation mobile communication system according to embodiments of the present disclosure;

FIG. 4E is a flowchart of a terminal operation for paging reception in a 4-1th embodiment in the present disclosure;

DETAILED DESCRIPTION

Figure 1A:
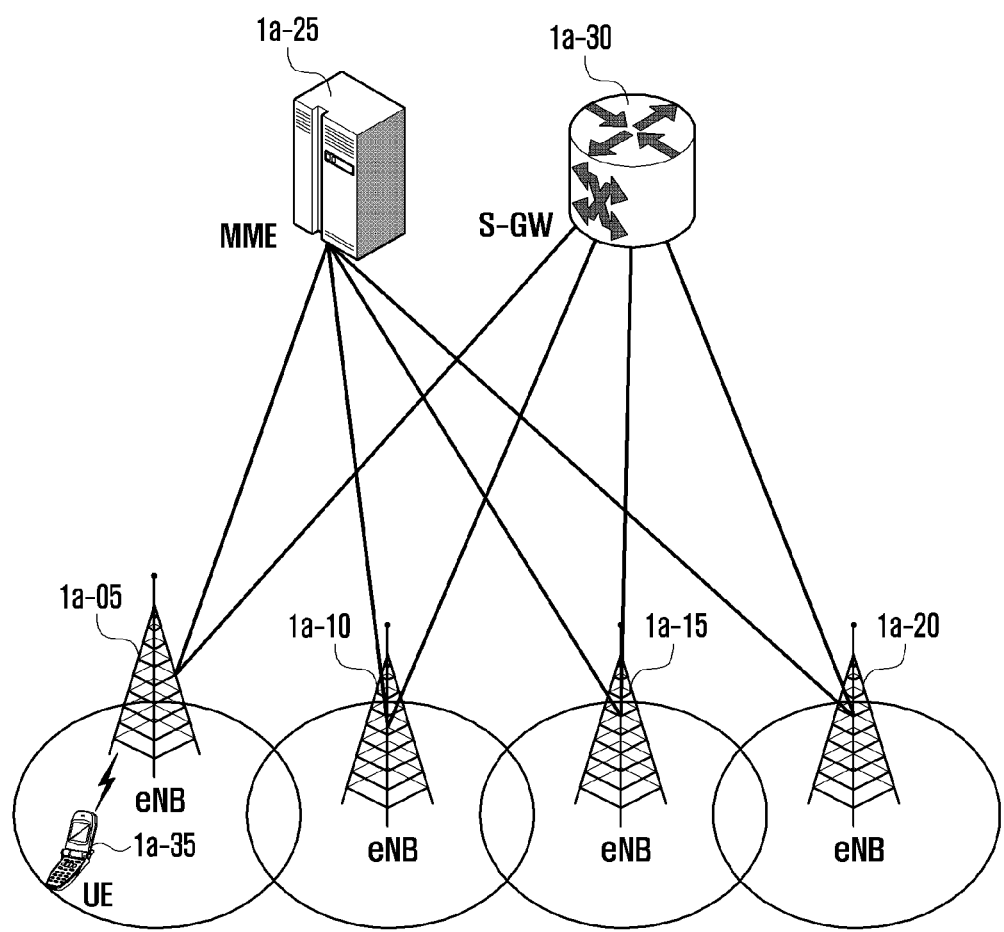
FIG. 1A is a diagram illustrating a structure of an LTE system referenced according to embodiments of the present disclosure.

FIGS. 1A through 4K, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, exemplary embodiments of the disclosure will be described in detail with reference to the accompanying drawings. At this time, it is to be noted that like reference numerals denote like elements in the accompanying drawings. Further, detailed descriptions related to well-known functions or configurations will be ruled out in order not to unnecessarily obscure the subject matter of the disclosure.

In describing the exemplary embodiments of the disclosure in the specification, a description of technical contents which are well known to the art to which the disclosure belongs and are not directly connected with the disclosure will be omitted. This is to more clearly transfer a gist of the disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the disclosure and methods accomplishing the same will become apparent from the following detailed description of embodiments with reference to the accompanying drawings. However, the disclosure is not limited to the embodiments disclosed herein but will be implemented in various forms. The embodiments have made disclosure of the disclosure complete and are provided so that those skilled in the art can easily understand the scope of the disclosure. Therefore, the disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for executing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be substantially simultaneously performed in fact or be performed in a reverse sequence depending on corresponding functions sometimes.

Here, the term "-unit" used in the embodiment means software or hardware components such as FPGA and ASIC and the "~unit" performs any roles. However, the meaning of the "~unit" is not limited to software or hardware. The ~unit' may be configured to be in a storage medium that may be addressed and may also be configured to reproduce one or more processor. Accordingly, for example, the "~unit" includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the "~units" may be combined with a smaller number of components and the "~units" or may be further separated into additional components and "~units." In addition, the components and the "~units" may also be implemented to reproduce one or more CPUs within a device or a security multimedia card.

First Embodiment

Hereinafter, an operation principle of the disclosure will be described in detail with reference to the accompanying drawings. Hereinafter, when it is determined that the detailed description of the known art related to the disclosure may obscure the gist of the disclosure, the detailed description thereof will be omitted. Further, the following terminologies are defined in consideration of the functions in the disclosure and may be construed in different ways by the intention or practice of users and operators. Therefore, the definitions thereof should be construed based on the contents throughout the specification.

Terms identifying an access node, terms indicating network entity, terms indicating messages, terms indicating an interface between network entities, terms indicating various types of identification information, and so on that are used in the following description are exemplified for convenience of explanation. Accordingly, the disclosure is not limited to terms to be described below and other terms indicating objects having the equivalent technical meaning may be used.

Hereafter, for convenience of explanation, the disclosure uses terms and names defined in the 3rd generation partnership project long term evolution (3GPP LTE) that is the latest standard among the currently communication standards. However, the disclosure is not limited to the terms and names but may also be identically applied even to the system according to other standards. In particular, the disclosure may be applied to 3GPP new radio (NR) (e.g., 5G mobile communication standard).

FIG. 1A is a diagram illustrating a structure of an LTE system according to embodiments of the present disclosure.

Referring to FIG. 1A, the wireless communication system is configured to include a plurality of base stations 1a-05, 1a-10, 1a-15, and 1a-20, a mobility management entity (MME) 1a-20, a serving-gateway (S-GW) 1a-30. A user equipment (hereinafter, UE or terminal) 1a-35 accesses an external network through the base stations 1a-05, 1a-10, 1a-15, and 1a-20 and the S-GW 1a-30.

The base stations 1a-05, 1a-10, 1a-15, and 1a-20 are access nodes of a cellular network and provide a radio access to terminals that accesses a network. That is, in order to serve traffic of users, the base stations 1a-05, 1a-10, 1a-15, and 1a-20 collect and schedule status information such as a buffer status, an available transmission power status, a channel status, or the like of the terminals, thereby supporting a connection between the terminals and a core network (CN). The MME 1a-25 is an apparatus for performing various control functions as well as a mobility management function for the terminal and is connected to a plurality of base stations, and the S-GW 1a-30 is an apparatus for providing a data bearer. Further, the MME 1a-25 and the S-GW 1a-30 may further perform authentication, bearer management, and the like on the terminal accessing the network and may process packets that are to be received from the base stations 1a-05, 1a-10, 1a-15, and 1a-20 and packets that are to be transmitted to the base stations 1a-05, 1a-10, 1a-15, and 1a-20.

Figure 1B:
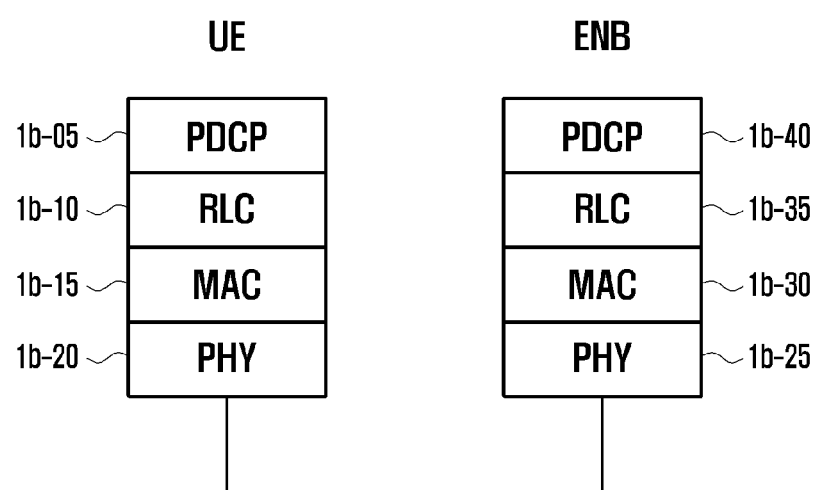
FIG. 1B is a diagram illustrating a radio protocol structure in the LTE system according to embodiments of the present disclosure.

FIG. 1B is a diagram illustrating a radio protocol structure in the LTE system according to embodiments of the present disclosure.

Referring to FIG. 1B, the radio protocol of the LTE system consists of packet data convergence protocols (PDCPs) 1b-05 and 1b-40, radio link controls (RLCs) 1b-10 and 1b-35, and medium access controls (MMCs) 1b-15 and 1b-30 in the terminal and the ENB, respectively. The packet data convergence protocols (PDCPs) 1b-05 and 1b-40 performs operations such as compression/recovery of an IP header, and the radio link controls (hereinafter, referred to as RLC) 1b-10 and 1b-35 reconfigure a PDCP packet data unit (PDU) to be an appropriate size. The MACs 1b-15 and 1b-30 are connected to several RLC layer devices configured in one terminal and perform an operation of multiplexing RLC PDUs in an MAC PDU and demultiplexing the RLC PDUs from the MAC PDU.

Physical layers 1b-20 and 1b-25 perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer. Further, the physical layer uses a hybrid ARQ (HARQ) for additional error correction and a receiving end transmits whether to receive the packet transmitted from a transmitting end in 1 bit. This is called HARQ ACK/NACK information. The downlink HARQ ACK/NACK information on the uplink transmission may be transmitted on a physical hybrid-ARQ indicator channel (PHICH) physical channel, and the uplink HARQ ACK/NACK information on the downlink transmission may be transmitted on a physical uplink control channel (PUCCH) or physical uplink shared channel (PUSCH) physical channel.

As the HARQ transmission scheme, there are asynchronous HARQ and synchronous HARQ. The asynchronous HARQ is a scheme in which retransmission timing is not fixed when a (re) transmission fails and the synchronous HARQ is a scheme in which retransmission timing is fixed (e.g., 8 ms) when a (re)transmission fails. In addition, a plurality of transmission and reception may be performed in parallel for the downlink and the uplink to one terminal, and each transmission is divided into HARQ process identifiers.

On the other hand, since the retransmission timing is not defined in the asynchronous HARQ, the base station provides information on which HARQ process this transmission belongs to and whether this transmission is initial transmission or retransmission through the physical downlink control channel (PDCCH) physical channel every time the retransmission is performed. More specifically, information on which HARQ process this transmission is transmitted through the HARQ process ID field in the PDCCH, and information on whether this transmission is the initial transmission or the retransmission indicates retransmission when the corresponding bit is not changed compared to the existing value and indicates new transmission when the corresponding bit is changed to other values new transmission, using a new data indicator (NDI) bit in the PDCCH. Accordingly, the terminal receives the resource allocation information in the PDCCH transmitted by the base station to understand the details of the corresponding transmission, receive the actual data through the physical downlink shared channel (PDSCH) physical channel in the case of the downlink, and transmits actual data transmitted through the physical uplink shared channel (PUSCH) physical channel in the case of the uplink.

Although not illustrated in the drawings, each radio resource control (hereinafter, referred to as RRC) layer is present at an upper part of the PDCP layer of the terminal and the base station, and the RRC layer may receive and transmit access and measurement related control messages for a radio resource control.

Figure 1C:
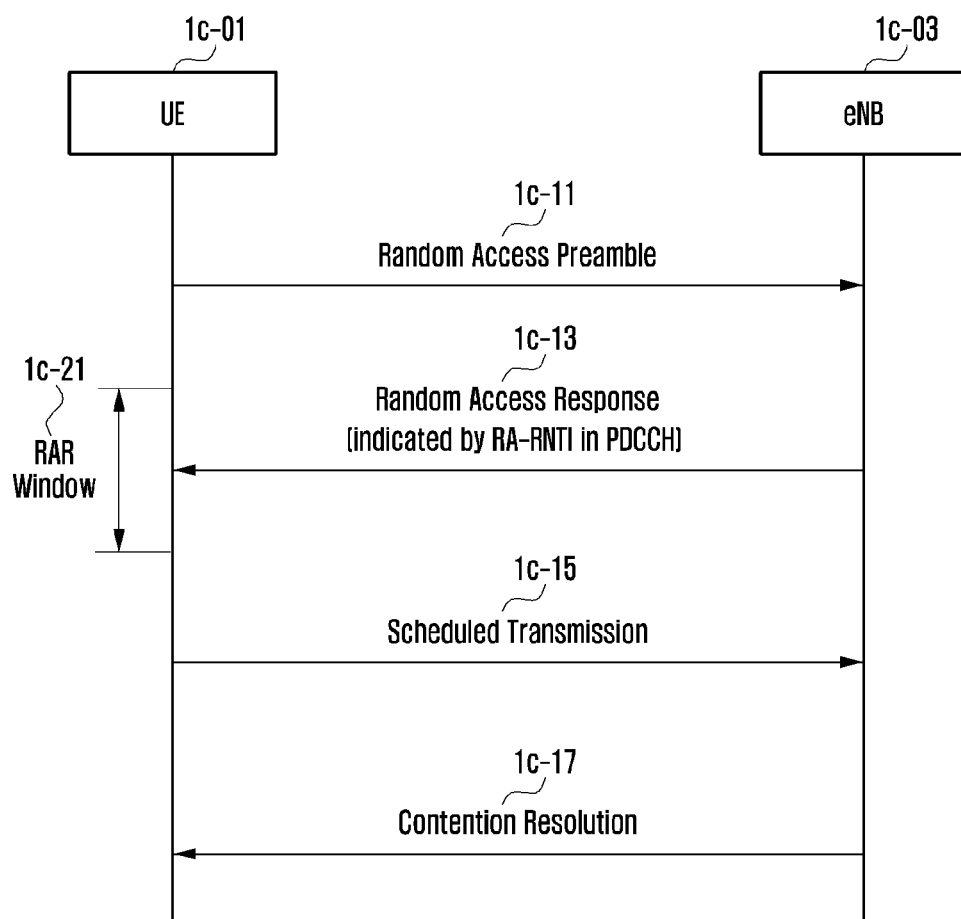
FIG. 1C is a diagram illustrating a random access procedure in the LTE system according to embodiments of the present disclosure.

FIG. 1C is a diagram illustrating a random access procedure in the LTE system according to embodiments of the present disclosure. Similar procedures and terms are used in the 5G system to which the disclosure is applied, so the procedure will be briefly explained for the sake of understanding.

A terminal 1c-01 performs a random access by performing the following procedures in various cases where initial access to the base station, reconnection, handover, and other random access are required.

First, the terminal 1c-01 transmits a random access preamble to a physical channel for the random access for connection to the base station 1c-03 (1c-11). In the LTE system, the physical channel is referred to as a physical random access channel (PRACH), and one or more terminals transmit a random access preamble simultaneously with the corresponding PRACH resource. Also, the random access preamble may have a plurality of preamble identifiers in accordance with a standard in specific sequence specifically designed to be able to be received even if being transmitted before being completely synchronized with the base station. If there is a plurality of preamble identifiers, the preamble that the terminal transmits may be randomly selected by the terminal or may be a specific preamble designated by the base station.

When the base station receives the preamble, the base station transmits a random access response (hereinafter, referred to as RAR) message to the terminal (1c-13). The RAR message includes uplink transmission timing correction information, uplink resource allocation information and terminal identifier information to be used in a subsequent step (i.e., step (1c-15)) as well as the identifier information of the preamble used in the step (1c-01). For example, in step (1c-11), when a plurality of terminals attempt random access by transmitting different preambles, the preamble identifier information is transmitted in order to indicate which RAR message is a response message for a preamble. The uplink resource allocation information is detailed information of a resource to be used by the terminal in step (1c-15), and includes physical location and size of the resource, a modulation and coding scheme used for transmission, power control information for transmission, and the like. When the terminal transmitting a preamble performs initial connection, since the terminal does not possess an identifier allocated to the base station for communication with the base station, the temporary UE identifier information is a value transmitted for use therefor.

The RAR message must be transmitted within a predetermined period after a predetermined time after the preamble is transmitted and the period is referred to as a RAR window. Further, when the RAR message is transmitted, the base station schedules the RAR message through the PDCCH, and the corresponding scheduling information is scrambled using a random access-radio network temporary identifier (RA-RNTI), and the RA-RANTI is mapped with an PRACH resource used for transmitting the (1c-11) message and a UE that transmits the preamble to a specific PRACH resource attempts to receive the PDCCH based on the RA-RNTI and determines whether there is a corresponding RAR message.

The terminal that receives the RAR message transmits a different message to the resources allocated to the RAR message according to the above-described various purposes (1c-15). A third transmitted message is also referred to as Msg3 in the illustrated drawing (that is, a preamble of step (1c-11) is referred to as Msg1 and a RAR of step (1c-13) is also referred to as Msg2). As an example of the Msg3, transmitted by the terminal, is an RRConnectionRequest message which is a message of an RRC layer in case of the initial connection and an RRCConnectionReestablishmentRequest message is transmitted, and an RRCConnectionReconfigurationComplete message is transmitted in case of handover. Alternatively, a buffer status report (BSR) message for a resource request, etc. may be transmitted.

Thereafter, in case of the initial transmission (i.e., when the base station identifier information allocated to the terminal is not included in the Msg3, etc.), the terminal receives a contention resolution message from the base station (1c-17) and the contention resolution message includes contents which the terminal transmits in the Msg3 as it is, and as a result, even when there is a plurality of UEs selecting the same preamble in step (1c-11), it may be informed which UE of a response the contention resolution message is.

Figure 1D:
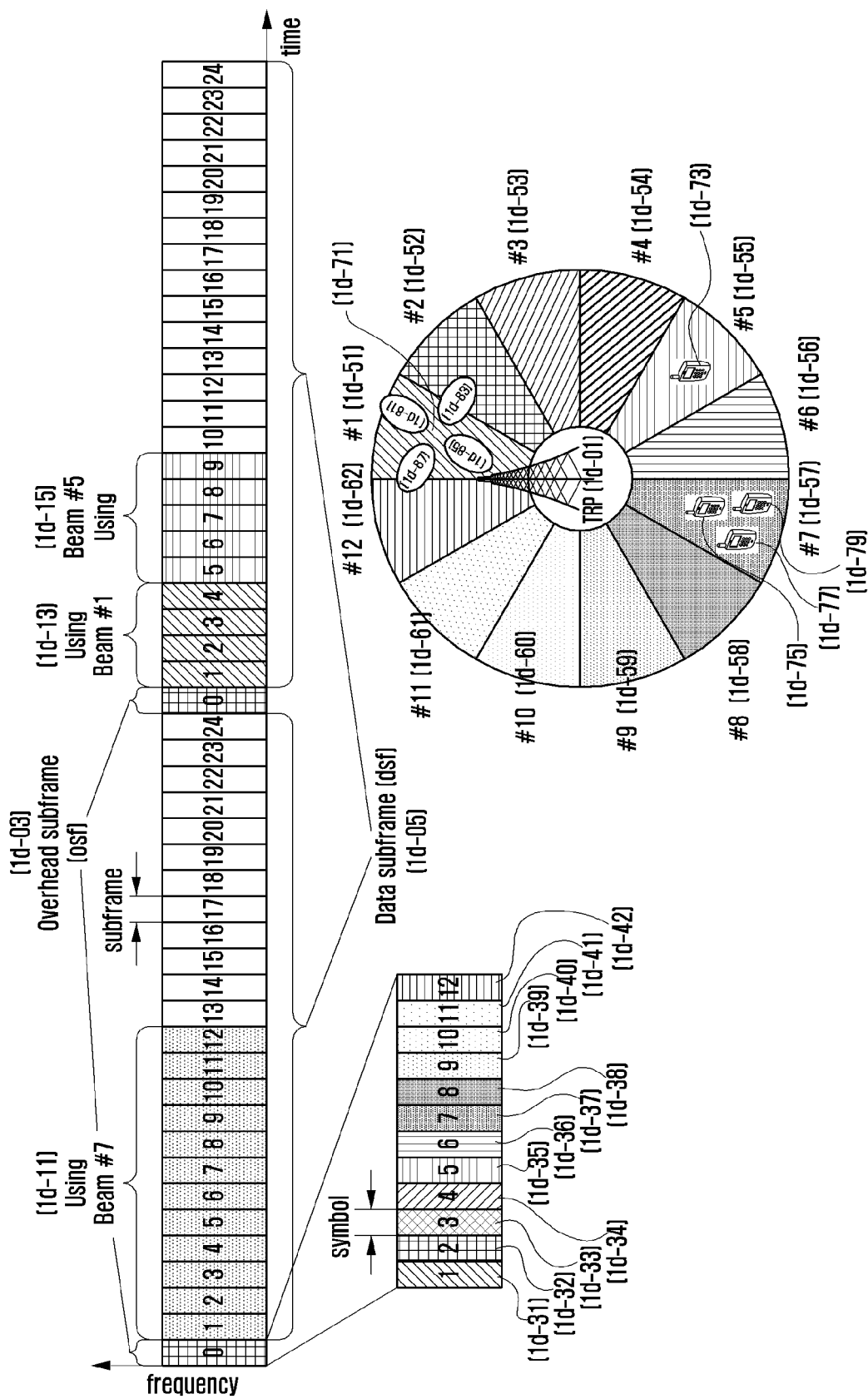
FIG. 1D is a diagram illustrating an example of a frame structure used in the 5G system according to embodiments of the present disclosure.

FIG. 1D is a diagram illustrating an example of a frame structure used in the 5G system according to embodiments of the present disclosure.

The 5G system may consider a scenario that is operated at a high frequency to secure a wide frequency bandwidth for a high transmission speed and a scenario that generates a beam to transmit data because of difficulty in a signal transmission at a high frequency.

Accordingly, a scenario of performing communication using different beams when the base station or a transmission/reception point (TRP) 1d-01 communicates with terminals 1d-71, 1d-73, 1d-75, 1d-77, and 1d-79 in a cell may be considered. That is, in this exemplary drawing, a scenario to allow the terminal 1 1d-71 to perform communication using beam #1 1b-51 and the terminal 2 1d-73 to perform communication using beam #5 1d-55, and the terminal 3, 4, and 5 1d-75, 1d-77, and 1d-79 to perform communication using beam #7 1d-57 is assumed.

To measure which beam the terminal uses to communicate with the TRP, an overhead subframe (osf) 1d-03 exists in time. In the osf, the base station transmits symbols transmits a reference signal using different beams by symbol (or over several symbols). In the exemplary drawings, it is assumed that the beam transmitted by the base station includes 12 beams from #1 1d-51 to #12 1d-62 and in the osf, different beams are transmitted while being swept every symbol. That is, each beam is transmitted by each symbol (for example, transmission of the beam #1 1d-51 in a first symbol 1d-31), and thus the terminal may measure which of the signals from which of the beams transmitted within the osf is strongest.

In the exemplary drawing, a scenario in which the corresponding osf is repeated every 25 subframes is assumed, and the remaining 24 subframes are a data subframe (dsf) 1d-05 in which general data are transmitted and received.

Accordingly, a scenario to allow the terminals 3, 4, and 5 1d-75, 1d-77, and 1d-79 to perform communication using the beam #7 in common according to the scheduling of the base station (1d-11), the terminal 1 1d-71 to perform communication using the beam #1 (1d-13), and the terminal 2 1d-73 to perform communication using the beam 35 is assumed (1d-15).

The exemplary drawing mainly illustrates the transmission beam #1 1d-51 to the transmission beam #12 1d-62 of the base station, but may additionally consider the reception beam (for example, (1d-81) (1d-83) (1d-85) and (1d-87) of the terminal 1 1d-71) of the terminal for receiving the transmission beam of the base station. In the exemplary embodiment, the terminal 1 has four beams 1d-81, 1d-83, 1d-85, and 1d-87 and may perform beam sweeping to determine which beam has the best reception performance. At this time, if a plurality of beams may not be used at the same time, one reception beam may be used for each osf and thus several osf are received as many as the number of reception beams, such that the transmission beam of the base station and the reception beam of the terminal may be found.

On the other hand, communication may be broken due to movement of the terminal while communicating using the beam, which is referred to as beam failure. At this time, a process of recovering the beam to a correct beam according to a position of the terminal is referred to as beam failure recovery. As a detailed scheme of the beam failure recovery, two methods will be described in the disclosure. A first method is a non-contention-based or contention-free beam failure recovery method (called Type 1 BFR) and a second method is a contention-based beam failure recovery method (called Type 2 BFR).

Figure 1E:
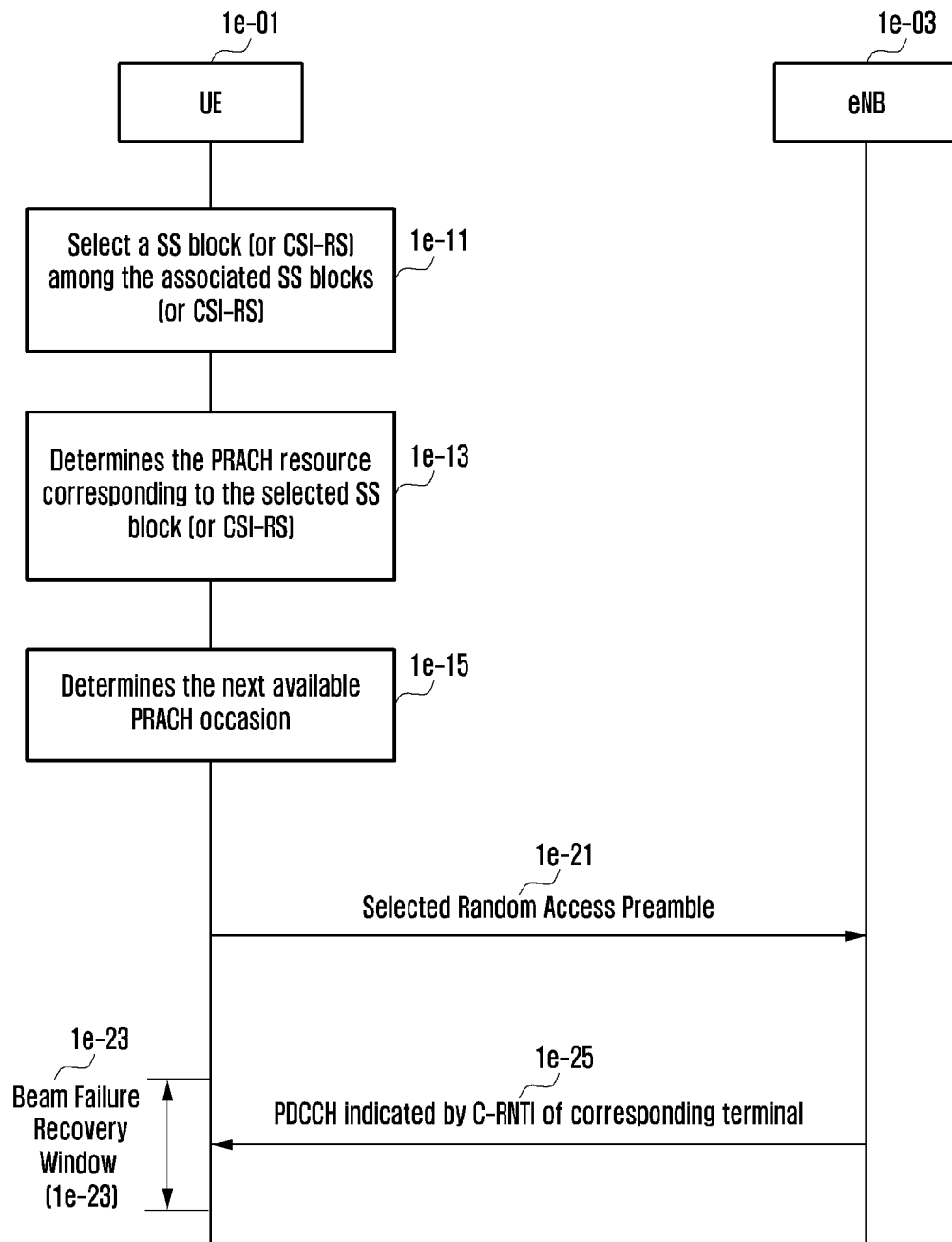
FIG. 1E is an exemplary diagram of a message flow between a terminal and a base station when using a non-contention-based beam failure recovery method (Type 1 BFR) according to embodiments of the present disclosure.

FIG. 1E is an exemplary diagram of a message flow between a terminal and a base station when using a non-contention-based beam failure recovery method (Type 1 BFR) according to embodiments of the present disclosure.

As described above, when it is determined that the terminal has a bad connection with a current beam and the beam failure occurs, the terminal first selects a beam corresponding to a best signal among beams having a larger reception signal than ssb-Threshold or csi-Threshold which is a threshold value set by the base station based on a received signal strength of a reference signal which the base station transmits by each beam. The reference signal may be a synchronization reference signal (SS) transmitted by the base station for synchronization, or may be a channel state information reference signal (CSI-RS) for measuring a channel state.

The base station may allocate a random access preamble identifier for recovery of the beam failure for each beam to the terminal or may allocate a separate random access transmission resource on a time/frequency basis. As a result, when there is information corresponding to the selected beam, the terminal selects a random access preamble according to the selected information and selects a resource on the preamble time/frequency to be transmitted (1e-13) (1e-15) and transmits the selected preamble to the base station (1e-21). After transmitting the preamble, the terminal drives a timer named bfr-ResponseWindow to receive a beam failure recovery response after a predetermined time (for example, after an X OFDM symbol) (1e-23). In this case, since the base station knows the preamble to be transmitted by the terminal, a dedicated timer window (i.e., bfr-ResponseWindow) for the BFR operation is driven instead of a timer window (ra-ResponseWindow to be described later) corresponding to the preamble.

When the PDCCH indicated by a C-RNTI (for downlink or uplink resource allocation), which is an identifier in a cell of the terminal during the driving of the bfr-ResponseWindow timer is received, the terminal regards the random access to be successful (1e-25). Meanwhile, when the PDCCH indicated by the C-RNTI (for downlink or uplink resource allocation), which is the identifier in the cell of the terminal during the driving of the bfr-ResponseWindow timer is not received, the terminal performs an operation of selecting the Type 1 BFR and the Type 2 BFR to be described later.

Meanwhile, when the random access is regarded as successful and the recovery is successful, even if the terminal uses separate random access transmission resources and random access preamble identifiers on the time/frequency previously set from the base station, the terminal continuously the random access transmission resource and the random access preamble identifier to be recycled even when a beam failure situation occurs similarly later without resetting separate resetting of the base station.

However, if a dedicated preamble resource and an identifier are configured for handover in which the terminal moves from the base station to another base station, the dedicated preamble resource and the identifier that are configured are deleted after a successful random access procedure.

Figure 1F:
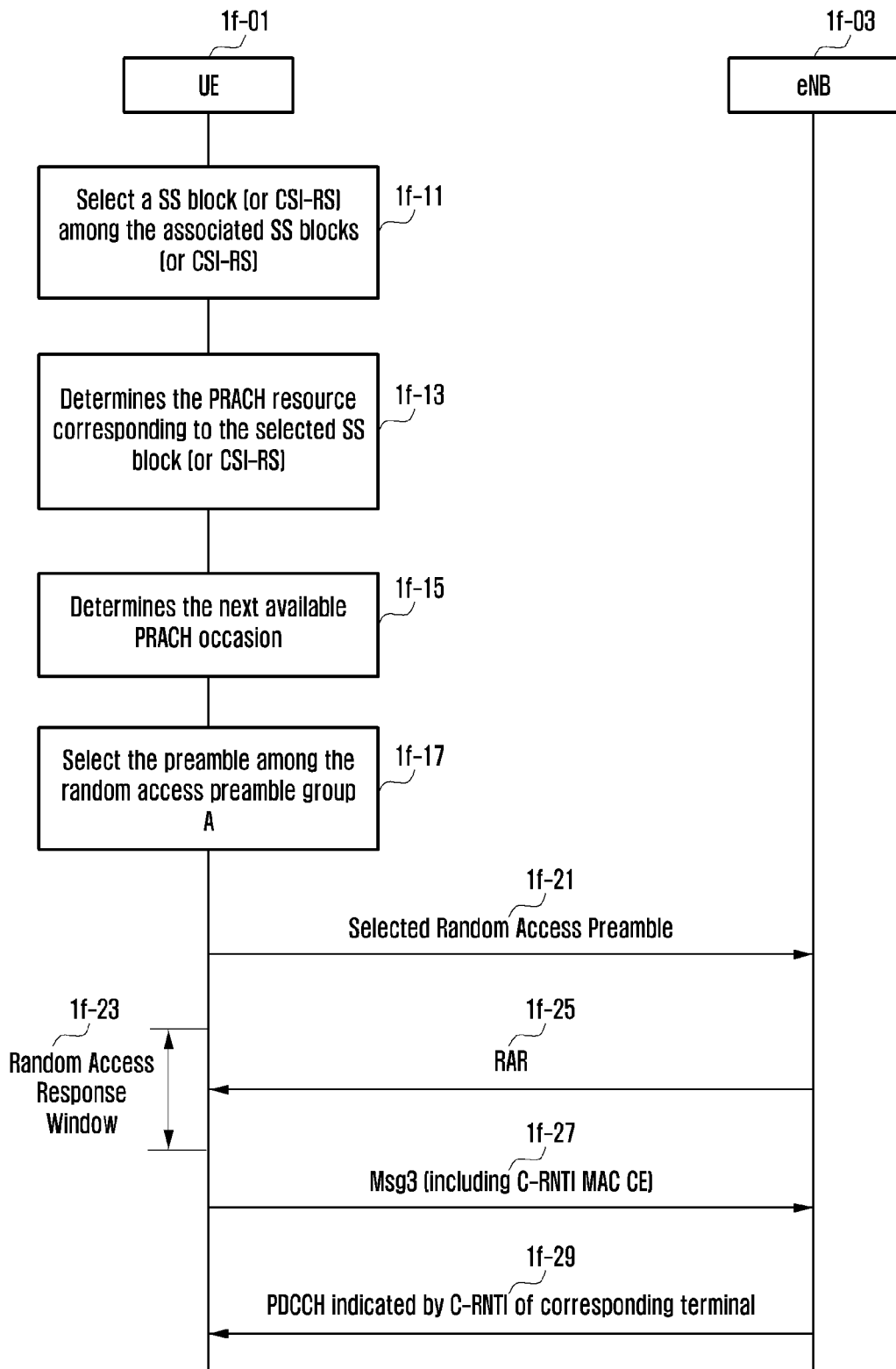
FIG. 1F is an exemplary diagram of a message flow between a terminal and a base station when using a contention-based beam failure recovery method (Type 2 BFR) according to embodiments of the present disclosure.

FIG. 1F is an exemplary diagram of a message flow between a terminal and a base station when using a contention-based beam failure recovery method (Type 2 BFR) according to embodiments of the present disclosure.

As described above, when it is determined that the terminal has a bad connection with a current beam and the beam failure occurs, the terminal first selects a beam corresponding to a best signal among beams having a larger reception signal than ssb-Threshold or csi-Threshold which is a threshold value set by the base station based on a received signal strength of a reference signal which the base station transmits by each beam. The reference signal may be a synchronization reference signal (SS) transmitted by the base station for synchronization, or may be a channel state information reference signal (CSI-RS) for measuring a channel state.

The base station may allocate a random access preamble identifier for recovery of the beam failure for each beam to the terminal or may allocate a separate random access transmission resource on a time/frequency basis. However, in this example, it is assumed that there is no corresponding information in the selected beam, and as a result, the terminal selects an arbitrary preamble (1f-17). In this case, the preamble may be divided into two groups as group A and group B and the group B is transmitted when a size of a message to be transmitted afterward is equal to or more than a set size and a downlink received signal is sufficiently large. Since the terminal needs to inform only that the beam is selected through the BFR operation, the terminal continuously selects one of group A random access preambles in case of Type 2 BFR. Then, the terminal transmits the selected preamble to the base station (1f-21).

After transmitting the preamble, the terminal drives a timer named ra-ResponseWindow to receive a random access response after a predetermined time (for example, after an X OFDM symbol) (1f-23). Thereafter, when the random access message (RAR) is received within the ra-ResposneWindow (1f-25), Msg3 is transmitted according to the uplink resource allocation included in the RAR message (1f-27) and an ra-ContentionResolutionTimer timer is driven. The Msg3 includes a C-RNTI MAC Control Element (CE) used to transmit an intra-cell identifier of the terminal to inform the base station of random access by the terminal through the beam. When the base station correctly receives the Msg3, the base station transmits the PDCCH indicated by the C-RNTI of the corresponding UE in step (1f-29) and the terminal that receives the PDCCH regards that the random access is successfully completed. When the RAR is not received in the ra-ResponseWindow or the PDCCH is not received in the ra-Contention ResolutionTimer, the terminal performs the random access again.

The base station may transmit backoff information in order to control a load when many terminals in the cell perform the random access. For example, when the base station receives a backoff value transmitted from the base station, the terminal selects an arbitrary value between 0 and the backoff value to delay transmission of the preamble. However, when the terminal performs the BFR operation, preamble retransmission may be performed immediately without applying the received backoff information in order to preferentially recover the beam.

Figure 1G:
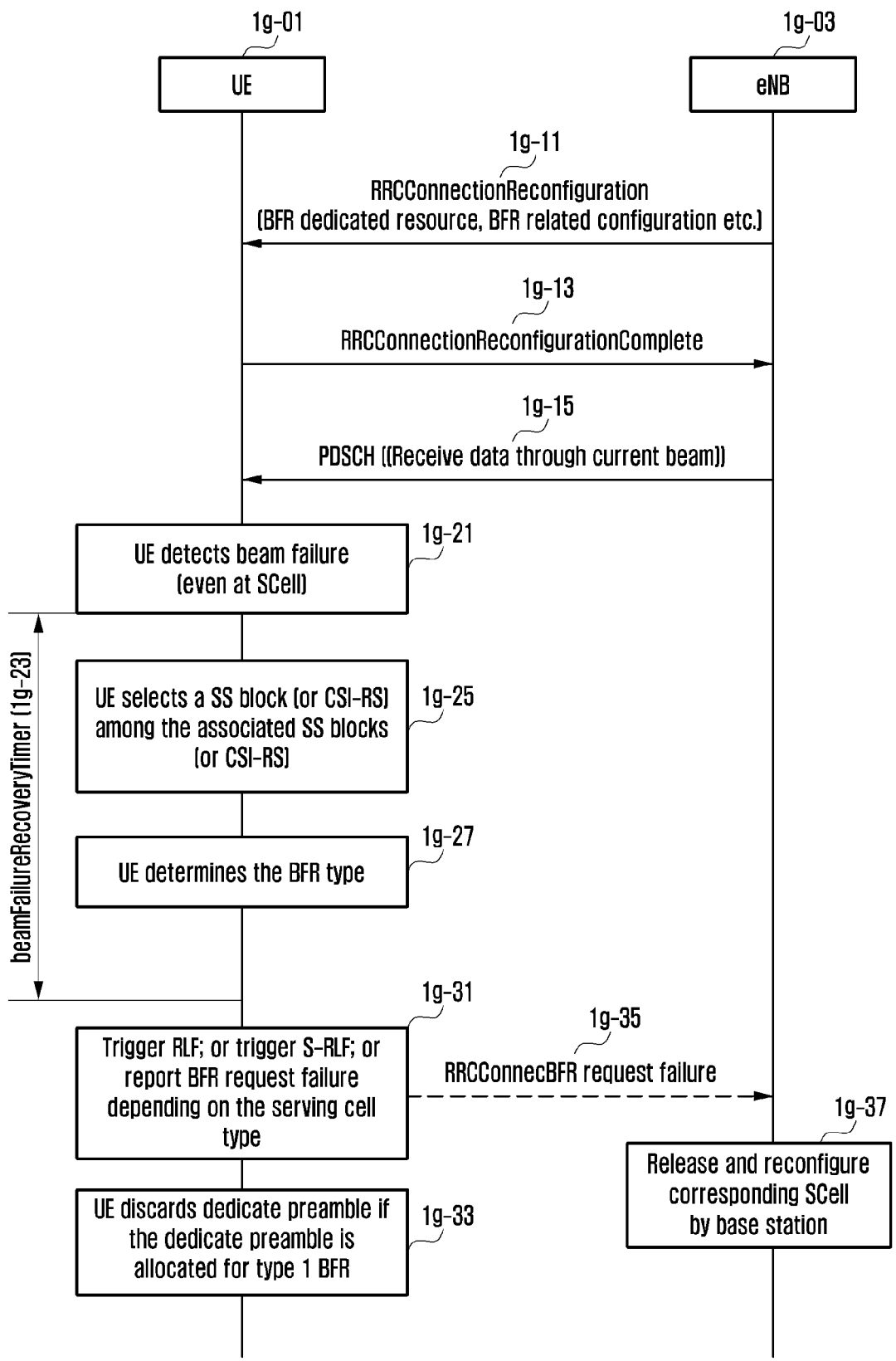
FIG. 1G is a diagram illustrating a message flow between the terminal and the base station when the Type 1 and the Type 2 beam failure recovery methods are used according to embodiments of the present disclosure.

FIG. 1G is a diagram illustrating a message flow between the terminal and the base station when the Type 1 and the Type 2 beam failure recovery methods are used according to embodiments of the present disclosure.

In the illustrated drawing, the terminal successfully accesses the base station and transitions to a connected state (RRC CONNECTED state), so that the terminal may transmit and receive data to and from the base station. Thereafter, the terminal receives an RRC connection reconfiguration message (RRConnectionReconfiguration message) from the base station to receive dedicated resource and beam failure recovery related configurations that may be used when the beam failure occurs.

Dedicated resource information which may be used when the beam failure occurs includes the following information: set of random access preamble identifiers for each beam and/or a preamble transmission resource (PRACH) on time/frequency; upstream band or uplink partial band (bandwidth Part) that transmits the preamble when performing a BFR procedure; and downlink band or downlink partial band of monitoring the PDCCH when performing the BFR procedure;

The beam failure recovery related configurations includes the following information: beamFailureRecoveryTimer (a time that the beam failure recovery may be completed; if the beam failure recovery is not completed within the timer operation, the beam failure recovery is unsuccessful); ssb-Threshold, csi-Threshold: Threshold value for selecting a beam to be recovered in the beam failure recovery; and bft-ResponseWindow: Time window for receiving a response to the preamble in the non-contention based beam failure recovery Thereafter, the terminal and the base station may transmit and receive data through the beam used in a frequency band (part) in which the terminal and the base station currently operate (1g-15) and then detect the beam failure due to movement of the terminal (1g-21). The terminal that senses the beam failure drives beamFailureRecoveryTimer (1g-23) and first selects the beam corresponding the best signal among the beams having a larger received signal than the ssb-Threshold or csi-Threshold which is the threshold value set by the base station among signals transmitted by the base station (1g-25). This is referred to as Embodiment 1-1.

Alternatively, the random access preamble identifier for recovering the beam failure in case of the beam failure, which will be described later, among the beams transmitted by the base station may be allocated and/or the beam corresponding to the best signal may be first selected among the beams having the larger received signal than the ssb-Threshold or csi-Threshold which is the threshold value set by the base station only for a beam which is allocated with a separate random access transmission resource on the time/frequency (1g-25). This is referred to as Embodiment 1-2. For example, a scenario may be considered, in which when among 8 beams (beam 1, beam 2, . . . , beam 8) of the base station, a dedicated resource is configured set in step (1g-11) for beam 1 to beam 4 in the base station and the dedicated resource is not configured for beam 5 to beam 8, the terminal determines a beam which exceeding the threshold value and when only beam 3 and beam 7 satisfy a condition, a signal of beam 7 is better than the signal of beam 3. In this case, according to Embodiment 1-1, beam 7 is selected and according to Embodiment 1-2, the signal of beam 7 is better, but beam 3 is selected and recovered to perform quick recovery.

The reference signal may be a synchronization reference signal (SS) transmitted by the base station for synchronization, or may be a channel state information reference signal (CSI-RS) for measuring a channel state.

In step (1g-11), the base station may allocate a random access preamble identifier for recovery of the beam failure for each beam to the terminal or may allocate a separate random access transmission resource on a time/frequency basis or may not transmit the separate random access transmission resource or a scenario of allocating the separate random access transmission resource only to some beams is also available. When there is a dedicated resource configured in step (1g-11) in the beam (or an SS block (a set of the SS and a basic system information block)) selected in step (1g-25), the terminal performs the above-described Type 1 BFR operation and if not (that is, when there is no configured dedicated resource), the terminal performs the Type 2 BFR operation (1g-27).

When the selected BFR type is Type 1 (i.e., FIG. 1E), if the terminal transmits the preamble to the corresponding cell (1e-21) and does not receive the PDCCH within bft-ResponseWindow (1e-23) (1e-25), the terminal repeats the operation until the random access is successful through step (1g-25) of selecting the beam again or until the beamFailureRecoveryTimer expires.

When the selected BFR type is Type 2 (i.e., FIG. 1F), the operation is repeated until the random access is successful or until the beamFailureRecoveryTimer expires according to the maximum number of random access transmission times.

When the preamble is transmitted in the operations, the terminal may directly transmit the preamble to SCell. This is to inform the base station of a cell in which the beam failure occurs by the terminal.

When the random access is successfully completed until the beamFailureRecoveryTimer expires, the beam failure recovery is regarded as successful and the beamFailureRecoveryTimer timer is stopped.

However, when the beamFailureRecoveryTimer expires, a different operation is performed according to the type of cell in which the beam failure occurs (1g-31), When the cell in which the beam failure currently occurs is PCell, it is regarded that a radio link failure occurs and a neighboring cell having a largest signal is selected to re-establish the connection to the corresponding cell. When the cell in which the beam failure occurs is PSCell (i.e., a representative cell of not a main base station but a sub main station in a multiple connection technique (a technique of simultaneously using two base stations)), it is reported to the main base station that a problem occurs in the sub base station. When the cell in which the beam failure currently occurs is SCell, the terminal may transmit a message reporting that the beam failure recovery is unsuccessful to the representative cell (i.e., PCell or PSCell) of the corresponding SCell (1g-35).

The base station that receives the message releases the corresponding SCell or PSCell or recovers the corresponding SCell or PSCell again and re-establishes the corresponding SCell or PSCell to normalize the connection (1g-37). Meanwhile, when the dedicated preamble resource and the identifier are configured in Type 1 BFR, the corresponding resource is maintained when the random access is successful as described above. However, when the beamFailureRecoveryTimer expires and the random access is unsuccessful, the random access may be unsuccessful even though the dedicated preamble and the identifier are used, the dedicated preamble resource and the identifier configured for the Type 1 BFR are deleted (1g-33).

However, the dedicated preamble resource and the identifier to be used in handover to move the terminal to another base station among the dedicated preamble resources and identifiers to be deleted are not deleted.

Figure 1H:
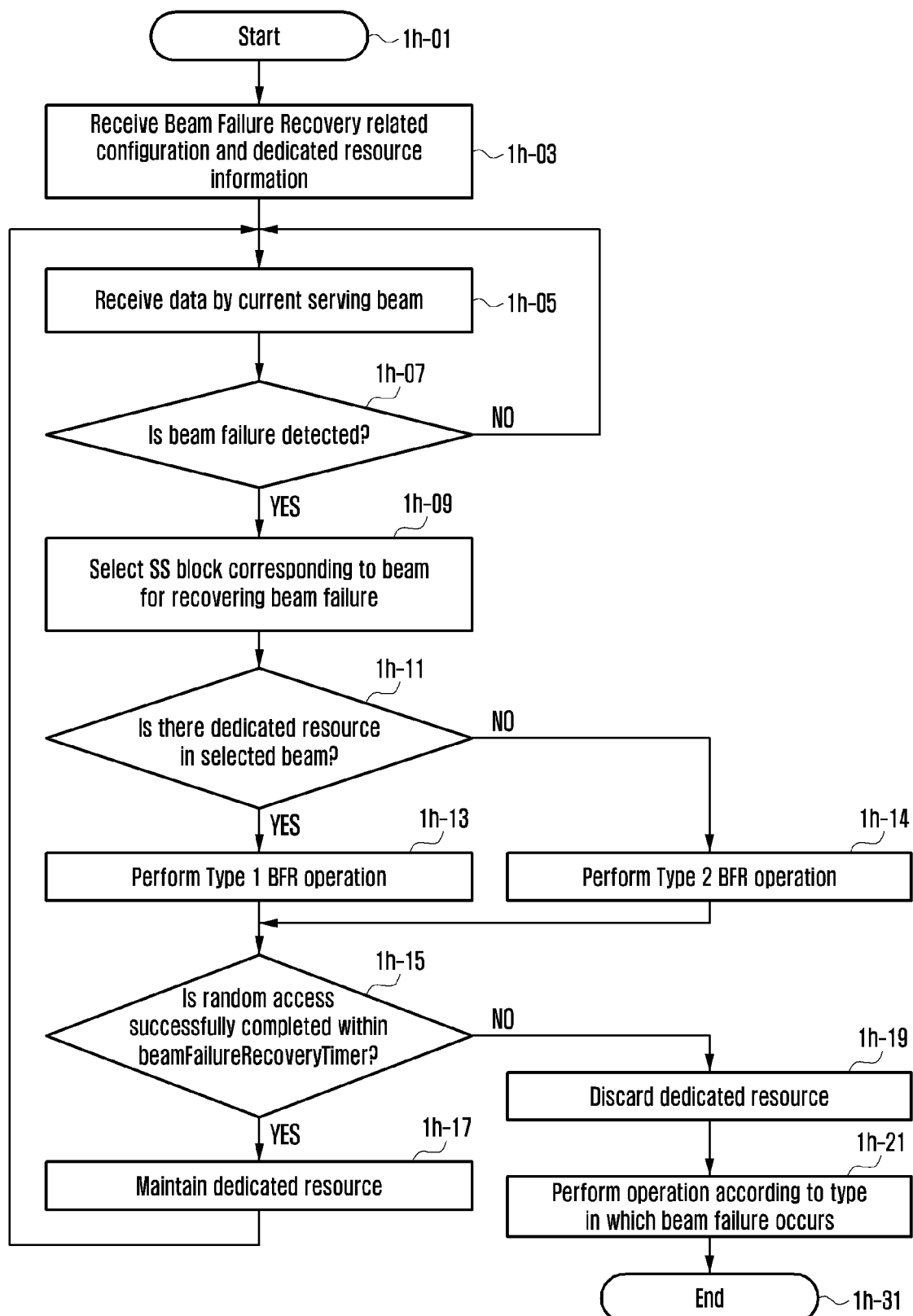
FIG. 1H is an exemplary diagram of an operation sequence of the terminal when the Type 1 and the Type 2 beam failure recovery methods are used according to embodiments of the present disclosure.

FIG. 1H is an exemplary diagram of an operation sequence of the terminal when the Type 1 and the Type 2 beam failure recovery methods are used according to embodiments of the present disclosure.

In the illustrated drawing, it is assumed that the terminal successfully accesses the base station and transitions to the connected state (RRC CONNECTED state), so that the terminal may transmit and receive data to and from the base station. The terminal receives an RRC connection reconfiguration message (RRConnectionReconfiguration message) from the base station to receive dedicated resource and beam failure recovery related configurations that may be used when the beam failure occurs (1h-03).

Dedicated resource information which may be used when the beam failure occurs includes the following information: set of random access preamble identifiers for each beam and/or a preamble transmission resource (PRACH) on time/frequency; upstream band or uplink partial band (bandwidth Part) that transmits the preamble when performing a BFR procedure; and downlink band or downlink partial band of monitoring the PDCCH when performing the BFR procedure.

The beam failure recovery related configurations includes the following information: beamFailureRecoveryTimer (a time that the beam failure recovery may be completed; if the beam failure recovery is not completed within the timer operation, the beam failure recovery is unsuccessful); ssb-Threshold, csi-Threshold: Threshold value for selecting a beam to be recovered in the beam failure recovery; and bft-ResponseWindow: Time window for receiving a response to the preamble in the non-contention based beam failure recovery.

Thereafter, the terminal may transmit and receive data to and from the base station through the beam used in a frequency band (part) in which the terminal and the base station currently operate (1h-05) and then detect the beam failure due to movement of the terminal (1h-07). The UE that senses the beam failure drives beamFailureRecoveryTimer and first selects the beam corresponding to the best signal among the beams having a larger received signal than the ssb-Threshold or csi-Threshold which is the threshold value set by the base station among signals transmitted by the base station (1h-09). This is referred to as Embodiment 1-1. Alternatively, the random access preamble identifier for recovering the beam failure in case of the beam failure, which will be described later, among the beams transmitted by the base station may be allocated and/or the beam corresponding to the best signal may be first selected among the beams having the larger received signal than the ssb-Threshold or csi-Threshold which is the threshold value set by the base station only for a beam which is allocated with a separate random access transmission resource on the time/frequency (1h-09). This is referred to as Embodiment 1-2.

For example, a scenario may be considered, in which when among 8 beams (beam 1, beam 2, . . . , beam 8) of the base station, a dedicated resource is configured set in step (1h-03) for beam 1 to beam 4 in the base station and the dedicated resource is not configured for beam 5 to beam 8, the terminal determines a beam which exceeding the threshold value and when only beam 3 and beam 7 satisfy a condition, a signal of beam 7 is better than the signal of beam 3. In this case, according to Embodiment 1-1, beam 7 is selected and according to Embodiment 1-2, the signal of beam 7 is better, but beam 3 is selected and recovered to perform quick recovery.

The reference signal may be a synchronization reference signal (SS) transmitted by the base station for synchronization, or may be a channel state information reference signal (CSI-RS) for measuring a channel state.

When there is a dedicated resource configured in step (1h-03) in the beam (or an SS block (a set of the SS and a basic system information block)) selected in step (1h-09), the terminal performs the above-described Type 1 BFR operation (1h-13) and if not (that is, when there is no configured dedicated resource), the terminal performs the Type 2 BFR operation (1h-14).

When the selected BFR type is Type 1 (i.e., FIG. 1E), if the terminal transmits the preamble to the corresponding cell (1e-21) and does not receive the PDCCH within bft-ResponseWindow (1e-23) (1e-25), the terminal repeats the operation until the random access is successful through step (1h-09) of selecting the beam again or until the beamFailureRecoveryTimer expires.

When the selected BFR type is Type 2 (i.e., FIG. 1F), the operation is repeated until the random access is successful or until the beamFailureRecoveryTimer expires according to the maximum number of random access transmission times.

When the preamble is transmitted in the operations, the terminal may directly transmit the preamble to SCell. This is to inform the base station of a cell in which the beam failure occurs by the terminal.

When the random access is successfully completed until the beamFailureRecoveryTimer expires (1h-15), the beam failure recovery is regarded as successful and the beamFailureRecoveryTimer timer is stopped and the preamble used for the beam failure recovery is maintained as it is (1h-17). This is to use the existing configured dedicated resource again without reconfiguration by the base station when the beam failure occurs again afterwards.

However, when the beamFailureRecoveryTimer expires or the random access is unsuccessful due to arrival of the maximum number of random access transmission times before the beamFailureRecoveryTimer expires, the terminal discards the dedicated preamble resource and the identifier configured for the Type 1 BFR (1h-19). This is to prevent the resource in which the beam recovery is already unsuccessful from being used again.

Thereafter, a different operation is performed according to the type of cell in which the beam failure occurs (1h-21). The UE may be configured with and use a plurality of cells of one base station and this is called a carrier aggregation technique. In this case, a primary cell is referred to as PCell and a secondary cell is referred to as SCell. Moreover, the terminal may be configured with and use the cells from two base stations and this is called a dual connectivity technique. When the cell in which the beam failure currently occurs is PCell, it is regarded that a radio link failure occurs and a neighboring cell having a largest signal is selected to re-establish the connection to the corresponding cell. When the cell in which the beam failure occurs is PSCell (i.e., a representative cell of not a main base station but a sub main station in a multiple connection technique (a technique of simultaneously using two base stations)), it is reported to the main base station that a problem occurs in the sub base station. When the cell in which the beam failure currently occurs is SCell, the terminal may transmit a message reporting that the beam failure recovery is unsuccessful to the representative cell (i.e., PCell or PSCell) of the corresponding SCell (1g-35). This is to allow the base station to release the corresponding SCell or PSCell, or to recover and re-establish the corresponding SCell or PSCell to normalize the connection.

Figure 1I:
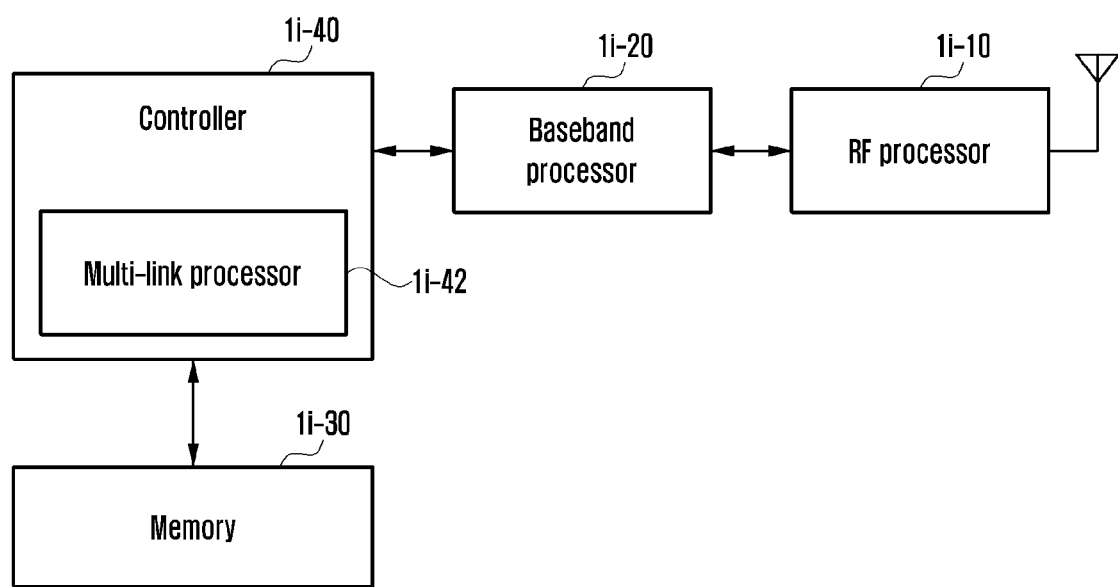
FIG. 1I is a diagram illustrating a block configuration of the terminal according to embodiments of the present disclosure.

FIG. 1I is a diagram illustrating a block configuration of the terminal according to embodiments of the present disclosure.

Referring to FIG. 1I, the terminal includes a radio frequency (RF) processor 1i-10, a baseband processor 1i-20, a memory 1i-30, and a controller 1i-40.

The RF processor 1i-10 serves to transmit and receive a signal through a radio channel, such as band conversion and amplification of a signal. That is, the RF processor 1i-10 up-converts a baseband signal provided from the baseband processor 1i-20 into an RF band signal and then transmits the RF band signal through an antenna and down-converts the RF band signal received through the antenna into the baseband signal. For example, the RF processor 1i-10 may include a transmitting filter, a receiving filter, an amplifier, a mixer, an oscillator, a digital to analog converter (DAC), an analog to digital converter (ADC), or the like. FIG. 1I illustrates only one antenna but the terminal may include a plurality of antennas. Further, the RF processor 1i-10 may include a plurality of RF chains. Further, the RF processor 1i-10 may perform beamforming. For the beamforming, the RF processor 1i-10 may adjust a phase and a size of each of the signals transmitted and received through a plurality of antennas or antenna elements.

The baseband processor 1i-20 performs a conversion function between a baseband signal and a bit string according to a physical layer standard of a system. For example, when data are transmitted, the baseband processor 1i-20 generates complex symbols by coding and modulating a transmitted bit string. Further, when data are received, the baseband processor 1i-20 recovers the received bit string by demodulating and decoding the baseband signal provided from the RF processor 1i-10. For example, according to the orthogonal frequency division multiplexing (OFDM) scheme, when data are transmitted, the baseband processor 1i-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 1i-20 divides the baseband signal provided from the RF processor 1i-10 in an OFDM symbol unit and recovers the signals mapped to the sub-carriers by a fast Fourier transform (FFT) operation and then recovers the received bit string by the modulation and decoding.

The baseband processor 1i-20 and the RF processor 1i-10 transmit and receive a signal as described above. Therefore, the baseband processor 1i-20 and the RF processor 1i-10 may be called a transmitter, a receiver, a transceiver, or a communication unit. Further, at least one of the baseband processor 1i-20 and the RF processor 1i-10 may include different communication modules to process signals in different frequency bands. Further, different frequency bands may include a super high frequency (SHF) (for example: 2.5 GHz, 5 GHz) band, a millimeter wave (for example: 60 GHz) band.

The memory 1i-30 stores data such as basic programs, application programs, and configuration information for the operation of the terminal.

The controller 1i-40 controls the overall operations of the terminal. For example, the controller 1i-40 transmits and receives a signal through the baseband processor 1i-20 and the RF processor 1i-10. Further, the controller 1i-40 records and reads data in and from the memory 1i-30. For this purpose, the controller 1i-40 may include at least one processor. For example, the controller 1i-40 may include a communication processor (CP) performing a control for communication and an application processor (AP) controlling an upper layer such as the application programs. According to the embodiment of the disclosure, the controller 1i-40 includes a multi-link processor 1i-42 that performs the processing to be operated in a multi-link mode. For example, the controller 1f-40 may control the terminal to perform the procedure illustrated in the operation of the terminal illustrated in FIG. 1F.

When receiving the beam failure indicator from the RF processor and the baseband processor of the terminal, the controller 1i-40 of the terminal according to the embodiment of the disclosure selects a beam according to the parameter set from the base station and selects a beam failure recovery method with the selected beam to perform recovery according to the selected beam failure recovery method.

The methods according to the embodiments described in claims or specification of the disclosure may be implemented in hardware, software, or a combination of hardware and software.

When the methods are implemented in the software, a computer readable storage medium storing at least one program (software module) may be provided. At least one programs stored in the computer readable storage medium is configured for execution by at least one processor within an electronic device. At least one program includes instructions that allow the electronic device to execute the methods according to the embodiments described in the claims or specification of the disclosure.

The program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other types of optical storage devices, and a magnetic cassette. Alternatively, the programs may be stored in the memory that is configured of combinations of some or all of the memories. Further, each configuration memory may also be included in plural.

Further, the program may be stored in an attachable storage device that may be accessed through communication networks such as Internet, an intranet, a local area network (LAN), a wide LAN (WLAN), and a storage area network (SAN) or a communication network configured in a combination thereof. The storage device may access a device performing the embodiment of the disclosure through an external port. Further, a separate storage device on the communication network may also access the apparatus performing the embodiment of the disclosure.

In the detailed embodiments of the disclosure, components included in the disclosure are represented by a singular number or a plural number according to the detailed embodiment as described above. However, the expressions of the singular number or the plural number are selected to meet the situations proposed for convenience of explanation and the disclosure is not limited to the single component or the plural components and even though the components are represented in plural, the component may be configured in a singular number or even though the components are represented in a singular number, the component may be configured in plural.

While the disclosure has been described in connection with the exemplary embodiments thereof, various modifications and variations can be made without departing from the scope of the disclosure. Therefore, the scope of the disclosure should be not construed as being limited to the described exemplary embodiments but be defined by the appended claims as well as equivalents thereto.

Second Embodiment

Generally, a mobile communication system has been developed to provide communication while securing mobility of a user. The mobile communication system may provide a voice communication service and a high-speed data communication service by virtue of the rapid progress of technologies. In such a wireless mobile communication system, the terminal frequently receives services intermittently rather than continuously receiving services for a long period of time. Therefore, when the terminal always receives and confirms the signal of the base station continuously, power of the terminal will be consumed quickly. Therefore, it is very important to reduce such power consumption. As a result, the terminal is made to transition from an RRC connected mode to an RRC idle mode to be in the standby mode. However, many signaling procedures are required until the terminal is in the standby mode and then is switched back to the RRC connected mode.

Therefore, in a next generation mobile communication system, it is possible to define a RRC inactive mode or a lightly-connected mode to shorten the signaling procedure and enable quick connection and save UE power like the standby mode, However, there is a need for an efficient method to switch from the RRC connected mode to the RRC inactive mode (or lighted connected mode). As described above, in the RRC inactive mode, a battery of the terminal is saved, and the terminal may configure the quick connection with small signaling overhead when connecting to the network, An RRC message transmission method and procedure required for transmitting/receiving an RRC message by the terminal in the RRC inactive mode with respect to various cases needs to be defined. In the above description, various cases may correspond to a procedure in which the network switches the terminal to the RRC inactive mode/RRC idle mode/RRC connected mode, a procedure for a case where the network/base station fails to confirm a terminal context for a corresponding UE identifier when the terminal in the RRC inactive mode attempts the connection with the terminal identifier, a procedure of reporting to a core network whether to support the RRC inactive mode of the terminal and the base station.

Hereinafter, an operation principle of the disclosure will be described in detail with reference to the accompanying drawings. Hereinafter, when it is determined that the detailed description of the known art related to the disclosure may obscure the gist of the disclosure, the detailed description thereof will be omitted. Further, the following terminologies are defined in consideration of the functions in the disclosure and may be construed in different ways by the intention or practice of users and operators. Therefore, the definitions thereof should be construed based on the contents throughout the specification.

Hereinafter, if it is determined that the detailed description of the known art related to the disclosure may obscure the gist of the disclosure, the detailed description thereof will be omitted. Hereinafter, embodiments of the disclosure will be described in detail with reference to the accompanying drawings.

Terms identifying an access node, terms indicating network entity, terms indicating messages, terms indicating an interface between network entities, terms indicating various types of identification information, and so on that are used in the following description are exemplified for convenience of explanation. Accordingly, the disclosure is not limited to terms to be described below and other terms indicating objects having the equivalent technical meaning may be used.

Hereafter, for convenience of explanation, the disclosure uses terms and names defined in the 3rd generation partnership project long term evolution (3GPP LTE). However, the disclosure is not limited to the terms and names but may also be identically applied even to the system according to other standards. In the disclosure, eNB can be used in combination with a gNB for convenience of explanation. That is, a base station described by the eNB may represent the gNB.

Figure 2A:
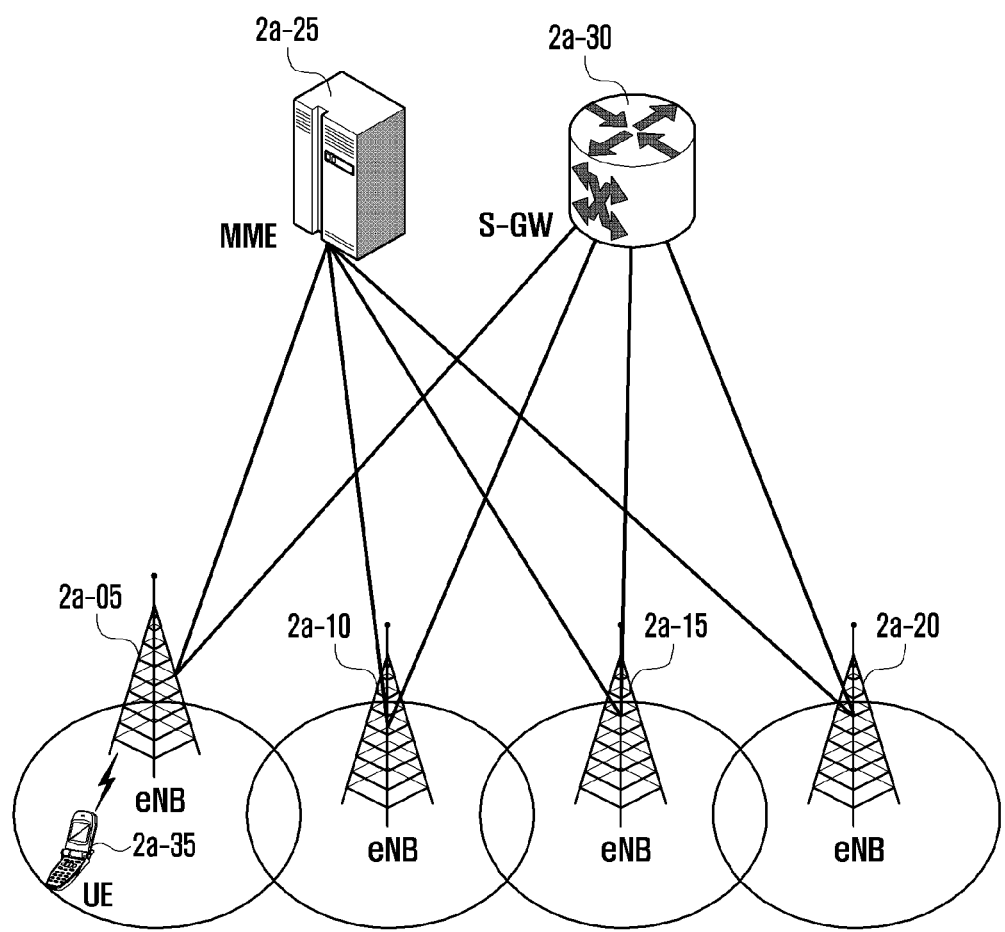
FIG. 2A is a diagram illustrating a structure of an LTE system according to embodiments of the present disclosure.

FIG. 2A is a diagram illustrating a structure of an LTE system according to embodiments of the present disclosure.

As illustrated in FIG. 2A, a radio access network of an LTE system is configured to include next generation base stations (evolved node B, hereinafter, ENB, Node B, or base station) 2a-05, 2a-10, 2a-15, and 2a-20, a mobility management entity (MME) 2a-25, and a serving-gateway (S-GW) 2a-30. User equipment (hereinafter, UE or terminal) 2a-35 accesses an external network through the ENBs 2a-05 to 2a-20 and the S-GW 2a-30.

In FIG. 2A, the ENBs 2a-05 to 2a-20 correspond to the existing node B of the UMTS system. The ENB is connected to the UE 2a-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel status of the terminals is required. Here, the eNBs 2a-05 to 2a-20 take charge of the collecting and scheduling. One ENB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation and coding (hereinafter, referred to as AMC) determining a modulation scheme and a channel coding rate according to a channel status of the terminal is applied. The S-GW 2a-30 is an apparatus for providing a data bearer and generates or removes the data bearer according to the control of the MME 2a-25. The MME is an apparatus for performing a mobility management function for the terminal and various control functions and is connected to a plurality of base stations.

Figure 2B:
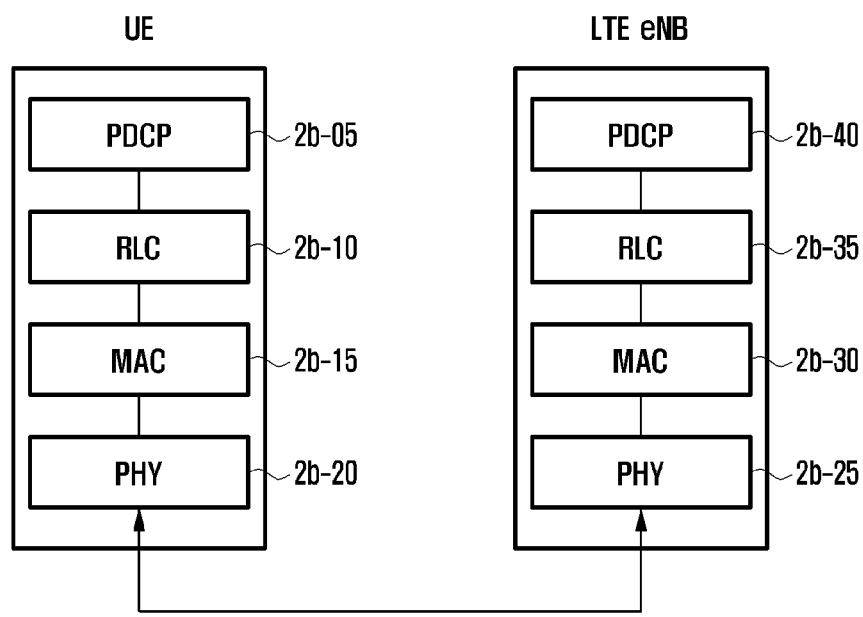
FIG. 2B is a diagram illustrating a radio protocol structure in the LTE system according to embodiments of the present disclosure.

FIG. 2B is a diagram illustrating a radio protocol structure in the LTE system according to embodiments of the present disclosure.

Referring to FIG. 2B, the radio protocol of the LTE system is configured to include packet data convergence protocols (PDCPs) 2b-05 and 2b-40, radio link controls (RLCs) 2b-10 and 2b-35, and medium access controls (MMCs) 2b-15 and 2b-30, respectively, in the terminal and the ENB, respectively. The packet data convergence protocols (PDCPs) 2b-05 and 2b-40 are in charge of operations such as IP header compression/decompression. The main functions of the PDCP are summarized as follows: header compression and decompression function (header compression and decompression: ROHC only); transfer function of user data (transfer of user data); in-sequence delivery function (in-sequence delivery of upper layer PDUs at PDCP re-establishment procedure for RLC AM); reordering function (For split bearers in DC (only support for RLC AM): PDCP PDU routing for transmission and PDCP PDU reordering for reception); duplicate detection function (duplicate detection of lower layer SDUs at PDCP re-establishment procedure for RLC AM); retransmission function (retransmission of PDCP SDUs at handover and, for split bearers in DC, of PDCP PDUs at PDCP data-recovery procedure, for RLC AM); ciphering and deciphering function (Ciphering and deciphering); and timer-based SDU discard function (Timer-based SDU discard in uplink).

The radio link controls (hereinafter, referred to as RLCs) 2b-10 and 2b-35 reconfigures the PDCP packet data unit (PDU) to an appropriate size to perform the ARQ operation or the like. The main functions of the RLC are summarized as follows: data transfer function (Transfer of upper layer PDUs); ARQ function (Error Correction through ARQ (only for AM data transfer)); concatenation, segmentation, reassembly functions (concatenation, segmentation and reassembly of RLC SDUs (only for UM and AM data transfer)); re-segmentation function (re-segmentation of RLC data PDUs (only for AM data transfer)); reordering function (reordering of RLC data PDUs (only for UM and AM data transfer); duplicate detection function (duplicate detection (only for UM and AM data transfer)); error detection function (Protocol error detection (only for AM data transfer)); RLC SDU discard function (RLC SDU discard (only for UM and AM data transfer)); and RLC re-establishment function (RLC re-establishment).

The MACs 2b-15 and 2b-30 are connected to several RLC layer entities configured in one terminal and perform an operation of multiplexing RLC PDUs into an MAC PDU and demultiplexing the RLC PDUs from the MAC PDU. The main functions of the MAC are summarized as follows: mapping function (mapping between logical channels and transport channels); multiplexing/demultiplexing function (multiplexing/demultiplexing of MAC SDUs belonging to one or different logical channels into/from transport blocks (TB) delivered to/from the physical layer on transport channels); scheduling information reporting function (scheduling information reporting); HARQ function (error correction through HARQ); priority handling function between Logical channels (priority handling between logical channels of one UE); priority handling function between terminals (priority handling between UEs by means of dynamic scheduling); MBMS service identification function (MBMS service identification); transport format selection function (transport format selection); and padding function (padding).

Physical layers 2b-20 and 2b-25 perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 2C:
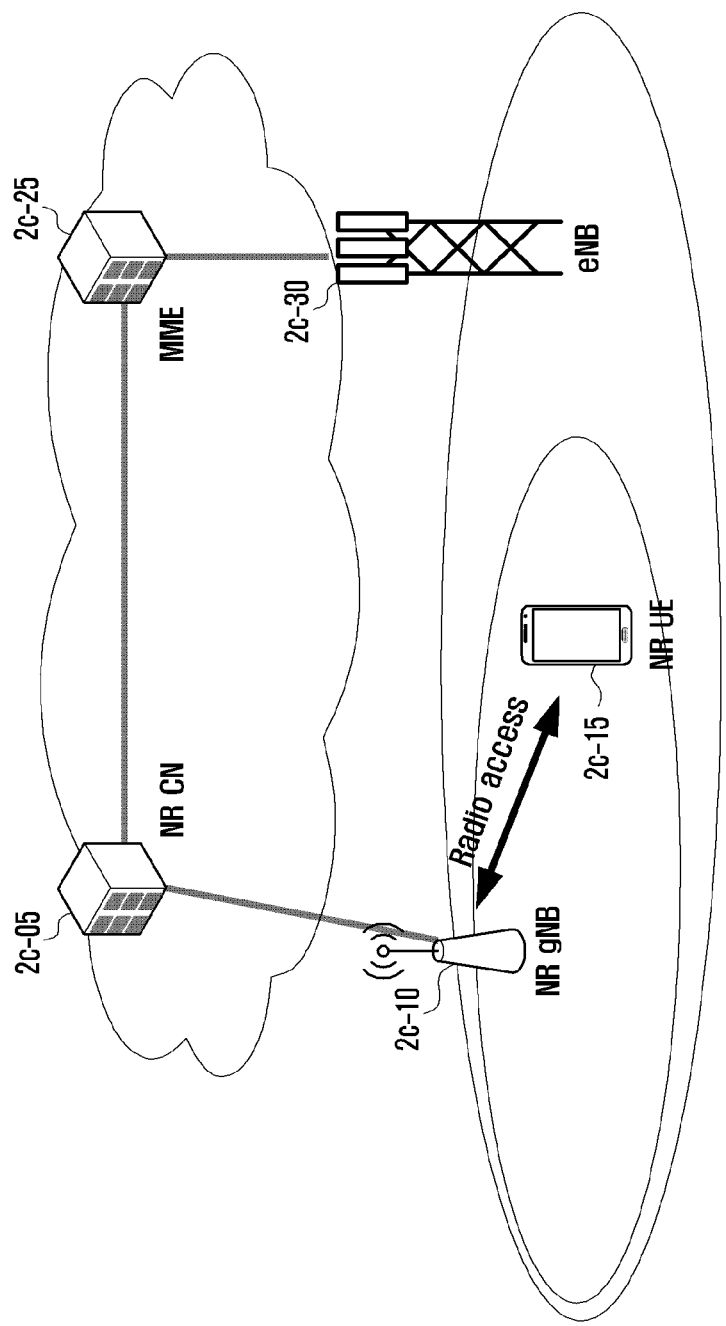
FIG. 2C is a diagram illustrating a structure of a next generation mobile communication system according to embodiments of the present disclosure.

FIG. 2C is a diagram illustrating a structure of a next generation mobile communication system according to embodiments of the present disclosure.

Referring to FIG. 2C, a radio access network of a next generation mobile communication system (hereinafter referred to as NR or 2G) is configured to include a next generation base station (New radio node B, hereinafter NR gNB or NR base station) 2c-10 and a new radio core network (NR CN) 2c-05. The user terminal (new radio user equipment, hereinafter, NR UE or UE) 2c-15 accesses the external network through the NR gNB 2c-10 and the NR CN 2c-05.

In FIG. 2C, the NR gNB 2c-10 corresponds to an evolved node B (eNB) of the existing LTE system. The NR gNB is connected to the NR UE 2c-15 via a radio channel and may provide a service superior to the existing node B. In the next generation mobile communication system, since all user traffics are served through a shared channel, an apparatus for collecting state information such as a buffer state, an available transmission power state, and a channel state of the UEs to perform scheduling is required. The NR NB 2c-10 may serve as the device. One NR gNB generally controls a plurality of cells. In order to realize high-speed data transmission compared with the current LTE, the NR gNB may have an existing maximum bandwidth or more, and may be additionally incorporated into a beam-forming technology may be applied by using orthogonal frequency division multiplexing (hereinafter, referred to as OFDM) as a radio access technology.

Further, an adaptive modulation and coding (hereinafter, referred to as AMC) determining a modulation scheme and a channel coding rate according to a channel status of the terminal is applied. The NR CN 2c-05 may perform functions such as mobility support, bearer setup, QoS setup, and the like. The NR CN is an apparatus for performing a mobility management function for the terminal and various control functions and is connected to a plurality of base stations. In addition, the next generation mobile communication system can interwork with the existing LTE system, and the NR CN is connected to the MME 2c-25 through the network interface. The MME is connected to the eNB 2c-30 which is the existing base station.

Figure 2D:
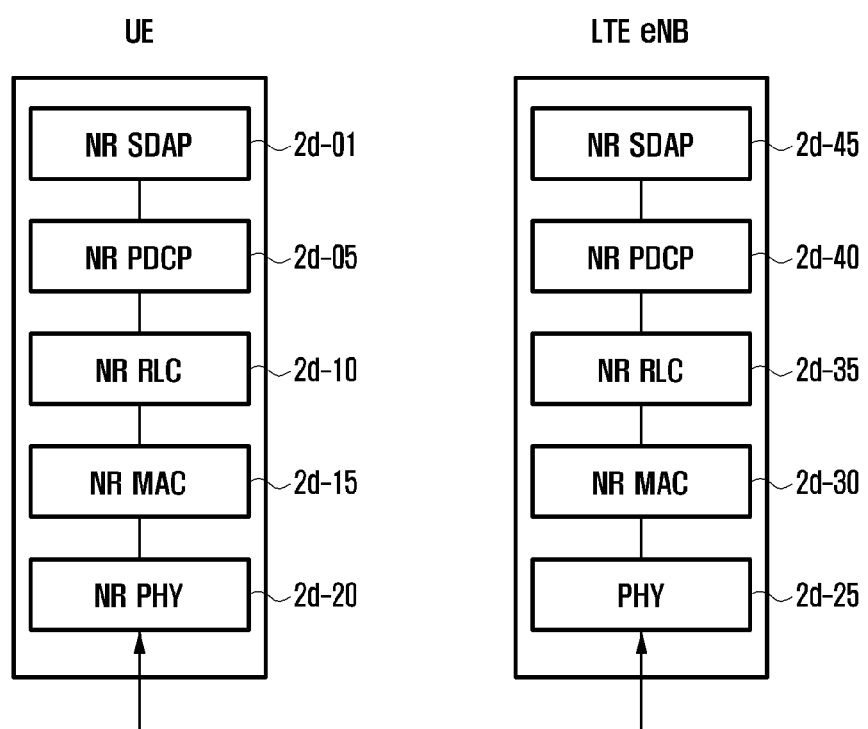
FIG. 2D is a diagram illustrating a radio protocol structure of the next generation mobile communication system according to embodiments of the present disclosure.

FIG. 2D is a diagram illustrating a radio protocol structure of the next generation mobile communication system according to embodiments of the present disclosure.

Referring to FIG. 2D, the radio protocol of the next generation mobile communication system is configured to include NR SDAPs 2d-01 and 2d-45, NR PDCPs 2d-05 and 2d-40, and NR RLCs 2d-10 and 2d-35, and NR MACs 2d-15 and 2d-30 in the terminal and the NR base station.

The main functions of the NR SDAPs 2d-01 and 2d-45 may include some of the following functions: transfer function of user data (transfer of user plane data); mapping between a QoS flow and a DRB for both DL and UL; marking QoS flow ID in both DL and UL packets; and reflective QoS flow to DRB mapping for the UL SDAP PDUs.

For an SDAP layer device, the terminal may be configured whether to use a header of the SDAP layer device or to use a function of the SDAP layer device function for each PDCP layer device, bearer or logical channel in the RRC message and when an SDAP header is configured, the terminal may be instructed to update or reconfigure mapping information for uplink and downlink QoS flows and a data bearer with an NAS reflective QoS 1-bit indicator and an AS reflective QoS 1-bit indicator of the SDAP header. The SDAP header may include QoS flow ID information indicating QoS. The QoS information may be used as a data processing priority, scheduling information, and the like for supporting a smooth service.

The main functions of the NR PDCPs 2d-05 and 2d-40 may include some of the following functions: header compression and decompression function (header compression and decompression: ROHC only); transfer function of user data (transfer of user data); in-sequence delivery function (in-sequence delivery of upper layer PDUs); out-of-sequence delivery function (out-of-sequence delivery of upper layer PDUs); reordering function (PDCP PDU reordering for reception); duplicate detection function (duplicate detection of lower layer SDUs); retransmission function (retransmission of PDCP SDUs); ciphering and deciphering function (ciphering and deciphering); and timer-based SDU discard function (timer-based SDU discard in uplink).

In this case, the reordering function of the NR PDCP entity refers to a function of rearranging PDCP PDUs received in a lower layer in order based on a PDCP sequence number (SN) and may include a function of delivering data to an upper layer in the rearranged order, a function of directly transferring data without considering an order, a function of recording PDCP PDUs lost by rearranging an order, a function of reporting a state of the lost PDCP PDUs to a transmitting side, and a function of requesting a retransmission of the lost PDCP PDUs.

The main functions of the NR RLCs 2d-10 and 2d-35 may include some of the following functions: data transfer function (transfer of upper layer PDUs); in-sequence delivery function (in-sequence delivery of upper layer PDUs); out-of-sequence delivery function (out-of-sequence delivery of upper layer PDUs); ARQ function (error correction through HARQ); concatenation, segmentation, reassembly function (concatenation, segmentation and reassembly of RLC SDUs); re-segmentation function (re-segmentation of RLC data PDUs); reordering function (reordering of RLC data PDUs); duplicate detection function (duplicate detection); error detection function (protocol error detection); RLC SDU discard function (RLC SDU discard); and RLC re-establishment function (RLC re-establishment).

In the above description, the in-sequence delivery function of the NR RLC apparatus refers to a function of delivering RLC SDUs received from a lower layer to an upper layer in order, and may include a function of reassembling and delivering an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of delivering only the SLC SDUs before the lost RLC SDU to the upper layer in order when there is the lost RLC SDU, a function of delivering all the received RLC SDUs to the upper layer before a predetermined timer starts if the timer expires even if there is the lost RLC SDU, or a function of delivering all the RLC SDUs received until now to the upper layer in order if the predetermined timer expires even if there is the lost RLC SDU.

Further, the NR RLC may process the RLC PDUs in the received order (in order of arrival regardless of the order of a sequence number and the sequence number), and may deliver the processed RLC PDUs to the PDCP entity the out-of-sequence delivery. In the case of the segment, the NR RLC may receive the segments which are stored in the buffer or is to be received later and reconfigure the RLC PDUs into one complete RLC PDU and then deliver the complete RLC PDU to the PDCP entity. The NR RLC layer may not include the concatenation function and may perform the function in the NR MAC layer or may be replaced by the multiplexing function of the NR MAC layer.

In this case, the out-of-sequence delivery function of the NR RLC apparatus refers to a function of directly delivering the RLC SDUs received from the lower layer to the upper layer regardless of order.

The NR MACs 2d-15 and 2d-30 may be connected to several NR RLC layer apparatus configured in one terminal, and the main functions of the NR MAC may include some of the following functions: mapping function (mapping between logical channels and transport channels); multiplexing and demultiplexing function (multiplexing/demultiplexing of MAC SDUs); scheduling information reporting function (scheduling information reporting); HARQ function (error correction through HARQ); priority handling function between logical channels (priority handling between logical channels of one UE); priority handling function between terminals (priority handling between UEs by means of dynamic scheduling); MBMS service identification function (MBMS service identification); transport format selection function (transport format selection); and padding function (padding).

The NR PHY layers 2d-20 and 2d-25 may perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 2E:
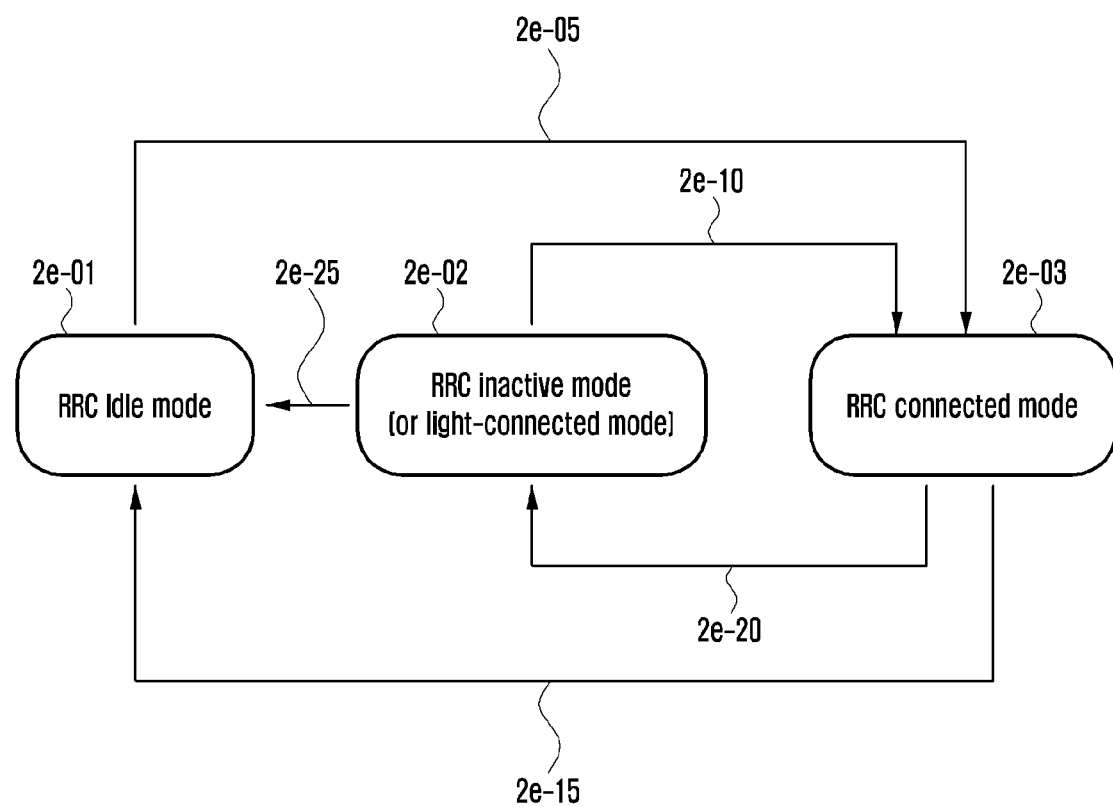
FIG. 2E is a diagram illustrating modes in which the terminal can stay in the next generation mobile communication system according to embodiments of the present disclosure.

FIG. 2E is a diagram illustrating modes in which the terminal can stay in the next generation mobile communication system according to embodiments of the present disclosure.

In FIG. 2E, the terminal may stay in the RRC connected mode (2e-03), the RRC inactive mode (2e-02) or the light connected mode (2e-02), and the RRC idle mode (2e-01) and go through processes of switching to different modes (2e-05, 2e-10, 2e-15, 2e-20, and 2e-25). That is, the terminal in the RRC idle mode (2e-01) may be switched to the RRC connected mode (2e-03) when there are data to be transmitted in the uplink or the terminal receives a paging message due to the arrival of the downlink data or in order to transmit and receive data by establishing the connection with the network to update a tracking area (periodically or when the terminal deviates from the tracking area) (2e-05).

When data is not generated for a predetermined period of time after data transmission/reception, the terminal in the RRC connected mode may be switched to the RRC idle mode by the network (2e-15), When data is not generated for a predetermined period of time, the terminal in the RRC connected mode (2e-03) switches the mode to the RRC inactive mode (2e-02) by the network or by itself for the purpose of battery saving and quick connection (2e-20), The terminal in the RRC inactive mode (2e-03) may be switched to the RRC connected mode (2e-03) when there are data to be transmitted in the uplink or the terminal receives the paging message due to the arrival of the downlink data or in order to transmit and receive data by establishing the connection with the network to update a tracking area (or a RAN notification area) (periodically or when the terminal deviates from the tracking area (or RAN notification area) (2e-10).

The terminal in the RRC inactive mode (2e-03) may transition to the RRC idle mode (2e-01) by the instruction of the network or according to a predetermined configuration or by itself (2e-25). In the above description, when there are a lot of UEs in the RRC inactive mode in the network, the signaling overhead of the network may increase due to a frequent RAN notification area update procedure, and as a result, the transition is an operation which needs to be supported because.

A terminal having a predetermined purpose may transmit data even in the RRC inactive mode (2e-03) without transiting to the RRC connected mode and may repeatedly perform transition between the RRC inactive mode and the RRC idle mode according to the instruction of the network and perform transition to the RRC connected mode only when necessary. In the above procedure, the terminal in the RRC inactive mode has the advantage that the terminal may have a very short transmission delay by transmitting data in the RRC inactive mode and have very little signaling overhead. In the above description, the predetermined purpose may correspond to a case of a terminal that transmits data periodically, intermittently or with a very long period, when the terminal attempts to transmit only a small amount of data. Further, the terminal in the RRC idle mode (2e-01) may directly transition to the RRC inactive mode (2e-03) by the network and may transition to the RRc connected mode and then, transition to the RRC inactive mode (2e-03 and 2e-20).

In order to solve a state mismatch problem between the mode of the terminal and the mode of the terminal recognized by the network when the terminal performs the transition between the modes, an additional timer may be configured and driven in the terminal. Further, the base station may also drive an additional timer.

In the disclosure, the RRC inactive mode and the light connected mode may be interpreted as the modes of the same state and it may be assumed that the terminal performs the same operation. Further, in the disclosure, the RRC inactive mode and the light connected mode may be interpreted as the modes of the same state, but it may be assumed that the terminal performs different operations in respective modes. Further, in the disclosure, the RRC inactive mode and the light connected mode may be interpreted as the modes of different states and it may be assumed that the terminal performs different operations in the respective modes. The RRC inactive mode and the light connected mode have the same purpose in that both modes may perform quick reconnection with a small signaling and save the battery, but both modes may be the same mode or different modes according to implementation of the terminal and the network or according to a definition. In addition, the operations of the terminal in the RRC inactive mode and the light connected mode may be the same as the operation in the RRC idle mode or may have an additional function or may have only some functions during the operation in the RRC idle mode.

As described above, in the RRC inactive mode, a battery of the terminal is saved, and the terminal may configure the quick connection with small signaling overhead when connecting to the network, However, the terminal in the RRC inactive mode may perform a procedure of updating the RAN Notification area more frequently than the procedure in which the terminal in the RRC idle mode periodically updates the tracking area. Therefore, when there are a large number of UEs in the RRC inactive mode in the network, the signaling overhead due to the periodic RAN notification area update procedure may be caused, and as a result, the network may be able to manage the terminals in the RRC inactive mode and switch the terminals in the RRC inactive mode to the RRC idle mode if necessary.

Figure 2F:
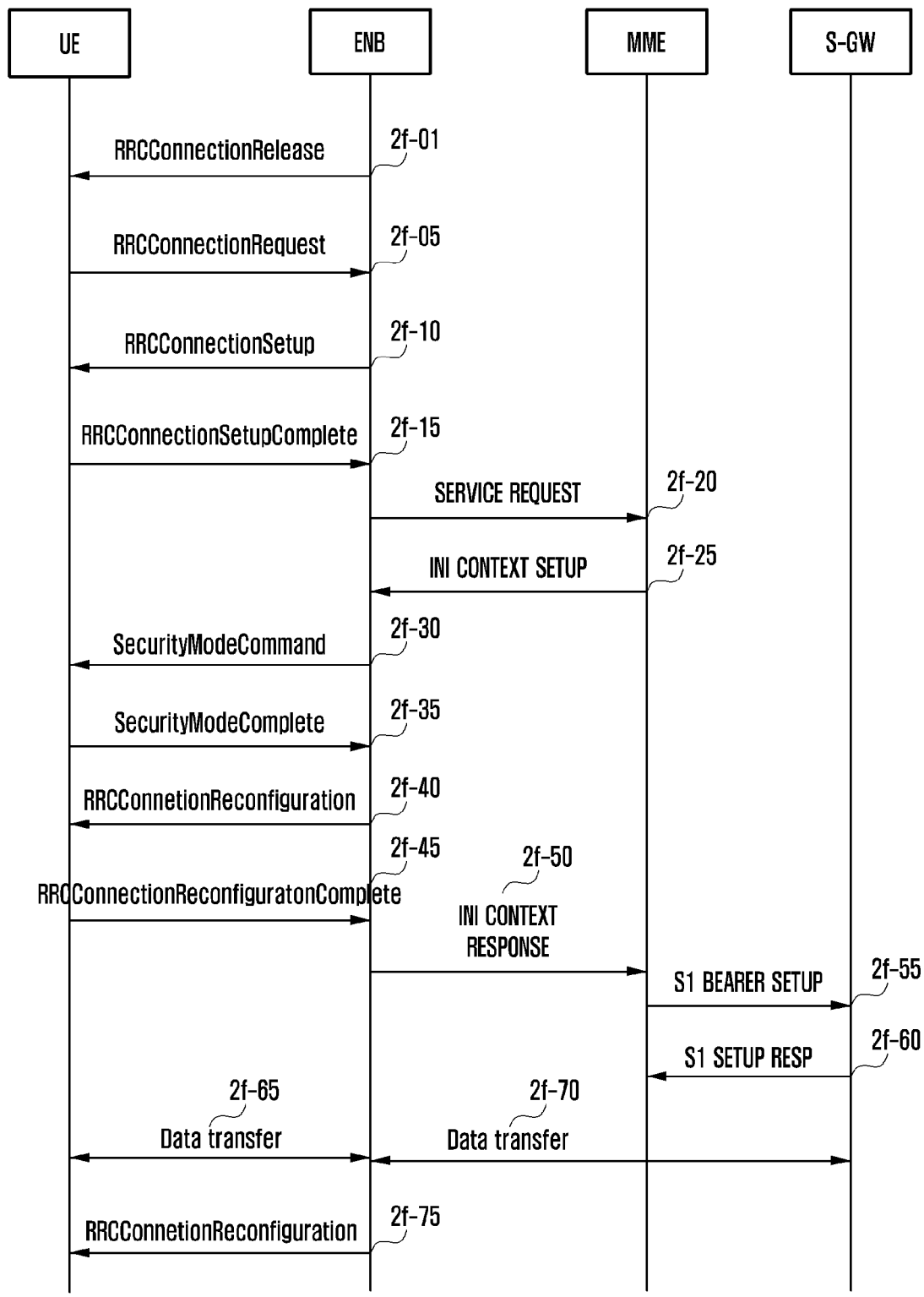
FIG. 2F is a diagram for explaining a procedure for switching a terminal from an RRC connected mode to an RRC idle mode and a procedure for switching a terminal from the RRC idle mode to the RRC connected mode according to embodiments of the present disclosure.

FIG. 2F is a diagram for explaining a procedure for switching a terminal from an RRC connected mode to an RRC idle mode and a procedure for switching from the RRC idle mode to the RRC connected mode according to embodiments of the present disclosure.

In FIG. 2F, the base station can transmit an RRCConnectionRelease message to the terminal if the terminal transmitting and receiving data in the RRC connected mode does not transmit or receive data for a predetermined reason or for a predetermined time to switch the terminal to RRC idle mode (2f-01). If the terminal (hereinafter, idle mode UE) that is not currently connected generates data to be transmitted later, the terminal performs an RRC connection setup procedure with the base station. The terminal establishes uplink transmission synchronization with the base station through a random access procedure and transmits an RRC-ConnectionRequest message to the base station (2f-05). The message includes establishmentCause of connection with the identifier of the terminal. The base station transmits an RRCConnectionSetup message to allow the terminal to set the RRC connection (2f-10).

The RRCConnectionSetup message includes the RRC connection configuration information, etc. The RRC connection is also called a signaling radio bearer (SRB) and is used for transmission and reception of the RRC message that is a control message between the terminal and the base station. The terminal establishing the RRC connection transmits an RRCConnetionSetupComplete message to the base station (2f-15). The message includes a control message called a service request that that allows the terminal to request a bearer setup for a predetermined service to the MIME. The BS transmits a service request message included in the RRCConnectionSetupComplete message to the MME (2f-20) and the MME determines whether to provide the service the UE requests As the determination result, if the MME decides to provide the service that the UE requests, the MME transmits an initial context setup request message to the BS (2f-25). The initial context setup request message may include information such as quality of service (QoS) information to be applied when setting up a data radio bearer (DRB) and security related information (e.g., security key, security algorithm) to be applied to the DRB. The BS exchanges a SecurityModeCommand) message 2f-30 and a SecurityModeComplete message 2f-35 with the terminal to establish security.

When the security establishment is completed, the base station transmits an RRCConnectionReconfiguration message to the UE (2f-40). The message includes the configuration information of the DRB in which user data are processed, and the UE applies the information to setup the DRB and transmits an RRCConnectionReconfiguration-Complete message to the BS (2f-45). The base station that completes the DRB setup with the terminal transmits an initial context setup complete message to the MME (2f-50) and the MME receiving the message exchanges an S1 bearer setup message and an S1 bearer setup response message with the S-GW to setup an S1 bearer (2f-55 and 2f-60). The S1 bearer is a data transmission connection established between the S-GW and the base station and corresponds to a DRB on a one-to-one basis. If all of the procedures are completed, the UE transmits and receives data to and from the BS through the S-GW (2f-65 and 2f-70). As described above, the normal data transmission procedure largely consists of three stages: RRC connection setup, security setup, and DRB setup. In addition, the base station may transmit an RRCConnectionReconfiguration message to renew, add, or change the configuration to the terminal for a predetermined reason (2*f*-75).

As described above, in order to switch from the RRC idle mode to the RRC connected mode, many signaling procedures are required. Therefore, the RRC inactive mode or the light connected mode may be newly defined in the next generation mobile communication system and in the new mode, the terminal and the base station may store the context of the terminal and an S1 bearer may be maintained if possible, and as a result, faster connection is possible with fewer signaling procedures.

Figure 2G:
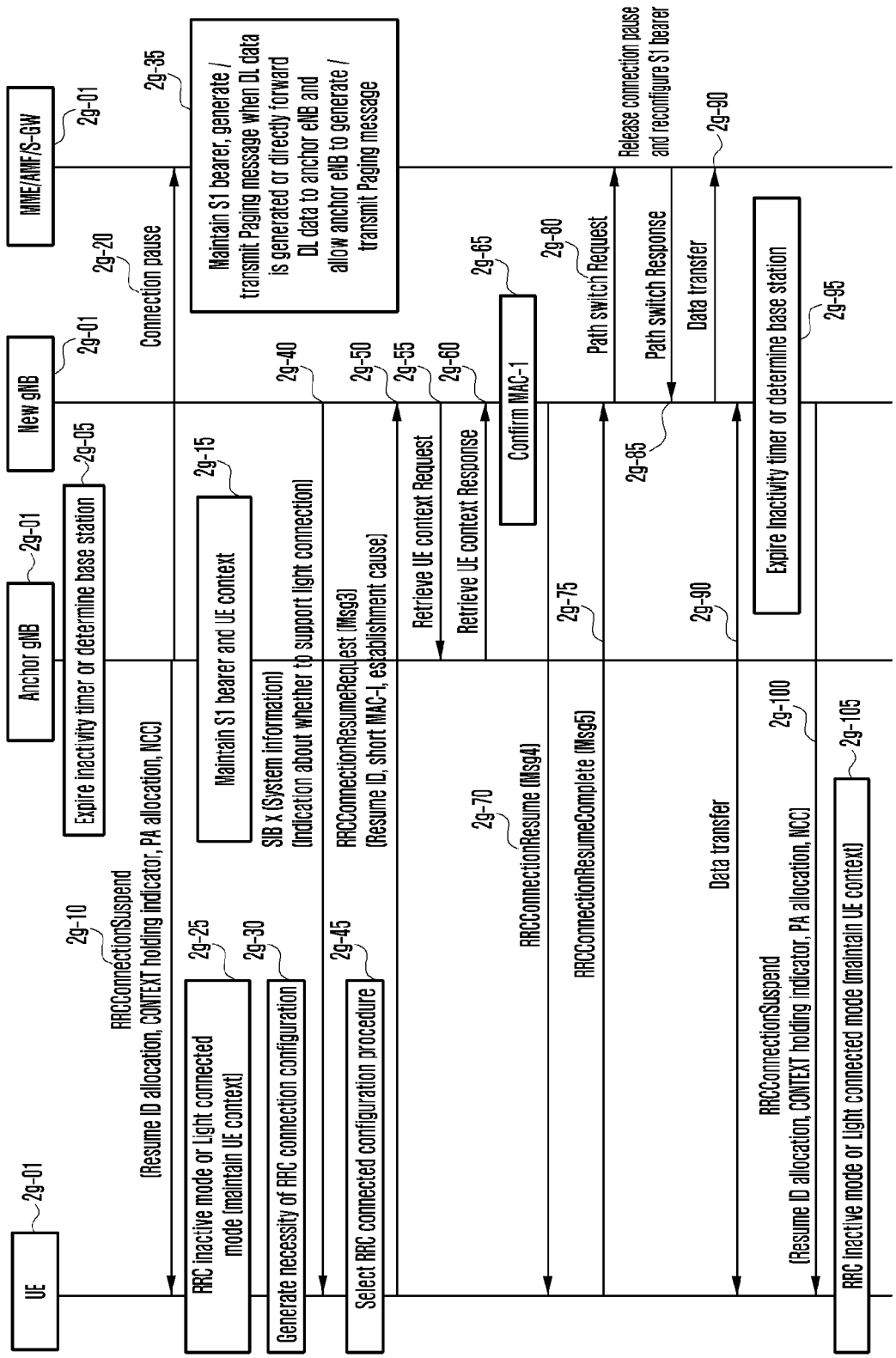
FIG. 2G is a diagram illustrating a procedure for switching a terminal from an RRC connected mode to an RRC inactive mode (or a lightly-connected mode) and a procedure for switching a terminal from an RRC inactive mode (or lightly-connected mode) to an RRC connected mode according to embodiments of the present disclosure.

FIG. 2G is a diagram illustrating a procedure for switching a terminal from an RRC connected mode to an RRC inactive mode (or a lightly-connected mode) and a procedure for switching a terminal from an RRC inactive mode (or lightly-connected mode) to an RRC connected mode according to embodiments of the present disclosure.

FIG. 2G illustrates the overall flow of a terminal 2*g*-01, an anchor eNB 2*g*-02, a new eNB 2*g*-03, and an MME 2*g*-04 so that the terminal and the base station performs the UE context and the S1 bearer. The terminal 2*g*-01 in the RRC connected state performs data transmission/reception with the base station. When data transmission/reception is stopped, the base station drives a predetermined timer and when the data transmission/reception is not resumed until the timer expires (2*g*-05), the base station may consider releasing the RRC connection and the base station may determine whether to send the terminal to the RRC idle mode or the RRC inactive mode according to a predetermined condition.

The predetermined condition may take into account the degree of network traffic, the amount of UE context which may be maintained by the network, the number of UEs for which the network may support the service, etc. In step 2*g*-10, an RRConnectionRelease or RRConnectionSuspend message, a newly defined RRC message, or another existing RRC message may be reused and transmitted in order to send the terminal to the RRC inactive mode or light connected mode. In the 2*g*-10, the base station may release the RRC connection of the terminal according to a predetermined rule, store the UE context, allocate a Resume ID while transmitting a control message instructing the terminal to release the RRC connection, and allow the terminal to establish the paging area (PA) to which the mobility is reported during the light connected mode. In this case, it can be appreciated that the terminal may store the UE context due to the Resume ID allocation. Alternatively, the base station may send the message, including a separate context maintaining indication that indicates to operate the terminal in the RRC inactive mode/light connected mode and to store the UE context, to the terminal (2*g*-10). In addition, the message may include security information for updating a security configuration required when the terminal performs an RRC connection resumption procedure in the future.

For example, NCC (NextHopChainingCount) can be allocated in advance and used to calculate and set a new security key (KeNB* or KgNB*). In addition, the control message may include a list of cells, or the like to which a procedure of using the stored context may be applied, when the BS tries to again setup the RRC connection within the period when the UE context is retained or the expiration date of the UE. The BS releases the RRC connection of the UE and then retains the UE context and the S1 bearer of the UE as they are (2*g*-15). The S1 bearer is called an S1-control bearer used to transmit and receive the control message between the BS and the MME and an S1-user plane bearer used to transmit and receive user data between the BS and the S-GW. By retaining the S1 bearer, it is possible to omit the procedure for S1 bearer setup when the UE tries to setup an RRC connection in the same cell or in the same BS. If the expiration date expires, the BS may delete the UE context and release the S1 bearer. The terminal receiving the RRC connection release message in step 2*g*-10 is switched to the light connected mode.

The fixed base station is a base station that maintains and manages the resume ID of the RRC inactive mode terminal and manages the RAN paging area or the RAN Notification area to manage the mobility of the RRC inactive mode terminal. The role of the fixed base station described above may be performed by access and mobility management function (AMF) apparatus instead.

The base station transmits a control message requesting a connection pause to the MME (2*g*-20). MME that receives the control message may directly deliver the downlink data to a fixed base station when the downlink data for the terminal is generated in S-GW and the fixed base station may generate the paging message and deliver the generated paging message to a neighboring base station (2*g*-35). That is, the anchor eNB receiving the downlink data stores the data in the buffer and performs the paging procedure. The anchor eNB is named the base station that maintains the UE context and the S1-U bearer of the terminal. Alternatively, in the above description, when the fixed base station sends the paging message and there is no response from the terminal, that is, when paging is unsuccessful, the fixed base station may request a paging procedure to the MME and the MME may instruct the S-GW to request starting the paging procedure to the MME without delivering the downlink data to the base station in regard to the downlink data for the terminal, which is generated in the S-GW and the S-GW may accordingly operate (2*g*-35).

The terminal receiving the RRC connection release message 2*g*-10 including the information indicating the context retention and the resume ID may release the RRC connection, drive the timer corresponding to the expiration date and record a valid cell list in the memory, maintain the currently terminal context in the memory without deleting the currently terminal context (2*g*-25) and may be shifted to the light connected mode. In above description, the UE context means various information associated with the RRC connection of the UE and includes SRB setup information, DRB setup information, security key information, etc. Hereinafter, for any reason, a necessity to setup the RRC connection may be generated (2*g*-30). A terminal that has not been allocated the Resume ID or is not instructed to maintain the context during the previous RRC connection release initiates the general RRC connection setup process (FIG. 2F) described in FIG. 2F, but the RRC inactive mode/light connected mode terminal which has been allocated the Resume ID during the previous RRC connection release may try the RRC connection resume process using the stored terminal context.

In the above description, the RRC inactive mode/light connected mode terminal may perform the general RRC connection setup process (FIG. 2F) and perform the RRC connection resume process using the stored terminal context according to whether to support the RRC inactive mode/light connection of the network. That is, when the RRC inactive mode/light connected mode is not supported, a normal RRC connection establishment process (FIG. 2F) may be performed and when the RRC inactive mode/light connected mode is supported, an RRC connection resume procedure may be performed as follows. In the above description, the RRC inactive mode may be continuously supported in the network (therefore, it may not separately be informed whether to support the RRC inactive mode/light connected mode in system information). In the disclosure, each base station or cell may transmit an indication as to whether or not each base station or cell supports the light connection by including the indication in the system information. The indication may be included in a second bloc of system information (Systeminformation 2), or may be included in blocks of other system information (Systeminformation 1 to 19). Supporting a light connection in the above may mean that the following procedures (2g-50, 2g-55, 2g-60, 2g-65, 2g-70, 2g-75, 2g-80, 2g-85, and 2g-90) may be set and supported by corresponding the base station or the corresponding cell.

If the light connected mode terminal needs to establish the RRC connection, it reads the system information of the current camp-on cell. If the system information does not include the indication that the base station or the cell supports light connection (or RRC inactive mode), the terminal can perform the general RRC connection setup process (FIG. 2F) described in FIG. 2F (2g-45). However, if the system information includes the indication that the base station or the cell supports light connection (or RRC inactive mode), the terminal can perform an RRC connection resume process using the stored UE context (2g-45). The RRC connection resume process using the stored UE context is as follows.

First, the terminal transmits a preamble in message 1 to perform the random access procedure. If the resource allocation is possible according to the preamble received in the message 1, the base station allocates the corresponding uplink resource to the terminal in the message 2. The terminal transmits a Resume request message including the Resume ID received in step 2g-10 based on the received uplink resource information (2g-50). The message may be a modified message of the RRCConnectionRequest message or a newly defined message (e.g., RRCConnectionResumeRequest). When the terminal in the light connected mode moves to camp on the cell of another base station by releasing the connection from the existing anchor eNB (2g-02), the new base station 2g-03 receives and confirms the Resume ID of the terminal, such that it can be appreciated from which base station the corresponding terminal receives a service previously. If the new base station 2g-03 successfully receives and confirms the Resume ID, it performs a procedure of retrieving the UE context from the existing base station 2g-02 (Context Retrieve Procedure 2g-55 and 2g-60).

When a procedure for recovering the terminal context is unsuccessful, for example, when the recovery procedure is unsuccessful due to a predetermined reason such as failure in finding the fixed/source base station or absence of the context of the terminal, the base station may transmit an RRCConnectionSetup message as illustrated in FIG. 2F instead of the RRCConnectionResume message and fall back a subsequent bearer setup procedure/security configuration procedure to the RRC connection establishment procedure described in FIG. 2F and complete security configuration and send the terminal to the RRC connected mode or may return the terminal to the RRC inactive mode again while sending an RRConnectionSuspend message together with a new UE identifier (resume ID) and a RAN paging area. The new base station 2g-03 may obtain the terminal context from the existing base station 2g-02 through the S1 or X2 interface. (If the new base station receives the Resume ID but fails to successfully identify the terminal for predetermined reasons, the RRC connection establishment procedure may be sent to the terminal and may return to the general connection setup procedure described in FIG. 2F). That is, if the RRCConnectionSetup message is sent to the terminal and the terminal receives the message, the RRCConnectionSetup message may be sent to the base state to establish the connection.

Alternatively, if the new base station receives the Resume ID but does not successfully identify the terminal (e.g., when fails to retrieve the UE context from the existing anchor eNB), the RRCConnectionRelease message or the RRCConnectionReject message is sent to the terminal to reject the connection of the terminal and the general RRCConnectionSetup procedure described in FIG. 2F may be tried from the beginning. The new base station confirms the MAC-I based on the retrieved UE context (2g-65). The MAC-I is a message authentication code calculated by the UE for the control message by applying the security information of the restored UE context, that is, applying a security key and a security counter. The base station confirms the integrity of the message using the MAC-I of the message, a security key, a security counter stored in the context of the terminal, or the like. The base station 2g-03 determines the establishment to be applied to the RRC connection of the terminal and transmits the RRCConnectionResume receiving the configuration information to the terminal (2g-70). The RRC connection resume message may be transmitted by confirming the terminal identifier (resume ID) of the terminal and encrypting the resume ID using a new secret key (KeNB* or KgNB*) by the base station and the terminal may normally receive the RRC connection resume message through encryption using the new security key (KeNB* or KgNB*) calculated by using an NCC preconfigured in 2g-10 above.

In addition, after the RRC connection resume message is transmitted, the terminal and the base station may transmit and receive the RRC message and data encrypted with the new security key. The RRC connection resume message may be a control message in which the reuse indicator indicating 'RRC context reuse' is included in the general RRC connection request message. The RRC connection resume message modified RRC connection setup message receives various information related to the RRC connection setup of the terminal like the RRC connection setup message. When the terminal receives the normal RRC connection setup message, the terminal establishes the RRC connection on the basis of the configuration information indicated in the RRC connection setup message, but when the terminal receives the RRC connection resume message, the terminal establishes (delta configuration) the RRC connection in consideration of both of the stored configuration information and the configuration information indicated in the control message.

In summary, the terminal determines the indicated configuration information as the delta information on the stored configuration information to determine the configuration information to be applied and updates the configuration information or the UE context. For example, if the modified RRC connection resume message includes the SRB configuration information, the SRB is configured by applying the indicated SRB configuration information, and if the SRB configuration information is not included in the RRC connection resume message, the SRB may be configured by applying the SRB configuration information stored in the UE context.

The terminal configures the RRC connection by applying the updated terminal and the configuration information and transmits the RRC connection resume complete message to the base station (2g-75). The control message requesting the connection pause to the MME is transmitted and the S1 bearer is requested to be reestablished in a new base station (2g-80 and 2g-85). When receiving the message, the MME instructs the S-GW to reestablish the S1 bearer as a new base station and normally process data for the terminal. When the process is completed, the terminal resumes data transmission/reception in the cell (2g-90).

In the above procedure, if the terminal in the light connected mode does not greatly move by releasing the connection from the anchor eNB 2g-02, and thus if the camped on the cell 2g-02 of the existing anchor eNB is made, the existing anchor eNB 2g-03 does not perform the procedures of 2g-55 and 2g-60 but performs only the connection pause of the S1 bearer in place of the procedures of 2g-80 and 2g-85 and refers to the Resume ID indicated in the message 3 to search for the UE context of the terminal and reestablish the connection by the method similar to the above procedures based on the same.

If the data transmission/reception stops, the BS drives a predetermined timer and if the data transmission/reception is not resumed until the timer expires (2g-95), the BS considers releasing the RRC connection of the terminal. In step 2g-100, an RRConnectionRelease or RRConnectionSuspend message, a newly defined RRC message, or another existing RRC message may be reused and transmitted in order to send the terminal to the RRC inactive mode or light connected mode. In step 2g-100, the base station releases the RRC connection of the terminal according to a predetermined rule, stores the terminal context, transmits a control message for instructing the terminal to release the RRC connection, allocates a new UE identifier (resume ID), and configures the RAN paging area or RAN notification area in which the terminal will report mobility during the RRC inactive mode (or light connected mode) (2g-100). The terminal (2g-105) in the RRC inactive mode (light connected mode) performs a process of updating the RAN paging area when the terminal (2g-105) deviates from the configured RAN paging area.

In the next generation mobile communication system, the base station may configure the terminal in the RRC inactive mode and configure the terminal identifier (resume ID) which may be used when the RRC connection is attempted in the future and the RAN paging area or the RAN Notification area in order for the terminal to report the mobility. In addition, a NexthopChainingCount (NCC) value may be set for the security configuration to be used in the connection establishment process in the future.

In the next generation mobile communication system, the terminal in the RRC inactive mode performs a tracking area update (TAU) when the terminal deviates from the tracking area (TA) (or TA list) and performs the paging area update procedure when an access and mobility management function (AMF) or the fixed base station deviates from the RAN paging area (or RAN notification area). In the network, when the terminal in the RRC inactive mode performs the RAN paging area update procedure, the terminal may make a response with various messages according to a situation of the network and the disclosure proposes a message transmission/reception procedure considering various cases.

Figure 2H:
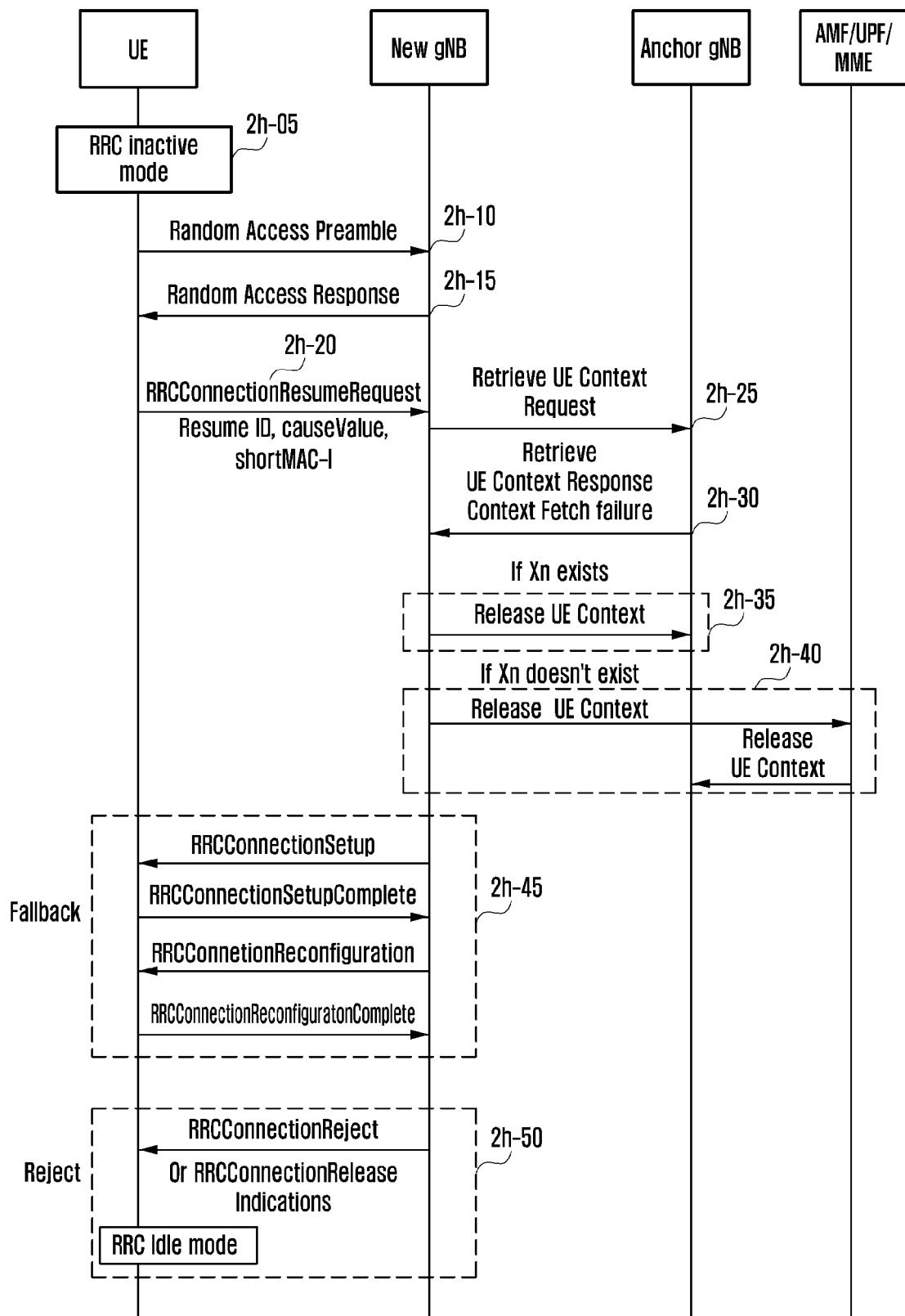
FIG. 2H is a diagram illustrating a method for reducing a connection setup delay of a terminal when the terminal attempts to connect to the network in the RRC inactive mode (or lightly-connected mode) and the base station fails to recover the UE context according to embodiments of the present disclosure.

FIG. 2H is a diagram illustrating a method for reducing a connection setup delay of a terminal when the terminal attempts to connect to the network in the RRC inactive mode (or lightly-connected mode) and the base station fails to recover the UE context according to embodiments of the present disclosure.

In FIG. 2H, a terminal 2h-05 in the RRC inactive mode attempts the connection for the connection establishment to the network for a predetermined reason. The predetermined reason is that the terminal in the RRC inactive mode receives the paging message or deviates from the RAN paging area configured for the terminal or deviates from the tracking area configured for the terminal or the uplink data to be transmitted in the terminal may be generated. In the above description, the terminal performs a random access procedure first and then transmits a random access preamble (2h-10) and receives the RAR in 2h-15 in response thereto. In the above description, the terminal may perform the random access procedure, and the terminal may transmit the message as message 3, which includes the terminal identifier (resume ID), a connection cause indicator (causeValue, for example, a new causeValue may be defined used, ranNotificationAreaUpdateRequest), shortMAC-I (an indicator for integrity verification), and the like.

In the above description, since the RRCConnectionResumeRequest message is transmitted, when the terminal attempts to access the RAN paging area to update the RAN paging area, the base station may switch the mode of the terminal when the downlink data to the terminal is generated or when the base station needs to switch the terminal to the RRC connected mode the RRC connected mode for a predetermined reason. Upon receiving the message of the terminal in step 2h-20, the base station performs a procedure of confirming the resume ID, confirming the existing fixed base station having the identifier of the terminal, sending the resume ID to the existing base station, and recovering the terminal context for the terminal (2h-25 and 2h-30). In the above description, the fixed base station refers to a base station having the terminal context corresponding to the resume ID.

When the procedure of recovering the terminal context is unsuccessful in the above description (2h-30), a new base station releases connection (RRC connection release) or rejects connection (RRC connection reject) with the terminal which attempts the access for the connection establishment to allow the terminal to return to the RRC idle mode (2h-50) and if necessary, to perform a general RRC connection establishment procedure described in FIG. 2F. A case where the terminal fails to recover the terminal context may be a case where the terminal may discard the terminal context due to elapse of a predetermined time or expiration of the timer or a case where since the connection with the fixed base station is not established by an Xn interface or the new base station may not distinguish or appreciate the resume ID or confirm the previous fixed base station.

When the procedure of recovering the terminal context is unsuccessful for the above reason, the new base station may determine that the terminal context is no longer valid and when a connection is established with the fixed base station via the Xn interface to discard the terminal context, a message is sent to the fixed base station to instruct the fixed base station to discard the context of the terminal (2h-35). When the new base station is not connected to the fixed base station through the Xn interface in the above description, the message is sent to instruct the context of the terminal to be discarded by the MME or Access and Mobility Management Function (AMF), User Plane Function (UPF), or Session Management Function (SMF) (2h-40) and the MME, the AMF, the UPF, or the SMF, which receives the message, sends the message to the existing fixed base station to instruct the existing fixed base station to discard the context of the terminal (2h-40). The 2h-35 procedure or the 2h-40 procedure may be performed during the following 2h-45 procedure or 2h-50 procedure or may be performed after the 2h-45 procedure or the 2h-50 procedure.

When the procedure for recovering the terminal context is unsuccessful in the above description, if the base station returns the terminal to the RRC idle mode by releasing the connection or rejecting the connection of the terminal, a connection delay occurs in establishing the connection to the network. Therefore, when the connection is permitted even if the new base station fails to recover the terminal context with respect to the terminal in the RRC inactive mode, which intends to perform the connection resume procedure, the RRC connection setup message is sent to the terminal immediately after receiving the RRC connection resume request message and the terminal returns to the normal RRC connection establishment procedure described in FIG. 2F to immediately perform the connection establishment (2h-45).

In the following description of the disclosure, a method for effectively indicating whether the terminal and the base station support the RRC inactive mode in a wireless access environment to the core network is proposed.

Figure 2I:
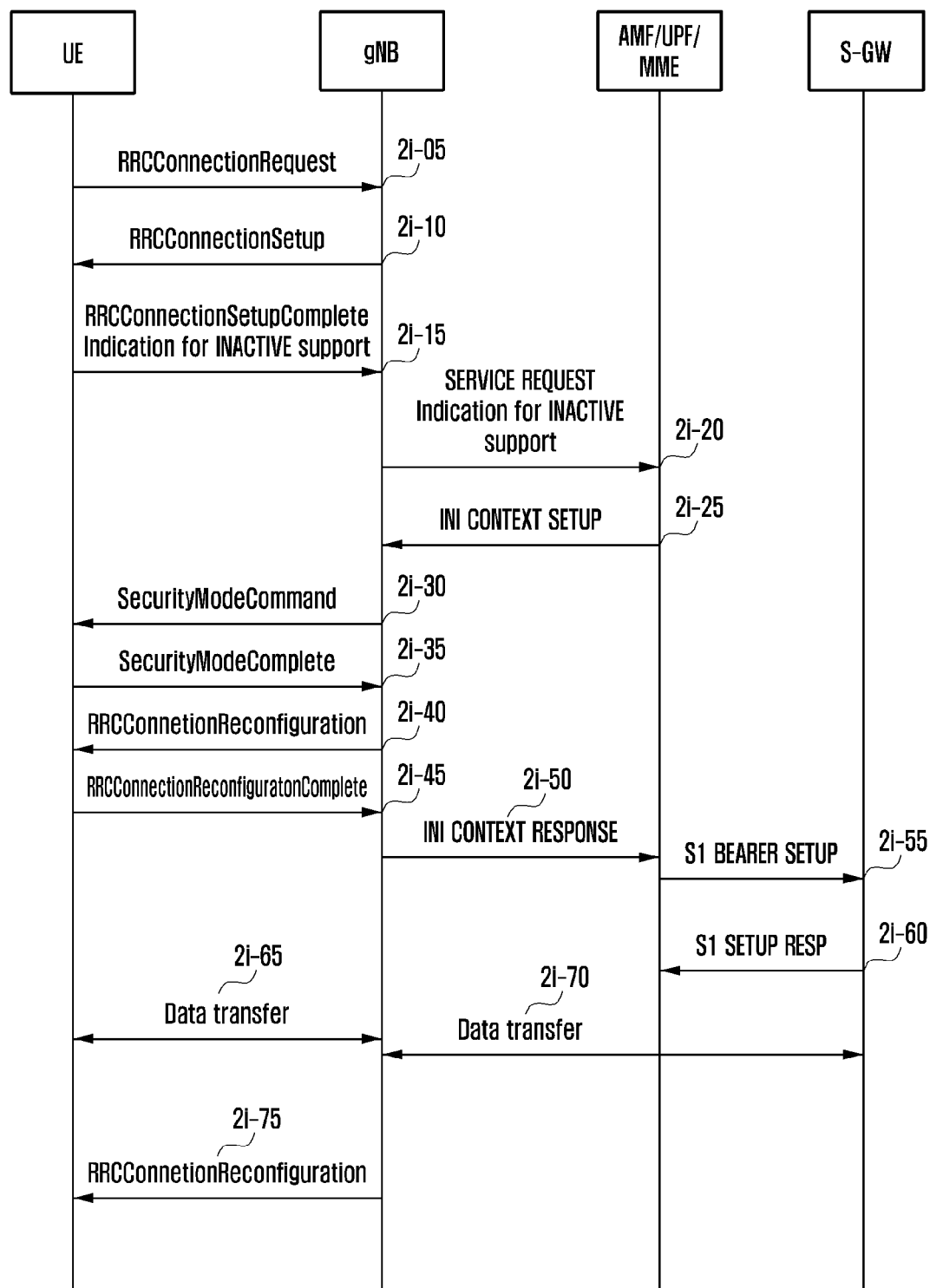
FIG. 2I is a diagram for describing a procedure for indicating whether a terminal supports the RRC inactive mode to a network when the terminal is switched from an RRC idle mode to an RRC connected mode according to embodiments of the present disclosure.

FIG. 2I is a diagram for describing a procedure for indicating whether a terminal supports the RRC inactive mode to a network when the terminal is switched from an RRC idle mode to an RRC connected mode according to embodiments of the present disclosure.

In FIG. 2I, when the terminal (hereinafter, idle mode UE) that is not currently connected generates data to be transmitted, the UE performs an RRC connection setup procedure with the base station. The terminal establishes uplink transmission synchronization with the base station through a random access procedure and transmits an RRCConnection-Request message to the base station (2i-05). The message includes establishmentCause of connection with the identifier of the terminal. The base station transmits an RRC connection setup message to allow the terminal to set the RRC connection (2i-10). The RRC connection setup message includes the RRC connection configuration information, etc. The RRC connection is also called a signaling radio bearer (SRB) and is used for transmission and reception of the RRC message that is a control message between the terminal and the base station. The terminal establishing the RRC connection transmits an RRCConnetionSetupComplete message to the base station (2i-15). An indicator for indicating whether the terminal supports the RRC inactive mode is defined in the message and whether the terminal supports the RRC inactive mode may be indicated to the base station or the core network by using the defined indicator.

Further, the message includes a control message, for example, a SERVICE REQUEST message for requesting the MME or AMF, user plane function (UPF) or session management function (SMF) of a bearer setup for a predetermined service by the terminal. The control message may include another message such as ATTACH REQUEST, etc. The base station transmits a service request message included in the RRCConnetionSetupComplete message to the MME or the AMF or the UPF or the SMF (2i-20) and the MME or the AMF or the UPF or the SMF determines whether to provide the service requested by the terminal. An indicator for indicating whether the terminal supports the RRC inactive mode is defined in the message and whether the terminal supports the RRC inactive mode may be indicated to the core network by using the defined indicator. In the message, the base station may directly deliver to the core network the indicator indicating whether to support the RRC deactivation received in 2i-15 to the core network as it is. Alternatively, in the message, the base station may confirm the indicator indicating whether to support the RRC deactivation received in 2i-15 and the base station may indicate and deliver that the RRC inactive mode is supported to the core network only when the base station supports the RRC inactive mode.

As the determination result, if the MME decides to provide the service that the terminal requests, the MME transmits an initial context setup request message to the base station (2i-25). The initial context setup request message may include information such as quality of service (QoS) information to be applied when setting up a data radio bearer (DRB) and security related information (e.g., security key, security algorithm) to be applied to the DRB. The base station exchanges a SecurityModeCommand) message 2i-30 and a SecurityModeComplete message 2i-35 with the terminal to establish security. When the security establishment is completed, the base station transmits an RRCConnection-Reconfiguration message to the UE (2i-40). The message includes the configuration information of the DRB in which user data are processed, and the UE applies the information to setup the DRB and transmits an RRCConnectionReconfigurationComplete message to the BS (2i-45). The base station that completes the DRB setup with the terminal transmits an initial context setup complete message to the MME (2i-50) and the MME receiving the message exchanges an S1 bearer setup message and an S1 bearer setup response message with the S-GW to setup an S1 bearer (2i-55 and 2i-60).

The S1 bearer is a data transmission connection established between the S-GW and the base station and corresponds to a DRB on one-to-one basis. If all of the procedures are completed, the terminal transmits and receives data to and from the BS through the S-GW (2i-65 and 2i-70). As described above, the normal data transmission procedure largely consists of three stages: RRC connection setup, security setup, and DRB setup. In addition, the base station may transmit an RRCConnectionReconfiguration message to renew, add, or change the configuration to the terminal for a predetermined reason (2i-75).

Figure 2J:
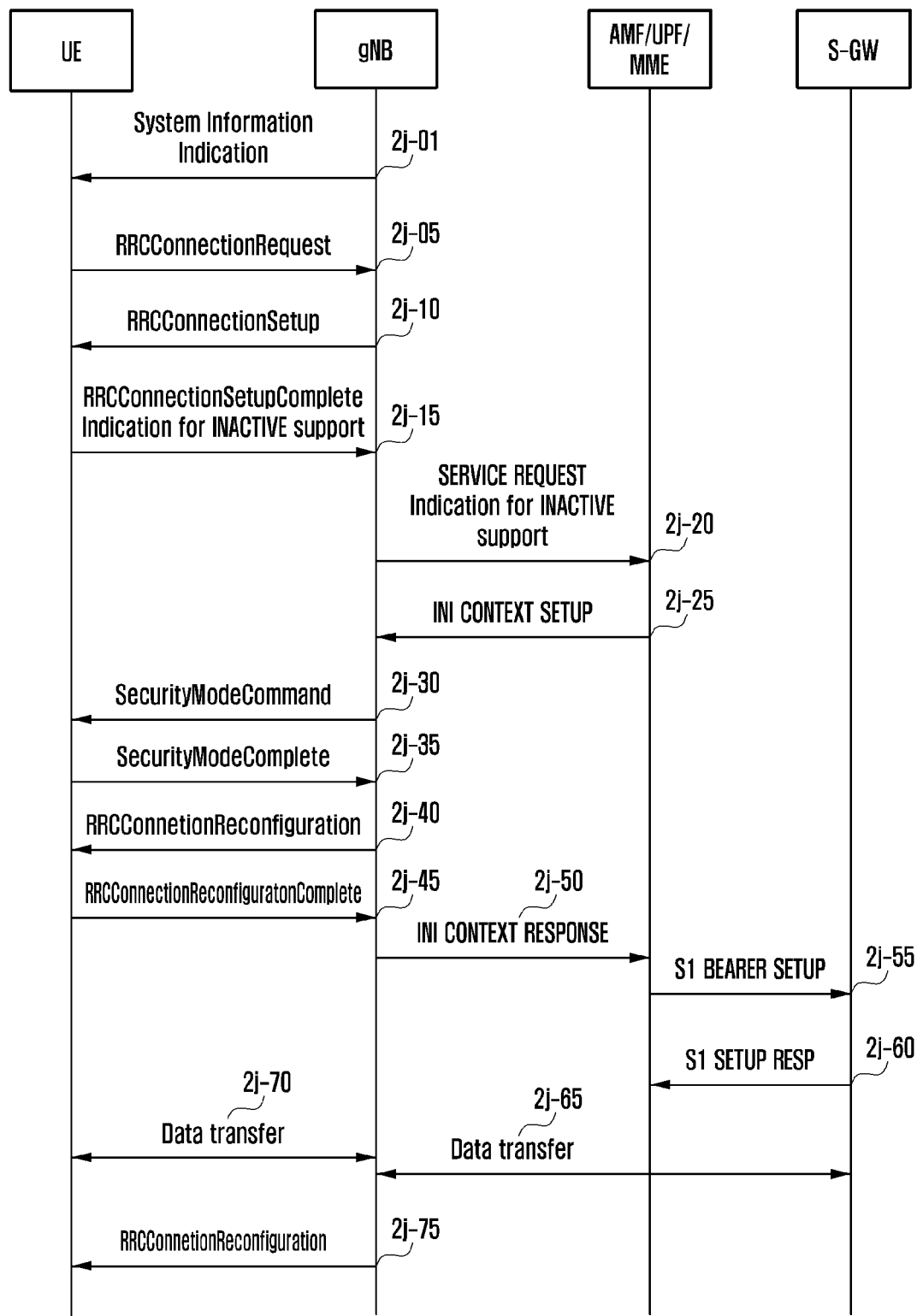
FIG. 2J is a diagram for describing a procedure for confirming system information and indicating whether a terminal supports the RRC inactive mode to a network, when the terminal is switched from an RRC idle mode to an RRC connected mode according to embodiments of the present disclosure.

FIG. 2J is a diagram for describing a procedure for confirming system information and indicating whether a terminal supports the RRC inactive mode to a network, when the terminal is switched from an RRC idle mode to an RRC connected mode according to embodiments of the present disclosure.

In FIG. 2J, when the terminal (hereinafter, idle mode UE) that is not currently connected generates data to be transmitted, the UE performs an RRC connection setup procedure with the base station. The terminal can first read the system information of the currently camped-on cell in step 2j-01, and can confirm whether the currently camped-on cell or the base station supports the RRC inactive mode through the system information. The terminal establishes uplink transmission synchronization with the base station through a random access procedure and transmits an RRCConnection-Request message to the base station (2j-05). The message includes establishmentCause of connection with the identifier of the terminal.

The base station transmits an RRCConnectionSetup message to allow the terminal to set the RRC connection (2j-10). The RRC connection setup message includes the RRC connection configuration information, etc. The RRC connection is also called a signaling radio bearer (SRB) and is used for transmission and reception of the RRC message that is a control message between the terminal and the base station. The terminal establishing the RRC connection transmits an RRCConnetionSetupComplete message to the base station (2*j*-15). An indicator for indicating whether the terminal supports the RRC inactive mode may be defined in the message and whether the terminal supports the RRC inactive mode may be indicated to the base station or the core network by using the defined indicator and the terminal may confirm that a cell or a base station which currently intends to support the RRC inactive mode to be currently connected through the system information in step 2*j*-01 above and only when the terminal also supports the RRC inactive mode, the terminal may instruct the base station or the core network to support the RRC inactive mode through the indicator of the message.

Further, the message includes a control message, for example, a SERVICE REQUEST message for requesting the MME or AMF, UPF or SMF of a bearer setup for a predetermined service by the terminal. The control message may include another message such as ATTACH REQUEST, etc. The base station transmits a service request message included in the RRCConnetionSetupComplete message to the MME or the AMF or the UPF or the SMF (2*j*-20) and the MME or the AMF or the UPF or the SMF determines whether to provide the service requested by the terminal. An indicator for indicating whether the terminal supports the RRC inactive mode is defined in the message and whether the terminal supports the RRC inactive mode may be indicated to the core network by using the defined indicator. In the message, the base station may directly deliver to the core network the indicator indicating whether to support the RRC deactivation received in 2*j*-15 to the core network as it is. Alternatively, in the message, the base station may confirm the indicator indicating whether to support the RRC deactivation received in 2*j*-15 and the base station may indicate and deliver that the RRC inactive mode is supported to the core network only when the base station supports the RRC inactive mode. As the determination result, if the MME decides to provide the service that the terminal requests, the MME transmits an initial context setup request message to the base station (2*j*-25).

The initial context setup request message may include information such as quality of service (QoS) information to be applied when setting up a data radio bearer (DRB) and security related information (e.g., security key, security algorithm) to be applied to the DRB. The base station exchanges a SecurityModeCommand) message 2*j*-30 and a SecurityModeComplete message 2*j*-35 with the terminal to establish security. When the security establishment is completed, the base station transmits an RRCConnectionReconfiguration message to the UE (2*j*-40). The message includes the configuration information of the DRB in which user data are processed, and the UE applies the information to setup the DRB and transmits an RRCConnectionReconfiguration-Complete message to the base station (2*j*-45). The base station that completes the DRB setup with the terminal transmits an initial context setup complete message to the MME (2*j*-50) and the MME receiving the message exchanges an S1 bearer setup message and an S1 bearer setup response message with the S-GW to setup an S1 bearer (2*j*-55 and 2*j*-60).

The S1 bearer is a data transmission connection established between the S-GW and the base station and corresponds to a DRB on one-to-one basis. If all of the procedures are completed, the terminal transmits and receives data to and from the BS through the S-GW (2*j*-65 and 2*j*-70). As described above, the normal data transmission procedure largely consists of three stages: RRC connection setup, security setup, and DRB setup. In addition, the base station may transmit an RRCConnectionReconfiguration message to renew, add, or change the configuration to the terminal for a predetermined reason (2*j*-75).

Figure 2K:
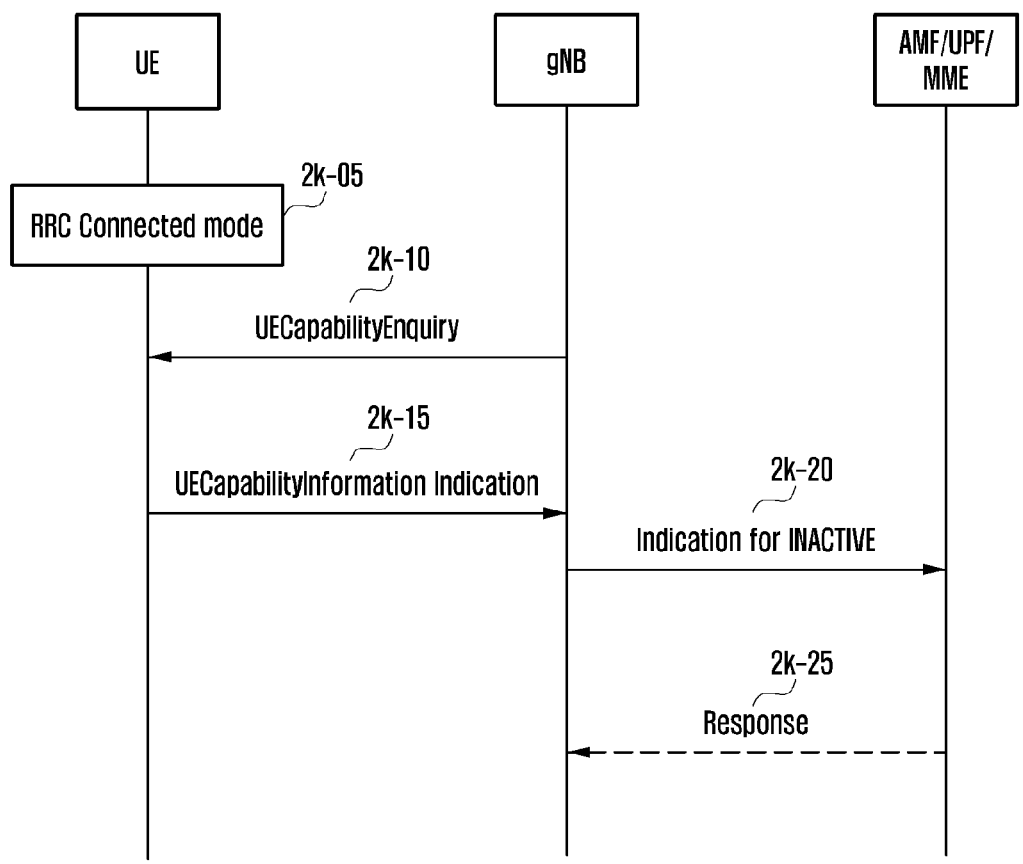
FIG. 2K is a diagram for explaining a procedure for instructing a base station to inquire capability of a terminal in the RRC connected mode, confirming the capability of the terminal, and instructing a network whether to support the RRC inactive mode based thereon according to embodiments of the present disclosure.

FIG. 2K is a diagram for explaining a procedure for instructing a base station to inquire capability of a terminal in the RRC connected mode, confirming the capability of the terminal, and instructing a network whether to support the RRC inactive mode according to embodiments of the present disclosure.

In FIG. 2*k*, the base station may send a message (UE capability enquiry) requesting a capability of the terminal to the terminal (2*k*-05) in the RRC connected mode. Then, the terminal may generate a message (UE capability information) by configuring capability information of the terminal and deliver the generated message to the base station (2*k*-15). In the message, an indicator for indicating whether the terminal supports the RRC inactive mode may be defined and reported. Upon receipt of the message, the base station may confirm whether the terminal supports the RRC inactive mode and when the base station also supports the RRC inactive mode, the base station transmits a message including the indication indicating that the RRC inactive mode is supported to the MME or AMF or UPF or SMF to indicate to the core network whether the RRC inactive mode is supported (2*k*-20). As the message including the indication indicating that the RRC inactive mode is supported, the existing message may be used and a new message may be defined and used.

When either the base station or the terminal does not support the RRC inactive mode, it may be indicated that the RRC inactive mode is not supported. When the MME or the AMF or the UPF or the SMF receives the 2*k*-20 message, the MME or the AMF or the UPF or the SMF may transmit a response indicating that the message is normally received (2*k*-25). The 2*k*-25 message may be omitted.

Figure 2L:
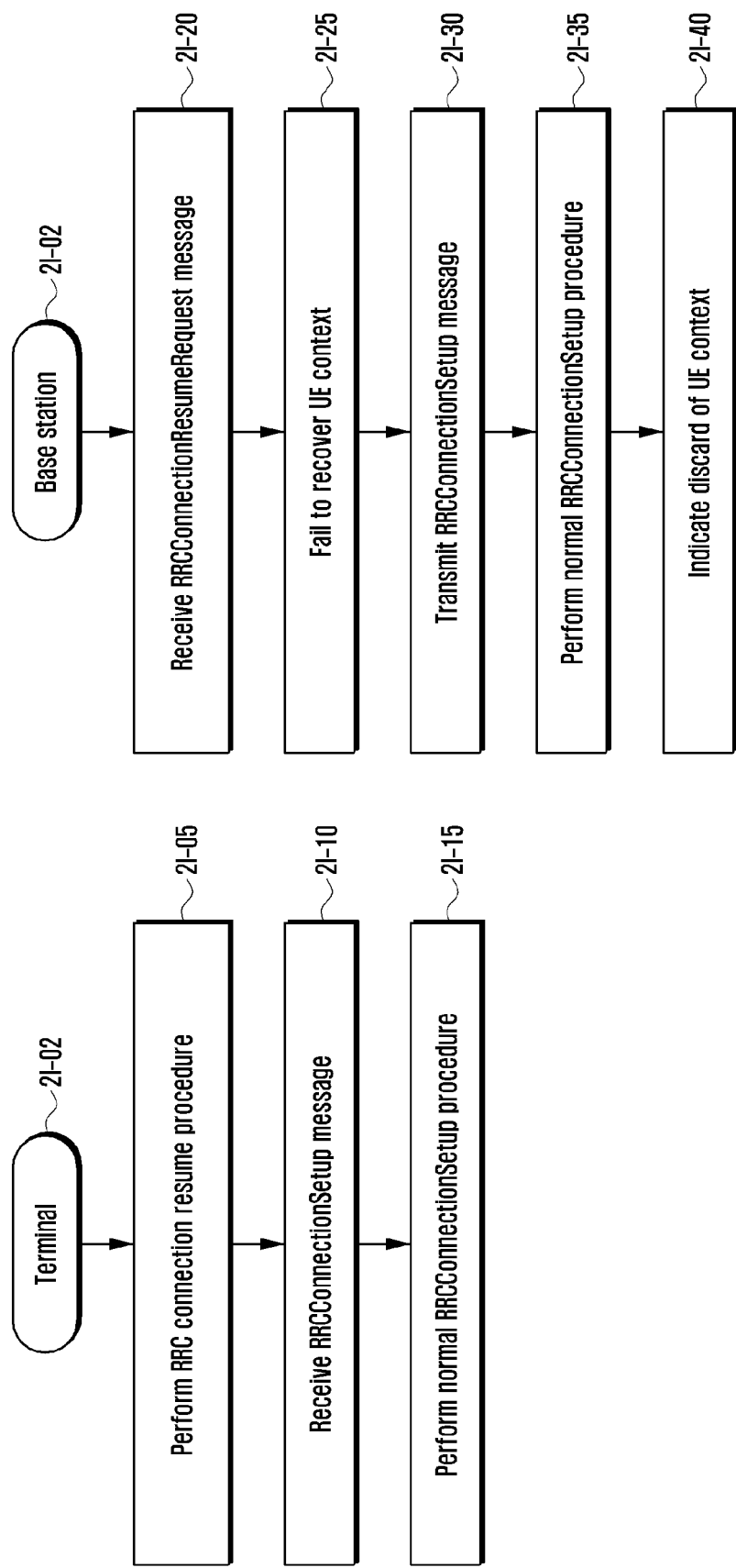
FIG. 2L is a diagram illustrating an operation of a terminal and a base station for reducing a connection setup delay upon a context recovery failure of the terminal in an RRC connection resumption procedure according to embodiments of the present disclosure.

FIG. 2L is a diagram illustrating an operation of a terminal and a base station for reducing a connection setup delay when a context recovery failure of the terminal is lost in an RRC connection resumption procedure according to embodiments of the present disclosure.

In 2*l*-01, the terminal in the RRC inactive mode may perform the RRC connection resume procedure as illustrated in FIG. 2G by using the resume ID when the connection establishment with the network is required for a predetermined reason. In the RRC connection resume procedure, when the terminal receives the RRC connection setup message (2*l*-10), it is understood that the base station fails in the context recovery of the terminal and performs the normal RRC connection setup procedure illustrated in FIG. 2F and the terminal immediately performs the normal RRC connection setup procedure (2*l*-15).

In 2*l*-02 When the base station receives the RRC connection resume request message from the terminal which intends to resume the RRC connection (2*l*-20), the base station performs the terminal context recovery procedure and when the base station fails to receiving the RRC connection resume request message (2*l*-25), the base station may immediately transmit the RRC connection setup message to the terminal (2*l*-30). The base station immediately sends the message to the terminal to notify that the terminal context recovery is unsuccessful and instruct to fall back to the normal RRC connection setup procedure described in FIG. 2F (2*l*-35). In addition, when the normal RRC connection setup procedure is performed or the Xn interface is connected with the fixed base station while or before performing the normal RRC connection setup procedure, it may be instructed to discard the terminal context corresponding to the terminal resume ID and when the Xn interface is not connected with the fixed base station, it may be instructed to discard the terminal context corresponding to the terminal resume ID to the MME or the AMF or the UPF or the SMF and the MME or the AMF or the UPF or the SMF may instruct the fixed base station to discard the terminal context corresponding to the terminal resume ID (2*l*-40).

Figure 2M:
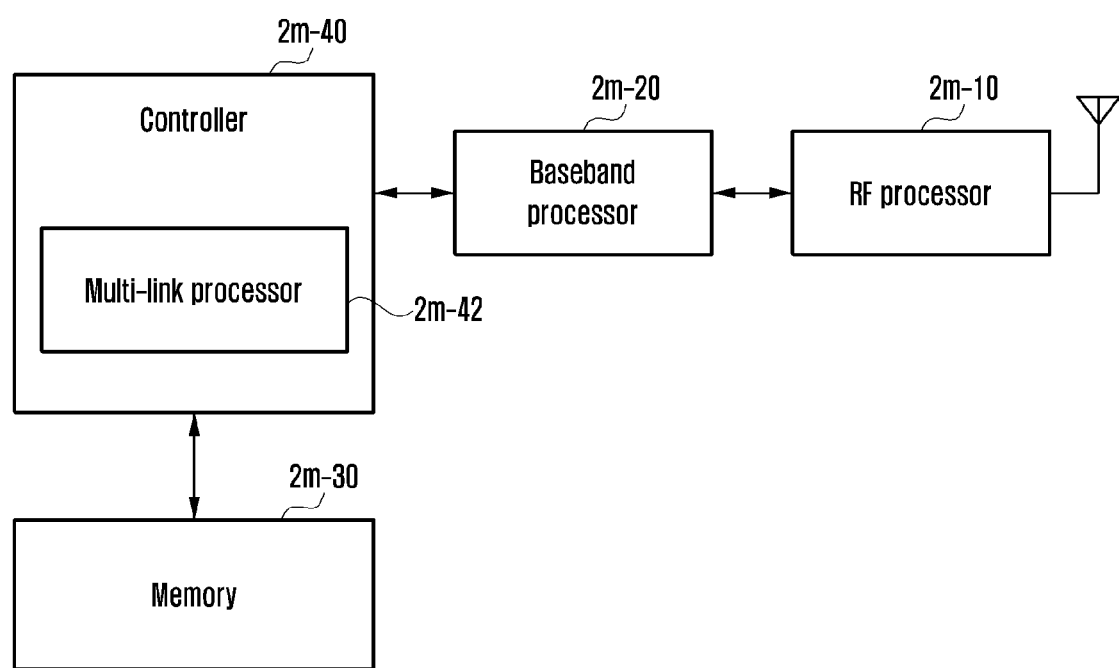
FIG. 2M is a diagram illustrating the structure of the terminal according to embodiments of the present disclosure.

FIG. 2*m* is a diagram illustrating the structure of the terminal according to embodiments of the present disclosure.

Referring to FIG. 1M, the terminal includes a radio frequency (RF) processor 2*m*-10, a baseband processor 2*m*-20, a memory 2*m*-30, and a controller 2*m*-40.

The RF processor 2*m*-10 serves to transmit/receive a signal through a radio channel, such as band conversion and amplification of a signal. That is, the RF processor 2*m*-10 up-converts a baseband signal provided from the baseband processor 2*m*-20 into an RF band signal and then transmits the RF band signal through an antenna and down-converts the RF band signal received through the antenna into the baseband signal. For example, the RF processor 2*m*-10 may include a transmitting filter, a receiving filter, an amplifier, a mixer, an oscillator, a digital to analog converter (DAC), an analog to digital converter (ADC), or the like. In the above figure, only one antenna is illustrated, but the terminal may include a plurality of antennas. Further, the RF processor 2*m*-10 may include the plurality of RF chains. Further, the RF processor 2*m*-10 may perform beamforming. For the beamforming, the RF processor 2*m*-10 may adjust a phase and a size of each of the signals transmitted and received through a plurality of antennas or antenna elements. In addition, the RF processor may perform MIMO and may receive a plurality of layers when performing a MIMO operation. The RF processor 2*m*-10 may perform reception beam sweeping by appropriately configuring a plurality of antennas or antenna elements under the control of the controller or adjust a direction and a beam width of the reception beam so that the reception beam is resonated with the transmission beam.

The baseband processor 2*m*-20 performs a conversion function between the baseband signal and the bit string according to a physical layer standard of the system. For example, when data are transmitted, the baseband processor 2*m*-20 generates complex symbols by coding and modulating a transmitting bit string. Further, when data are received, the baseband processor 2*m*-20 recovers the received bit string by demodulating and decoding the baseband signal provided from the RF processor 2*m*-10. For example, according to the orthogonal frequency division multiplexing (OFDM) scheme, when data are transmitted, the baseband processor 2*m*-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 2*m*-20 divides the baseband signal provided from the RF processor 2*m*-10 in an OFDM symbol unit and recovers the signals mapped to the sub-carriers by a fast Fourier transform (FFT) operation and then recovers the receiving bit string by the modulation and decoding.

The baseband processor 2*m*-20 and the RF processor 2*m*-10 transmit and receive a signal as described above. Therefore, the baseband processor 2*m*-20 and the RF processor 2*m*-10 may be called a transmitter, a receiver, a transceiver, or a communication unit. Further, at least one of the baseband processor 2*m*-20 and the RF processor 2*m*-10 may include a plurality of communication modules to support a plurality of different radio access technologies. Further, at least one of the baseband processor 2*m*-20 and the RF processor 2*m*-10 may include different communication modules to process signals in different frequency bands. For example, the different wireless access technologies may include an LTE network, an NR network, and the like. Further, different frequency bands may include a super high frequency (SHF) (for example: 2.2 gHz, 2 gHz) band, a millimeter wave (for example: 60 GHz) band.

The memory 2*m*-30 stores data such as basic programs, application programs, and configuration information or the like for the operation of the terminal. Further, the memory 2*m*-30 provides the stored data according to the request of the controller 2*m*-40.

The controller 2*m*-40 controls the overall operations of the terminal. For example, the controller 2*m*-40 transmits/receives a signal through the baseband processor 2*m*-20 and the RF processor 2*m*-10. Further, the controller 2*m*-40 records and reads data in and from the memory 2*m*-30. For this purpose, the controller 2*m*-40 may include at least one processor. For example, the controller 2*m*-40 may include a communication processor (CP) performing a control for communication and an application processor (AP) controlling an upper layer such as the application programs.

Figure 2N:
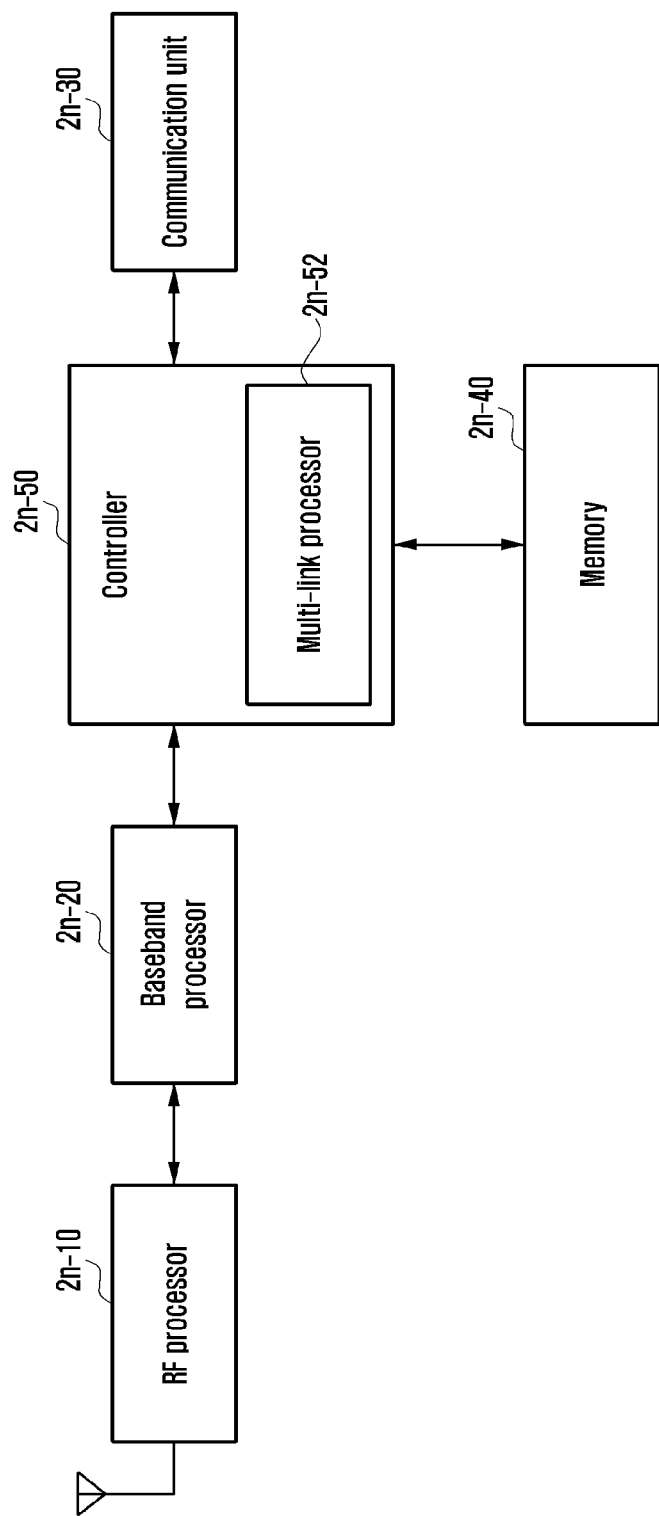
FIG. 2N is a block configuration diagram of the TRP in the wireless communication system according to embodiments of the present disclosure.

FIG. 2*n* is a block configuration diagram of the TRP in the wireless communication system according to embodiments of the present disclosure.

As illustrated in FIG. 2N, the base station is configured to include an RF processor 2*n*-10, a baseband processor 2*n*-20, a backhaul communication unit 2*n*-30, a memory 2*n*-40, and a controller 2*n*-50.

The RF processor 2*n*-10 serves to transmit and receive a signal through a radio channel, such as band conversion and amplification of a signal. That is, the RF processor 2*n*-10 up-converts a baseband signal provided from the baseband processor 2*n*-20 into an RF band signal and then transmits the RF band signal through an antenna and down-converts the RF band signal received through the antenna into the baseband signal. For example, the RF processor 2*n*-10 may include a transmitting filter, a receiving filter, an amplifier, a mixer, an oscillator, a DAC, an ADC, or the like. In the above figure, only one antenna is illustrated, but the first access node may include a plurality of antennas. Further, the RF processor 2*n*-10 may include a plurality of RF chains. Further, the RF processor 2*n*-10 may perform the beamforming. For the beamforming, the RF processor 2*n*-10 may adjust a phase and a size of each of the signals transmitted/received through a plurality of antennas or antenna elements. The RF processor may perform a downward MIMO operation by transmitting one or more layers.

The baseband processor 2*n*-20 performs a conversion function between the baseband signal and the bit string according to the physical layer standard of the first radio access technology. For example, when data are transmitted, the baseband processor 2*n*-20 generates complex symbols by coding and modulating a transmitted bit string. Further, when data are received, the baseband processor 2*n*-20 recovers the received bit string by demodulating and decoding the baseband signal provided from the RF processor 2*n*-10. For example, according to the OFDM scheme, when data are transmitted, the baseband processor 2*n*-20 generates the complex symbols by coding and modulating the transmitting bit string, maps the complex symbols to the sub-carriers, and then performs the IFFT operation and the CP insertion to construct the OFDM symbols. Further, when data are received, the baseband processor 2*n*-20 divides the baseband signal provided from the RF processor 2*n*-10 in the OFDM symbol unit, recovers the signals mapped to the sub-carriers by the FFT operation, and then recovers the received bit string by the demodulation and decoding. The baseband processor 2n-20 and the RF processor 2n-10 transmit and receive a signal as described above. Therefore, the baseband processor 2n-20 and the RF processor 2n-10 may be called a transmitter, a receiver, a transceiver, a communication unit, or a radio communication unit.

The communication unit 2n-30 provides an interface for performing communication with other nodes within the network.

The memory 2n-40 stores data such as the basic programs, the application programs, and the configuration information for the operation of the main base station. In particular, the memory 2n-40 may store the information on the bearer allocated to the accessed terminal, the measured results reported from the accessed terminal, or the like. Further, the memory 2n-40 may store information that is a determination criterion on whether to provide the multiple connections to the terminal to the terminal or stop the multiple connections. Further, the memory 2n-40 provides the stored data according to the request of the controller 2n-50.

The controller 2n-50 controls the overall operations of the main base station. For example, the controller 2n-50 transmits/receives a signal through the baseband processor 2n-20 and the RF processor 2n-10 or the backhaul communication unit 2n-30. Further, the controller 2n-50 records and reads data in and from the memory 2n-40. For this purpose, the controller 2n-50 may include at least one processor.

Third Embodiment

Hereinafter, an operation principle of the disclosure will be described in detail with reference to the accompanying drawings. Hereinafter, when it is determined that the detailed description of the known art related to the disclosure may obscure the gist of the disclosure, the detailed description thereof will be omitted. Further, the following terminologies are defined in consideration of the functions in the disclosure and may be construed in different ways by the intention or practice of users and operators. Therefore, the definitions thereof should be construed based on the contents throughout the specification. Terms identifying an access node, terms indicating network entity, terms indicating messages, terms indicating an interface between network entities, terms indicating various types of identification information, and so on that are used in the following description are exemplified for convenience of explanation. Accordingly, the disclosure is not limited to terms to be described below and other terms indicating objects having the equivalent technical meaning may be used.

Hereafter, for convenience of explanation, the disclosure uses terms and names defined in the 3rd generation partnership project long term evolution (3GPP LTE) or terms and names modified based on the terms and names. However, the disclosure is not limited to the terms and names but may also be identically applied even to the system according to other standards.

Figure 3A:
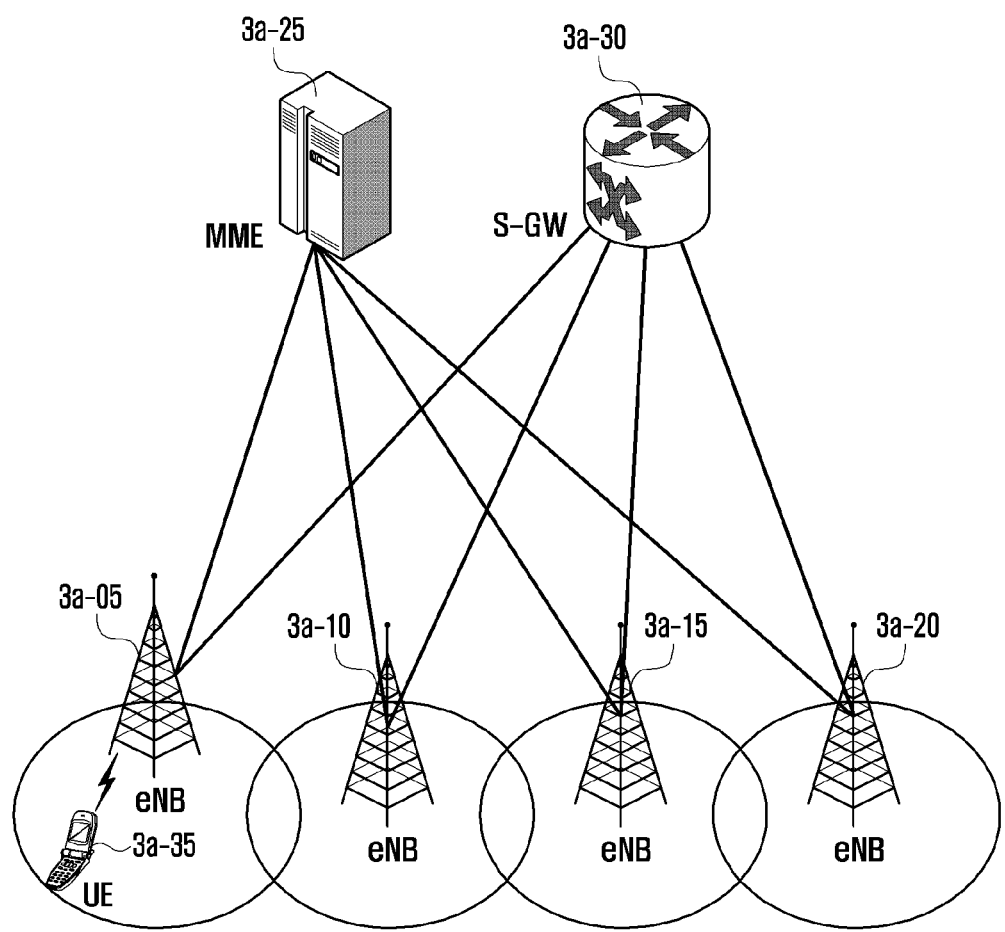
FIG. 3A is a diagram illustrating a structure of an LTE system according to embodiments of the present disclosure.

FIG. 3A is a diagram illustrating a structure of an LTE system according to embodiments of the present disclosure.

As illustrated in FIG. 3A, a radio access network of an LTE system is configured to include next generation base stations (evolved node B, hereinafter, eNB, Node B, or base station) 3a-05, 3a-10, 3a-15, and 3a-20, a mobility management entity (MME) 3a-25, and a serving-gateway (S-GW) 3a-30. User equipment (hereinafter, UE or terminal) 3a-35 accesses an external network through the eNBs 3a-05 to 3a-20 and the S-GW 3a-30.

In FIG. 3A, the eNBs 3a-05 to 3a-20 correspond to the existing node B of the UMTS system. The eNB is connected to the UE 3a-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel status of the terminals is required. Here, the eNBs 3a-05 to 3a-20 take charge of the collecting and scheduling. One eNB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation and coding (hereinafter, referred to as AMC) determining a modulation scheme and a channel coding rate according to a channel status of the terminal is applied. The S-GW 3a-30 is an apparatus for providing a data bearer and generates or removes the data bearer according to the control of the MME 3a-25. The MME is an apparatus for performing a mobility management function for the terminal and various control functions and is connected to a plurality of base stations.

Figure 3B:
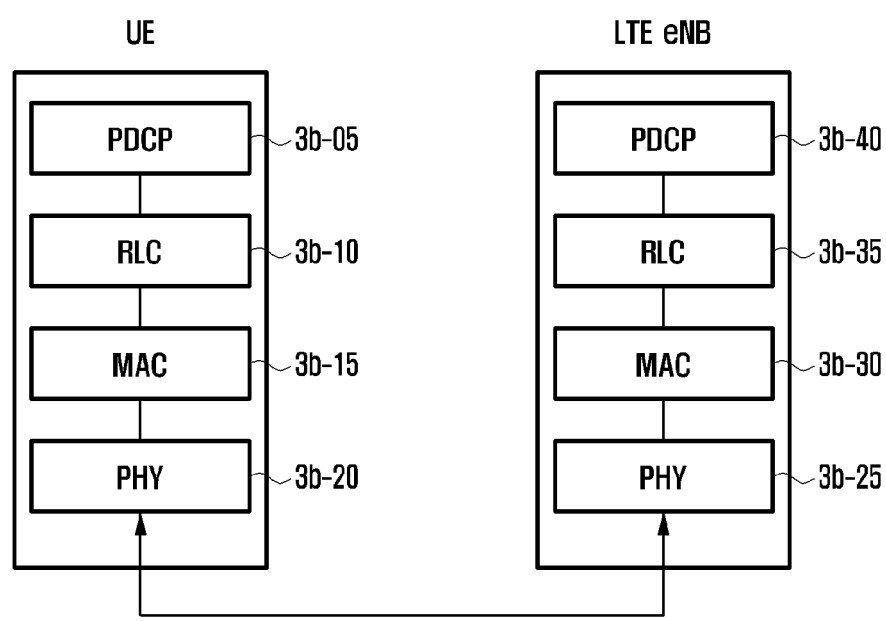
FIG. 3B is a diagram illustrating the radio protocol structure in the LTE system according to embodiments of the present disclosure.

FIG. 3B is a diagram illustrating the radio protocol structure in the LTE system referenced according to embodiments of the present disclosure.

Referring to FIG. 3B, the radio protocol of the LTE system is configured to include packet data convergence protocols (PDCPs) 3b-05 and 3b-40, radio link controls (RLCs) 3b-10 and 3b-35, and medium access controls (MMCs) 3b-15 and 3b-30 in the terminal and the eNB, respectively. The PDCPs 3b-05 and 3b-40 are in charge of operations such as IP header compression/decompression. The main functions of the PDCP are summarized as follows: header compression and decompression function (header compression and decompression: ROHC only); transfer function of user data (transfer of user data); in-sequence delivery function (in-sequence delivery of upper layer PDUs at PDCP re-establishment procedure for RLC AM); reordering function (for split bearers in DC (only support for RLC AM): PDCP PDU routing for transmission and PDCP PDU reordering for reception); duplicate detection function (duplicate detection of lower layer SDUs at PDCP re-establishment procedure for RLC AM); retransmission function (retransmission of PDCP SDUs at handover and, for split bearers in DC, of PDCP PDUs at PDCP data-recovery procedure, for RLC AM); ciphering and deciphering function (ciphering and deciphering); and timer-based SDU discard function (timer-based SDU discard in uplink).

The radio link controls (hereinafter, referred to as RLCs) 3b-10 and 3b-35 reconfigures the PDCP packet data unit (PDU) to an appropriate size to perform the ARQ operation or the like. The main functions of the RLC are summarized as follows: data transfer function (transfer of upper layer PDUs); ARQ function (Error Correction through ARQ (only for AM data transfer)); concatenation, segmentation, reassembly functions (concatenation, segmentation and reassembly of RLC SDUs (only for UM and AM data transfer)); re-segmentation function (re-segmentation of RLC data PDUs (only for AM data transfer)); reordering function (reordering of RLC data PDUs (only for UM and AM data transfer); duplicate detection function (duplicate detection (only for UM and AM data transfer)); error detection function (protocol error detection (only for AM data transfer)); RLC SDU discard function (RLC SDU discard (only for UM and AM data transfer)); and RLC re-establishment function (RLC re-establishment);

The MACs 3b-15 and 3b-30 are connected to several RLC layer entities configured in one terminal and perform an operation of multiplexing RLC PDUs into an MAC PDU and demultiplexing the RLC PDUs from the MAC PDU. The main functions of the MAC are summarized as follows: mapping function (mapping between logical channels and transport channels); multiplexing/demultiplexing function (multiplexing/demultiplexing of MAC SDUs belonging to one or different logical channels into/from transport blocks (TB) delivered to/from the physical layer on transport channels); scheduling information reporting function (scheduling information reporting); HARQ function (error correction through HARQ); priority handling function between logical channels (priority handling between logical channels of one UE); priority handling function between terminals (priority handling between UEs by means of dynamic scheduling); MBMS service identification function (MBMS service identification); transport format selection function (transport format selection); and padding function (padding).

Physical layers 3b-20 and 3b-25 perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

FIG. 3C is a diagram schematically illustrating a multiple connection operation and a carrier aggregation operation of the existing LTE system according to embodiments of the present disclosure.

Referring to FIG. 3C, when the base station 1 3c-05 transmits/receives a carrier whose central frequency is f1 and the base station 2 3c-15 transmits/receives a carrier whose central frequency is f2, if the terminal 1 3c-01 combines a carrier whose forward central frequency is f1 with a carrier whose forward central frequency is f2, one terminal may perform transmission/reception from two or more base stations. The LTE system supports the above operation and is referred to as dual connectivity (hereinafter, referred to as DC).

In addition, one base station 3 may generally transmit and receive multiple carriers over several frequency bands. For example, when a carrier 3c-35 of which the forward central frequency is f4 and a carrier 3 3c-30 of which the forward central frequency is f3 are transmitted from the base station 3 3c-25, the terminal 2 transmits and receives data using one of the two carriers. However, the terminal 2 having carrier aggregation ability may simultaneously transmit and receive data through several carriers. The base station 3 3c-25 may allocate more carriers to the terminal 2 3c-40 having the carrier aggregation ability in some case to increase a transmission rate of the terminal 2 3c-40. As described above, aggregating forward carriers and reverse carriers transmitted and received by one base station is called intra-ENB carrier aggregation (CA). As the traditional meaning, when one forward carrier transmitted from one bas station and one reverse carrier received by the base station configure one cell, the carrier aggregation may also be understood that the terminal simultaneously transmits and receives data through several cells. By doing so, the maximum transmission rate is increased in response to the aggregated number of carriers.

Hereinafter, in the embodiments of the disclosure, receiving, by the terminal, data through any forward carrier or transmitting, from the terminal, the data through any uplink carrier reverse carrier have the same meaning as transmitting and receiving the data through a control channel and a data channel which are provided from a cell corresponding to a central frequency and a frequency band defining characteristics of the carriers. In the embodiments of the disclosure, a set of serving cells controlled by the same base station is defined as a cell group (CG). The cell group is again divided into a master cell group (MCG) and a secondary cell group (SCG). The MCG means a set of serving cells controlled by a base station (master eNB (MeNB)) that controls a primary cell (PC) cell, and the SCG means a set of serving cells controlled by a base station other than the base stations that control the PCell, that is, a secondary base station (secondary eNB (SeNB)) that controls only a secondary cell (SCell). The base station notifies of the terminal of whether a specific serving cell belongs to the MCG or the SCG while the corresponding serving cell is configured.

The PCell and the SCell are terms indicating a type of serving cells that are configured in the terminal. There are some differences between the PCell and the SCell. For example, the PCell is always in an activation state, but the SCell repeats the activation and deactivation states depending on the command of the base station. The mobility of the terminal is controlled based on the PCell, and the SCell may be understood as an additional serving cell for data transmission/reception. The PCell and the SCell in the embodiments of the disclosure mean the PCell and the SCell defined in the LTE standard specification. The terms have the same meaning as they are used in an LTE mobile communication system. In the disclosure, terms such as a carrier, a component carrier, a serving cell and the like are mixed. In the disclosure, terms such as a carrier, a component carrier, a serving cell and the like are interchangeably used.

Referring back to FIG. 3C, if the base station 1 3c-05 is the MeNB and the base station 2 3c-15 is the SeNB, the serving cell 3c-10 having the central frequency of f1 is the serving cell belonging to the MCG, and the serving cell 3c-20 having the central frequency of f2 is the serving cell belonging to the SCG. In addition, it may be practically impossible to transmit a HARQ feedback and channel state information (hereinafter, CSI) of the SCG SCells through a physical uplink control channel (PUCCH) of the PCell. The HARQ feedback may be delivered within a HARQ round trip time (RTT) (typically 8 ms) because the transmission delay between the MeNB and the SeNB may be longer than the HARQ RTT. Due to the above problem, a PUCCH transmission resource is configured in one of the SCells belonging to the SCG, that is, the primary SCell (PScell), and the HARQ feedback and the CSI for the SCG SCell are transmitted through the PUCCH.

Further, terminal 2 (3c-40) in the CA in the normal base station 3 (3c-25) also transmits a HARQ feedback and a CSI for the SCell as well as the HARQ feedback and the CSI for the PCell through the PUCCH of the PCell. This is because a CA operation is applied even to a terminal that may not perform uplink simultaneous transmission. In LTE Enhanced CA (eCA), additional SCell with the PUCCH may be defined and up to 32 carriers may be integrated.

Figure 3D:
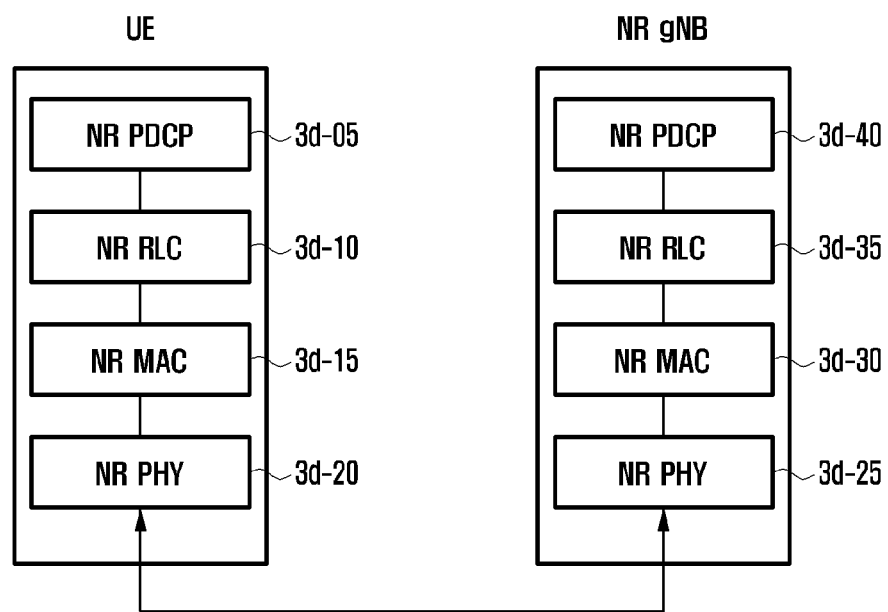
FIG. 3D is a diagram illustrating a radio protocol structure of the next generation mobile communication system according to embodiments of the present disclosure.

FIG. 3D is a diagram illustrating a radio protocol structure of the next generation mobile communication system according to embodiments of the present disclosure.

Referring to FIG. 3D, the radio protocol of the next generation mobile communication system is configured to include NR PDCPs 3d-05 and 3d-40, NR RLCs 3d-10 and 3d-35, and NR MACs 3d-15 and 3d-30 in the terminal and the NR base station. The main functions of the NR PDCPs 3d-05 and 3d-40 may include some of the following functions: header compression and decompression function (header compression and decompression: ROHC only); transfer function of user data (transfer of user data); in-sequence delivery function (in-sequence delivery of upper layer PDUs); reordering function (PDCP PDU reordering for reception); duplicate detection function (duplicate detection of lower layer SDUs); retransmission function (retransmission of PDCP SDUs); ciphering and deciphering function (ciphering and deciphering); and timer-based SDU discard function (timer-based SDU discard in uplink).

In this case, the reordering function of the NR PDCP apparatus refers to a function of reordered PDCP PDUs received in a lower layer in order based on a PDCP sequence number (SN) and may include a function of transferring data to the upper layer in the reordered order, a function of recording PDCP PDUs missed by the reordering, a function of reporting a state of the missed PDCP PDUs to a transmitting side, and a function of requesting a retransmission of the missed PDCP PDUs.

The main functions of the NR RLCs 3d-10 and 3d-35 may include some of the following functions: data transfer function (transfer of upper layer PDUs); in-sequence delivery function (in-sequence delivery of upper layer PDUs); out-of-sequence delivery function (out-of-sequence delivery of upper layer PDUs); ARQ function (Error correction through HARQ); concatenation, segmentation, reassembly function (concatenation, segmentation and reassembly of RLC SDUs); re-segmentation function (re-segmentation of RLC data PDUs); reordering function (reordering of RLC data PDUs); duplicate detection function (duplicate detection); error detection function (protocol error detection); RLC SDU discard function (RLC SDU discard); and RLC re-establishment function (RLC re-establishment).

In the above description, the in-sequence delivery function of the NR RLC apparatus refers to a function of delivering RLC SDUs received from a lower layer to an upper layer in order, and may include a function of reassembling and delivering an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of delivering only the SLC SDUs before the lost RLC SDU to the upper layer in order when there is the lost RLC SDU, a function of delivering all the received RLC SDUs to the upper layer before a predetermined timer starts if the timer expires even if there is the lost RLC SDU, or a function of delivering all the RLC SDUs received until now to the upper layer in order if the predetermined timer expires even if there is the lost RLC SDU.

Further, the NR RLC may process the RLC PDUs in the received order (in order of arrival regardless of the order of a sequence number and the sequence number), and may deliver the processed RLC PDUs to the PDCP entity the out-of-sequence delivery. In the case of the segment, the NR RLC may receive the segments which are stored in the buffer or is to be received later and reconfigure the RLC PDUs into one complete RLC PDU and then deliver the complete RLC PDU to the PDCP entity. The NR RLC layer may not include the concatenation function and may perform the function in the NR MAC layer or may be replaced by the multiplexing function of the NR MAC layer.

In this case, the out-of-sequence delivery function of the NR RLC apparatus refers to a function of directly delivering the RLC SDUs received from the lower layer to the upper layer regardless of order.

The NR MACs 3d-15 and 3d-30 may be connected to several NR RLC layer apparatus configured in one terminal, and the main functions of the NR MAC may include some of the following functions: mapping function (mapping between logical channels and transport channels); multiplexing and demultiplexing function (multiplexing/demultiplexing of MAC SDUs); scheduling information reporting function (scheduling information reporting); HARQ function (error correction through HARQ); priority handling function between logical channels (priority handling between logical channels of one UE); priority handling function between terminals (priority handling between UEs by means of dynamic scheduling); MBMS service identification function (MBMS service identification); transport format selection function (transport format selection); and padding function (padding).

The NR PHY layers 3d-20 and 3d-25 may perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 3E:
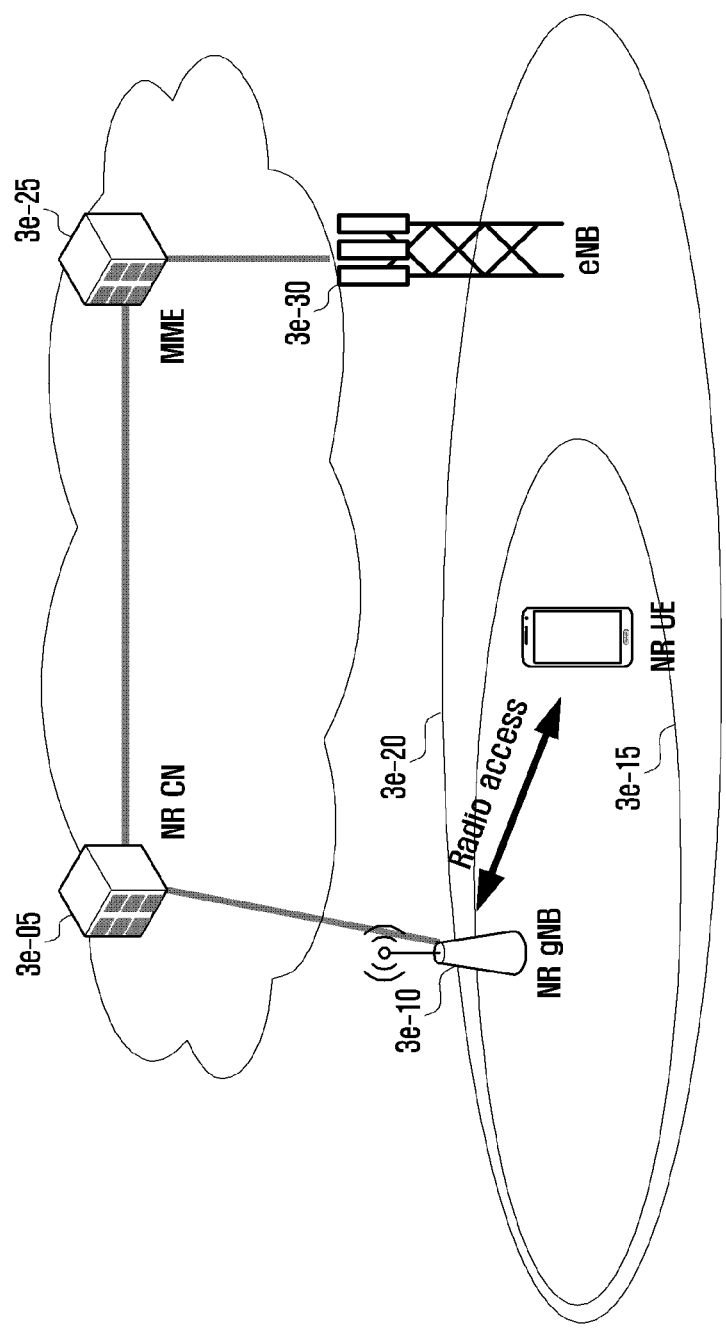
FIG. 3E is a diagram illustrating the structure of the next generation mobile communication system according to embodiments of the present disclosure.

FIG. 3E is a diagram illustrating the structure of the next generation mobile communication system according to embodiments of the present disclosure.

Referring to FIG. 3E, a radio access network of a next generation mobile communication system is configured to include a next generation base station (New radio node B, hereinafter NR NB or NR base station) 3e-10 and a new radio core network (NR CN) 3e-05. The user terminal (new radio user equipment, hereinafter, NR UE or UE) 3e-15 accesses the external network through the NR NB 3e-10 and the NR CN 3e-05.

In FIG. 3E, the NR NB 3e-10 corresponds to an evolved node B (eNB) of the existing LTE system. The NR NB is connected to the NR UE 3e-15 via a radio channel and may provide a service superior to the existing node B. In the next generation mobile communication system, since all user traffics are served through a shared channel, an apparatus for collecting state information such as a buffer state, an available transmission power state, and a channel state of the UEs to perform scheduling is required. The NR NB 3e-10 may serve as the device. One NR NB generally controls a plurality of cells. In order to realize the high-speed data transmission compared with the existing LTE, the NR gNB may have the existing maximum bandwidth or more, and may be additionally incorporated into a beam-forming technology by using orthogonal frequency division multiplexing (hereinafter, referred to as OFDM) as a radio access technology. Further, an adaptive modulation and coding (hereinafter, referred to as AMC) determining a modulation scheme and a channel coding rate according to a channel status of the terminal is applied. The NR CN 3e-05 may perform functions such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 3e-25 through the network interface. The MME is connected to the eNB 3e-30 which is the existing base station.

Figure 3F:
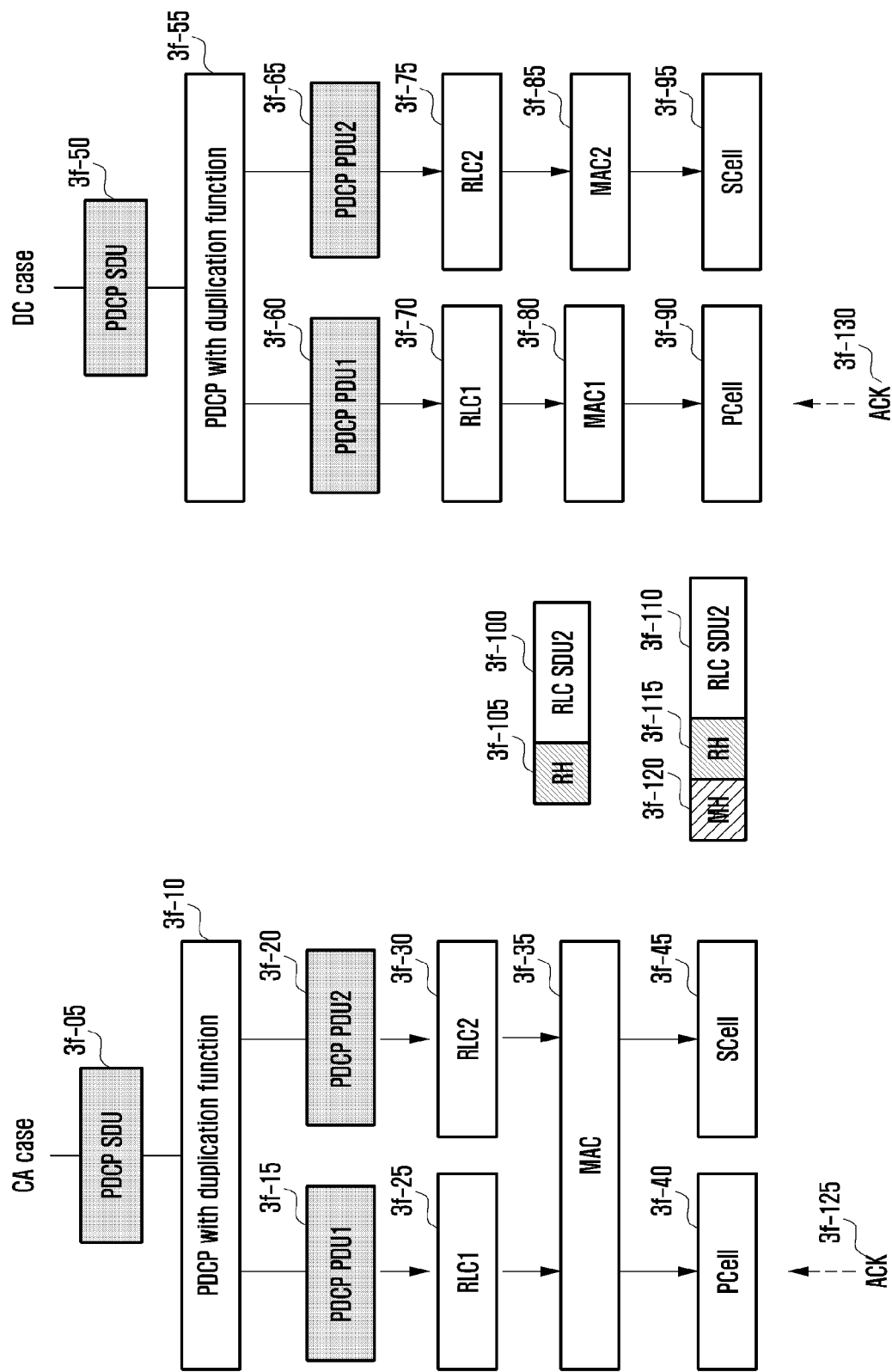
FIG. 3F is a diagram schematically illustrating data transmission through packet duplication, which is considered in the disclosure, and illustrating how a terminal processes a duplicated packet according to embodiments of the present disclosure.

FIG. 3F is a diagram schematically illustrating data transmission through packet duplication, which is considered in the disclosure, and illustrating how a terminal processes a duplicated packet according to embodiments of the present disclosure.

The disclosure is a method in which the terminal delivers duplicated data through a different path (or expressed as leg) from an original packet when performing a packet duplication function in order to support ultra-reliable low latency communication (URLLC) in the next generation mobile communication system. When the duplicated data is allocated to the same MAC PDU, duplication transmission is impossible, and as a result, dual connectivity (DC) or carrier aggregation (CA) may be used. In other words, the terminal may be configured with SgNB or SCell to support the dual connectivity or carrier aggregation. In the disclosure, it is assumed that the dual connectivity and carrier aggregation are configured and a basic principle will be described through a packet processing method for each protocol structure in each case.

Referring back to FIG. 3F, the base station or the terminal receives a data packet for URLLC, that is, a PDCP SDU, from a higher layer (3f-05 and 3f-50) and delivers the PDCP SDU to a PDCP layer. In steps 3f-10 and 3f-55, the PDCP determines whether the corresponding data packet is replicated and when the replication is required, original PDCP PDU 1 and replicated PDCP PDU 2 are generated and then, delivered to an RLC layer (3f-25, 3f-30, 3f-70, and 3f-75). In the above step, the determination of the packet replication is performed with packet duplication activation/deactivation MAC CE (hereinafter, referred to as Du A/D MAC CE) received from the base station. RLC1 and RLC2 of each serving cell transmit the received data packet to MgNB and the MAC layer of the terminal. The packet data received in 3f-35, 3f-80, and 3f-85 (in case of CA, one MAC may exist and two MACs may exist in case of DC) to an appropriate logical channel group (LCG) and then an MAC PDU is generated and delivered to physical layers (3f-40, 3f-45, 3f-90, and 3f-95) of the corresponding serving cell.

The physical layer then transmits the MAC PDU received through the corresponding carrier aggregation or dual connectivity and a reception process is performed in a reverse order of the transmission process as it is. That is, the physical layer receives the data packet (MAC PDU) through the corresponding serving cells and delivers the data packet to the MAC layer of the terminal or the corresponding base station. The PDCP PDU 1 and the PDCP PDU 2 via the RLC are collected in the PDCP of the terminal or the base station. In the PDCP, when the same packet arrives by checking sequence numbers (SN) of the original packet and the replicated packet received, one is deleted and then, delivered to the higher layer.

Figure 3G:
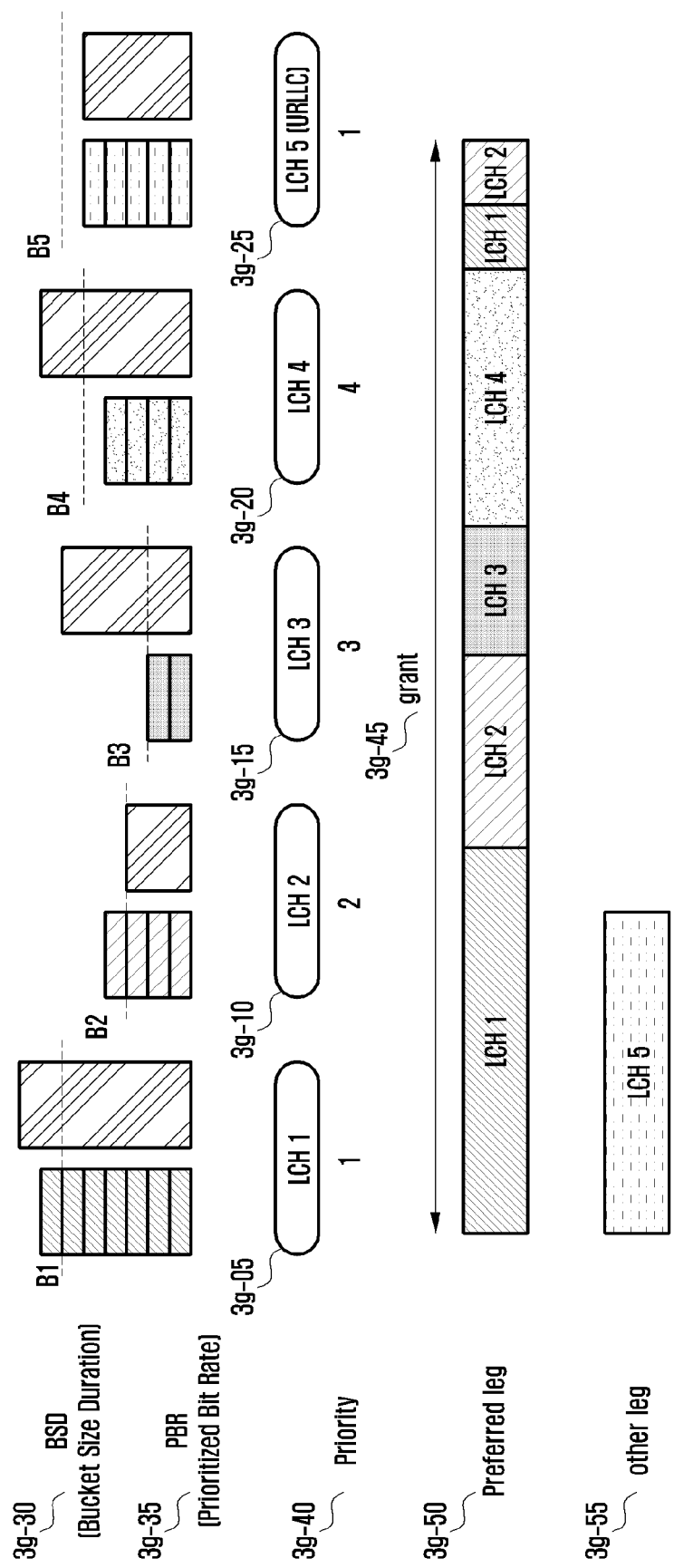
FIG. 3G is a diagram illustrating an operation of accumulating a token by applying a priority bit rate for each logical channel as a part of a logical channel priority operation in a MAC according to embodiments of the present disclosure.

FIG. 3G is a diagram illustrating an operation of accumulating a token by applying a priority bit rate for each logical channel as a part of a logical channel priority operation in a MAC according to embodiments of the present disclosure.

Referring to FIG. 3G, a logical channel prioritization (LCP) operation in the MAC considered in the disclosure may be known. The above operation refers to the LCP in the LTE, and there is a difference in that a problem which may occur when the existing LTE operation is performed at it is in a specific situation in the NR is solved. The situation considered in the disclosure is as follows, and the operation of accumulating the tokens by applying a prioritized bit rate to each logical channel (LCH) in the following situation is described in detail: 1. Operation at the time of receiving packet duplicated activation/deactivation MAC CE; 2. Operation at the time of changing uplink path; and 3. Operation at the time of changing from split bearer to non-split bearer (alternatively, in an opposite case).

In the MAC of the terminal, when the bearer setup with the base station is completed, a data packet is accumulated by a prioritized bit rate 3g-30 (hereinafter, referred to as PBR) for each LCH 3g-05, 3g-10, 3g-15, 3g-20, or 3g-25 for every transmission time interval (TTI) with respect to the configured bearer. The above operation is performed for each LCH, and repeated for a bucket size duration (BSD) 3g-35 which is another setting value. If the packet is accumulated by a BSD set in a specific LCH, the above operation is stopped and the corresponding operation is stopped until the packet becomes empty. In addition, the operation is performed based on the priority 3g-40 in the LCP. To illustrate the example in the drawing, LC 5 is configured to PBR and BSD with the same priority, for packet duplication for LCH 1. The parameters may be set as other values.

The remaining LCH 2, 3, and 4 have each priority and PBR and BSD. In the LTE, the LCHs and LCH-specific parameters are configured when the base station performs the bearer setup through the RRC to the terminal, and the bearer setup is performed by the RRC and simultaneously, the PBR is accumulated in every TTI. However, if this operation is performed, in the LCH 5 where the packet duplication is configured, the packet duplication activation does not actually start, but the PBR is accumulated, and if the packet duplication is activated through Du A/D MAC CE over time, the pre-accumulated PBR is used for the BSR request and such an operation is not fit with the introduction purpose of activation/deactivation. Therefore, the terminal will have to accumulate the PBR for LCH 5 (LCH for packet duplication) since receiving the Du A/D MAC CE.

In the disclosure, first, the operation when packet duplication inactivation is instructed through the Du A/D MAC CE, which is the first consideration, will be described in detail. In addition to the PBR token processing method when the packet duplication RRC configuration and the activation through the MAC CE are instructed, it is necessary to change the operation of the PBR token processing method of the terminal when the packet duplication inactivation is instructed through the MAC CE. If the operation in the existing LTE is maintained, even though the terminal receives the packet duplication deactivation through the MAC CE, the PBR accumulated in the corresponding LCH may be maintained without emptying, and if the packet duplication is activated again thereafter, the pre-accumulated PBR is used in the BSR request.

However, since the operation is not fit with the introduction purpose of the packet duplication deactivation, when the terminal receives the packet duplication deactivation through the MAC CE, the terminal resets the PBR for the corresponding LCH to 0. That is, the PBR accumulated on the corresponding LCH is emptied. In the disclosure, it is assumed that the activation and deactivation of packet duplication for a specific DRB is instructed through the MAC CE, and the association between the LCH through which the original data associated with the corresponding DRB is transferred and the LCH through which the duplicated data is transferred is known. This may be specified at the time of the DRB configuration through the RRC message. The corresponding operation is summarized as follows.

1. Receiving packet duplication deactivation for DRB x (on the auxiliary LCH where packet duplication is performed): Bj accumulated in the corresponding LCH j is reset to 0. Here, Bj is the amount of buckets accumulated in the corresponding LCH j and is defined as PBR×TTI; stop operation of accumulating PBR on the LCH (restart PBR accumulating operation when packet duplication activation is instructed).

Method 1: By adjusting the PBR value to 0 (that is, when MAC CE packet duplication deactivation is instructed, the PBR value is adjusted to 0).

Method 2: The PBR accumulating interruption operation is specified during a deactivated time T (i.e., PBR accumulating interruption when the MAC CE packet duplication deactivation is instructed).

The operation where the uplink path is changed, which is the second consideration situation, will be described in detail. The corresponding operation corresponds to a case where the terminal changes the primary RLC entity by the RRC reconfiguration message. In this case, since the RLC path responsible for the uplink transmission is changed by the terminal, the detailed operation of the previous RLC entity and the changed RLC entity is required When the RRC message is received, the terminal defines an operation of accumulating and resetting the PBR tokens in LCH_old corresponding to the previous RLC entity and LCH_new corresponding to the changed RLC_entity. Basically, from the moment when the uplink path change is requested through the RRC message, the PBR token is accumulated in the LCH_new and the subsequent LCP operation is performed. In the LCH_old, the PBR for the corresponding LCH is reset to 0 as soon as the uplink path change is requested through the RRC message. That is, the PBR accumulated on the corresponding LCH is emptied. The corresponding operation is summarized as follows.

2. In the case where the uplink path is changed (change primary RLC entity to RRC message): Bj accumulated in the corresponding LCH j is reset to 0. Here, Bj is the amount of buckets accumulated in the corresponding LCH j and is defined as PBR×TTI; and stop operation of accumulating PBR on the LCH (restart the PBR accumulating operation when the uplink path is rechanged to the corresponding LCH).

Method 1: When the uplink path is switched, the PBR value of the previous LCH is set to 0, and when the original path is switched back, the PBR value is set to the original PBR value.

Method 2: The PBR accumulating interruption operation is specified during the time T when the original path is switched and the uplink transmission is interrupted.

Even when the split bearer is changed to the non-split bearer or vice-verse, which is a third consideration, it is necessary to define the operation of accumulating the PBR tokens by the terminal. In particular, when the terminal receives a change request from a split bearer to a non-split bearer through an RRC message or vice versa, the terminal receives a change request from the split bearer to the split bearer, the detailed operation of stacking the PBR tokens of the LCH on a non-preferred path is required. In addition, the situation is also applied to the case where the split bearer is stopped and the non-split bearer is operated because the amount of PDCP data and the amount of RLC data to be transmitted to two RLC entities configured to the split bearer are smaller than a set threshold value. When the bearer is changed from the split bearer to the non-split bearer, the terminal resets the PBR accumulated in the non-preferred path (specific LCH) to 0. In the opposite case, when the bearer is changed from the non-split bearer to the split bearer, the terminal performs the operation of accumulating the PBR token of the LCH for the non-preferred path from the moment when the RRC message is received. The corresponding operation is summarized as follows.

3. At the time of changing from the split bearer to the non-split bearer (changing the bearer by the RRC message and change the bearer by the threshold value operation): Bj accumulated in the corresponding LCH j is reset to 0. Here, Bj is the amount of buckets accumulated in the corresponding LCH j and is defined as PBR×TTI; and stop the operation of accumulating PBR on the LCH (restart the PBR accumulating operation when the bearer is changed to the split bearer again and the transmission to the corresponding LCH is determined).

Method 1: At the time of changing from the split bearer to the non-split bearer, the PBR value of the non-preferred path LCH is set to 0, and when the bearer is changed to the split bearer again and the transmission to the corresponding LCH is determined, the value is set to the original PBR value.

Method 2: The PBR accumulating interruption operation is specified for a time T when the split bearer is released because the amount of data is less than the threshold.

After the LCP operation in a state where the packet duplication is applied as described above, the terminal requests the BSR to the base station and stores the data according to the LCP procedure in the grant received from the base station. The LCP procedure may refer to the procedure in the LTE and, in summary, follows the following order.

1. Data stored by LCH priority are sequentially stored (not exceed the BSD by LCH).

2. When data for all valid LCHs are stored and the grant is left, all the data for the LCH with the highest priority are stored, and then equally applied even to the next priorities.

3. In the case of the LCH to which the packet duplication is applied, PBR and LCP operation after receiving activation indication of Du A/D MAC CE.

4. The packet duplication packet and the original packet are stored in different grants.

5. In the case of the LCH to which the packet duplication is applied, PBR operation is reset when receiving deactivation indication of Du A/D MAC CE.

Figure 3H:
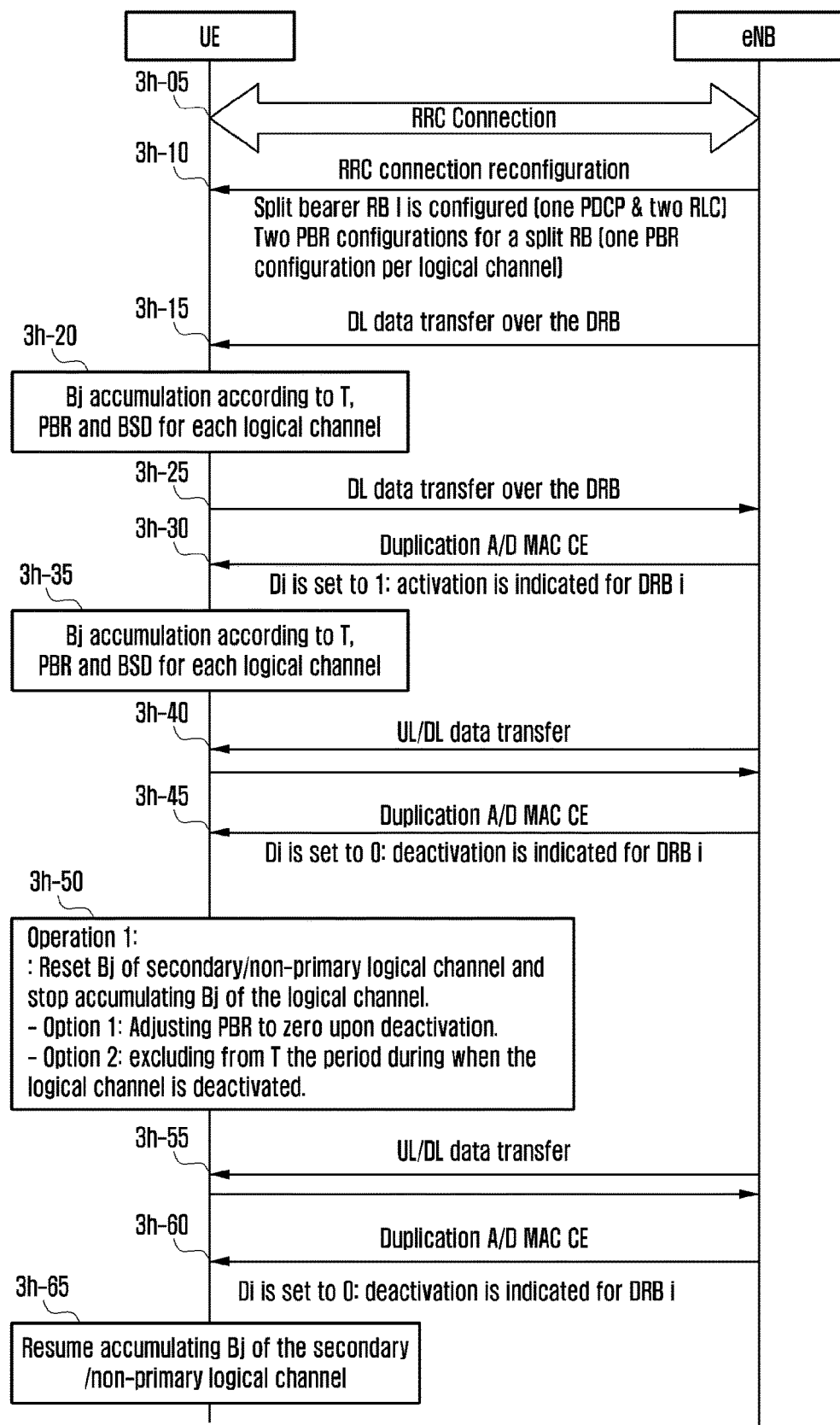
FIG. 3H is a view illustrating an operation of processing a priority bit rate when a terminal for which packet duplication is set up receives a packet duplication deactivation MAC CE as a 3-1th embodiment of the present disclosure.
Figure 31:
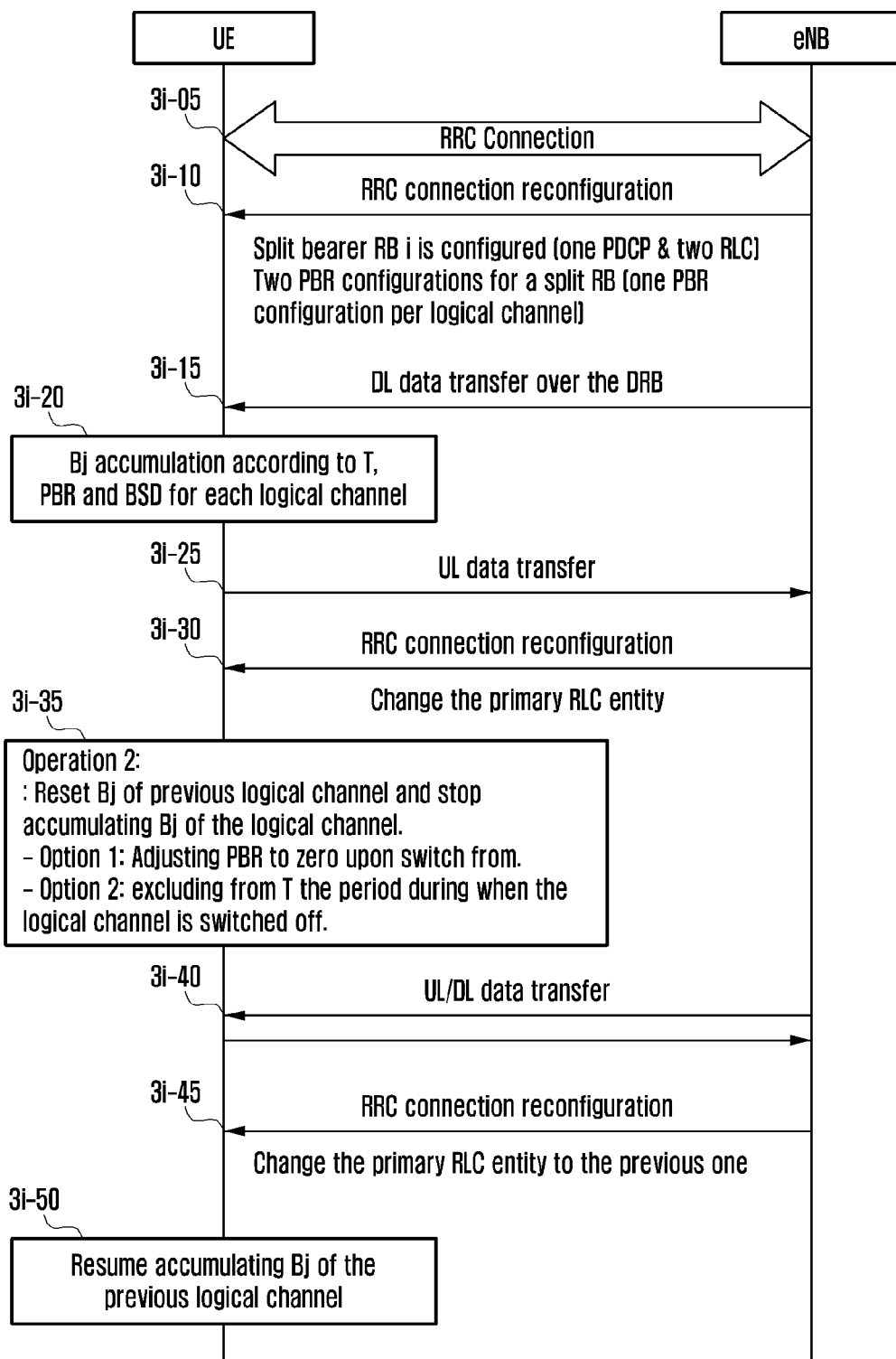

FIG. 3H is a view illustrating an operation of processing a priority bit rate when a terminal for which packet duplication is set up receives a packet duplication deactivation MAC CE as a 3-1th embodiment of the present disclosure.

The terminal configures the RRC connection with the base station for data transmission and reception (3h-05), and receives the RRC message containing the bearer setup for URLLC from the base station (3h-10). For the operation, CA or DC may be configured, and when the CA is applied, an RLC configured for URLLC transmission among the RLC of the SCell may be additionally configured, and an additional LCG cell group and a serving cell may be configured. If the DC is applied, the configuration for the SCG cell may include a logical channel for URLLC, i.e., an RLC and a serving cell configuration. In addition, the DRB configuration indicates whether duplication is applied for each split bearer, and a preferred path for each split bearer may be configured That is, an indicator for indicating the packet duplication may be indicated to a specific radio bearer (RB) i. In this case, the RB i may be configured with a split bearer so that one PDCP and two RLCs may be configured.

The preferred path may be mapped to a specific logical channel id and designated as a path through which a specific service is delivered. Alternatively, the preferred path may be used to specify the path to which the original data packet is delivered, and may be used for which path is used and the like when the quality of both paths is good. In the DBR configuration, a parameter related to the LCP may be configured (logicalChannelConfig) for each LCH. The priority of the corresponding LCH, PBR, BSD, and LCG may be configured as the corresponding parameter. In the DRB configuration, since two RLCs are configured in the split bearer and the corresponding RLC is designated as a specific LCH. There are two LCH-related configurations, and in particular, two PBRs are configured in response to the respective LCHs.

Thereafter, the terminal performs the up and down data transmission with the base station (3h-15, 3h-25). In the downlink, the base station may immediately perform the downlink packet duplication operation with respect to the split bearer in which the packet duplication is configured. On the other hand, in the case of uplink packet duplication, since the uplink packet duplication is operated after indicating the activation/deactivation through Du A/D MAC CE, the uplink packet duplication is not applied in a current step. In step 3h-20, the terminal applies a buffer status (BS) computation method 1 to all DRBs for uplink data transmission. The base station computation method 1 means calculating the base station by considering only the PDCP data volume for the preferred logical channel when calculating the PDCP data volume of the split DRB Also, in the operation, the terminal configures the corresponding bearer in the RRC and simultaneously accumulates the PBR for the preferred logical channel in each TTI. The PBR does not accumulate above the BSD value, and the amount of buckets accumulated in the corresponding LCH j is called Bj. In the above step, an operation of accumulating the PBR is not performed with respect to the secondary/non-preferred logical channel.

Thereafter, the base station may instruct the activation of the packet duplication for a predetermined DRB to the terminal through the Du A/D MAC CE due to the certain reason (3h-30). That is, a Di field of the Du A/D MAC CE is set to 1 and transmitted to the terminal. For the predetermined reason, the base station may determine that the packet duplication is required by determining the transmission link quality of the terminal, or may determine that the URLLC mode is required according to the base station implementation for the specific service mapped to the LCH. In the terminal aspect, if the duplication of at least one DRB is newly activated after receiving the Du A/D MAC CE, the terminal performs the following operation (3h-35): converting the base station computation method from method 1 to method 2 with respect to the DRB in which the duplication is activated; regular BSR trigger; and for the secondary/non-primary LCH, a bucket corresponding to the PBR every TTI starts to be accumulated and Bj is saved.

Here, the base station computation method 1 means that a PDCP data volume is considered only in the base station for the preferred logical channel when calculating the PDCP data volume of the split DRB. The BS computation method 2 means that the PDCP data volume for both the base station of the preferred logical channel and the base station of the non-preferred logical channel is considered when calculating the PDCP data volume of the split DRB. Unlike the method, as an alternative solution, the MAC notifies an A/D situation to the PDCP and the PDCP may appropriately notify the PDCP data volume to the MAC according to the situation.

In particular, in the disclosure, the operation of processing PBR is focused. In step 3h-40, the terminal performs uplink and downlink data transmission with the base station using all of the packet-duplicated paths. In step 3h-45, if the terminal receives the Du A/D MAC CE indicating the deactivation of packet duplication for the configured DRB, that is, if the Di field of the Du A/D MAC CE is set to 0, The UE deactivates the LCH corresponding to the non-preferred path of the corresponding DRB and performs a first operation in step 3h-50. Here, the first operation is to reset the Bj saved in the secondary/non-primary LCH to 0 and stop the operation of accumulating the Bj in the corresponding LCH. That is, the operation of accumulating buckets by PBR every TTI is stopped. For the operation, two methods below may be applied.

Method 1: Adjusting the PBR value to 0 (that is, when MAC CE packet duplication deactivation is instructed, the PBR value is adjusted to 0).

Method 2: The PBR saving is stopped in the MAC during a deactivated time T (i.e., PBR accumulating is stopped when the MAC CE packet duplication deactivation is instructed).

In step 3h-55, the terminal performs uplink and downlink data transmission with the base station through the preferred path. In step 3h-60, if the packet duplication activation for the corresponding DRB i is instructed again, that is, if the Di field value of the Du A/D MAC CE is set to 1, in step 3h-65, the terminal restarts the operation of accumulating the Bj which has been stopped for the secondary/non-primary LCH of the configured DRB. That is, for the secondary/non-primary LCH, a bucket corresponding to the PBR every TTI starts to be accumulated and Bj is saved.

FIG. 3I is a diagram illustrating an operation of processing a priority bit rate when an uplink transmission path of a terminal is switched as a 3-2th embodiment of the present disclosure.

The terminal configures the RRC connection with the base station for data transmission and reception (3i-05), and receives the RRC message containing the bearer setup for URLLC from the base station (3i-10). For the operation, CA or DC may be configured, and when the CA is applied, an RLC configured for URLLC transmission among the RLC of the SCell may be additionally configured, and an additional LCG cell group and a serving cell may be configured. If the DC is applied, the configuration for the SCG cell may include a logical channel for URLLC, i.e., an RLC and a serving cell configuration. In addition, the DRB configuration indicates whether duplication is applied for each split bearer, and a preferred path for each split bearer may be configured That is, an indicator for indicating the packet duplication may be indicated to a specific radio bearer (RB) i. In this case, the RB i may be configured with a split bearer so that one PDCP and two RLCs may be configured. The preferred path may be mapped to a specific logical channel id and designated as a path through which a specific service is delivered.

Alternatively, the preferred path may be used to specify the path to which the original data packet is delivered, and may be used for which path is used and the like when the quality of both paths is good. In the DBR configuration, a parameter related to the LCP may be configured (logicalChannelConfig) for each LCH. The priority of the corresponding LCH, PBR, BSD, and LCG may be configured as the corresponding parameter. In the DRB configuration, since two RLCs are configured in the split bearer and the corresponding RLC is designated as a specific LCH. There are two LCH-related configurations, and in particular, two PBRs are configured in response to the respective LCHs.

Thereafter, the terminal performs the up and down data transmission with the base station (3i-15, 3i-25). In the downlink, the base station may immediately perform the downlink packet duplication operation with respect to the split bearer in which the packet duplication is configured. On the other hand, in the case of uplink packet duplication, since the uplink packet duplication is operated after indicating the activation/deactivation through Du A/D MAC CE, the uplink packet duplication is not applied in a current step. In step 3i-20, the terminal applies a buffer status (BS) computation method 1 to all DRBs for uplink data transmission. The base station computation method 1 means calculating the base station by considering only the PDCP data volume for the preferred logical channel when calculating the PDCP data volume of the split DRB Also, in the operation, the terminal configures the corresponding bearer in the RRC and simultaneously accumulates the PBR for the preferred logical channel in each TTI. The PBR does not accumulate above the BSD value, and the amount of buckets accumulated in the corresponding LCH j is called Bj. In the above step, an operation of accumulating the PBR is not performed with respect to the secondary/non-preferred logical channel.

Thereafter, the base station may switch the primary RLC entity configured to the terminal to another RLC entity through the RRC message in step 3i-30 for a predetermined reason. That is, the secondary RLC entity configured in the corresponding split bearer may be changed to the primary RLC entity, and the primary RLC entity in operation may be changed to the secondary RLC entity. In this case, only the data transmission/reception to the primary RLC entity is performed because the packet duplication is in the deactivated state. The terminal receiving an uplink transmission path switching RRC message performs a second operation in step 3i-35. The second operation is to reset the Bj saved in the secondary/non-primary LCH (the previous primary LCH) to 0 and stop the operation of accumulating the Bj in the corresponding LCH. That is, the operation of accumulating buckets by PBR every TTI is stopped. For the operation, two methods below may be applied.

Method 1: When an uplink path is switched, the PBR value of the previous LCH is set to 0.

Method 2: During the time T when an original path is switched and the uplink transmission is stopped, the MAC instructs the corresponding LCH (previous primary LCH) PBR saving stop In step 3i-40, the terminal performs uplink and downlink data transmission with the base station through the configured preferred path. In step 3i-45, when the terminal receives a message of switching the primary RLC entity configured to the terminal to another RLC entity through the RRC message from the base station, that is, when the primary RLC entity is switched to the uplink path which has been first configured again, in step 3i-50, the terminal switches the primary RLC to the previous LCH of the configured DRB and restarts the operation of accumulating the Bj which has been stopped on the corresponding LCH. That is, for the switched LCH, a bucket corresponding to the PBR every TTI starts to be accumulated and Bj is saved.

Figure 3J:
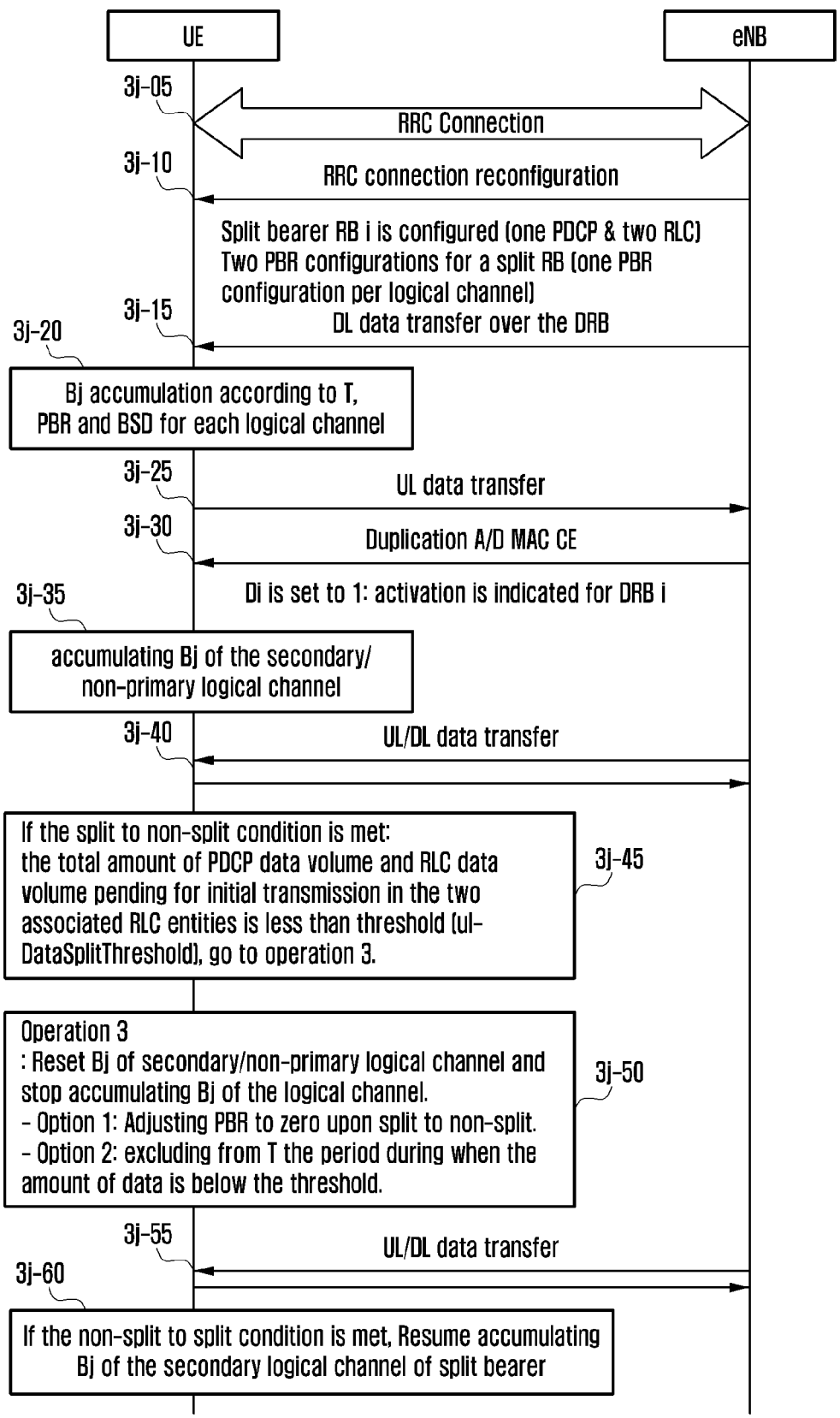
FIG. 3J is a diagram illustrating an operation of processing a priority bit rate when a UE in which a split bearer is configured is changed to a non-split bearer as a 3-3th embodiments of the present disclosure.

FIG. 3J is a diagram illustrating an operation of processing a priority bit rate when a UE in which a split bearer is configured is changed to a non-split bearer as a 3-3th embodiments of the present disclosure.

The terminal configures the RRC connection with the base station for data transmission and reception (3j-05), and receives the RRC message containing the bearer setup for URLLC from the base station (3j-10). For the operation, CA or DC may be configured, and when the CA is applied, an RLC configured for URLLC transmission among the RLC of the SCell may be additionally configured, and an additional LCG cell group and a serving cell may be configured.

If the DC is applied, the configuration for the SCG cell may include a logical channel for URLLC, i.e., an RLC and a serving cell configuration. In addition, the DRB configuration indicates whether duplication is applied for each split bearer, and a preferred path for each split bearer may be configured That is, an indicator for indicating the packet duplication may be indicated to a specific radio bearer (RB) i. In this case, the RB i may be configured with a split bearer so that one PDCP and two RLCs may be configured.

The preferred path may be mapped to a specific logical channel id and designated as a path through which a specific service is delivered. Alternatively, the preferred path may be used to specify the path to which the original data packet is delivered, and may be used for which path is used and the like when the quality of both paths is good. In the DBR configuration, a parameter related to the LCP may be configured (logicalChannelConfig) for each LCH. The priority of the corresponding LCH, PBR, BSD, and LCG may be configured as the corresponding parameter. In the DRB configuration, since two RLCs are configured in the split bearer and the corresponding RLC is designated as a specific LCH. There are two LCH-related configurations, and in particular, two PBRs are configured in response to the respective LCHs.

Thereafter, the terminal performs the uplink and downlink data transmission with the base station (3j-15, 3j-25). In the downlink, the base station may immediately perform the downlink packet duplication operation with respect to the split bearer in which the packet duplication is configured. On the other hand, in the case of uplink packet duplication, since the uplink packet duplication is operated after indicating the activation/deactivation through Du A/D MAC CE, the uplink packet duplication is not applied in a current step. In step 3j-20, the terminal applies a buffer status (BS) computation method 1 to all DRBs for uplink data transmission. The base station computation method 1 means calculating the base station by considering only the PDCP data volume for the preferred logical channel when calculating the PDCP data volume of the split DRB Also, in the operation, the terminal configures the corresponding bearer in the RRC and simultaneously accumulates the PBR for the preferred logical channel in each TTI. The PBR does not accumulate above the BSD value, and the amount of buckets accumulated in the corresponding LCH j is called Bj. In the above step, an operation of accumulating the PBR is not performed with respect to the secondary/non-preferred logical channel.

Thereafter, the base station may instruct the activation of the packet duplication for a predetermined DRB to the terminal through the Du A/D MAC CE due to the certain reason (3j-30). That is, a Di field of the Du A/D MAC CE is set to 1 and transmitted to the terminal. For the predetermined reason, the base station may determine that the packet duplication is required by determining the transmission link quality of the terminal, or may determine that the URLLC mode is required according to the base station implementation for the specific service mapped to the LCH. In the terminal aspect, if the duplication of at least one DRB is newly activated after receiving the Du A/D MAC CE, the terminal performs the following operation (3j-35): converting the base station computation method from method 1 to method 2 with respect to the DRB in which the duplication is activated; regular BSR trigger; and for the secondary/non-primary LCH, a bucket corresponding to the PBR every TTI starts to be accumulated and Bj is saved.

Here, the base station computation method 1 means that a PDCP data volume is considered only in the base station for the preferred logical channel when calculating the PDCP data volume of the split DRB. The BS computation method 2 means that the PDCP data volume for both the base station of the preferred logical channel and the base station of the non-preferred logical channel is considered when calculating the PDCP data volume of the split DRB. Unlike the method, as an alternative solution, the MAC notifies an A/D situation to the PDCP and the PDCP may appropriately notify the PDCP data volume to the MAC according to the situation.

In particular, in the disclosure, the operation of processing PBR is focused. In step 3j-40, the terminal performs uplink and downlink data transmission with the base station using all of the packet-duplicated paths.

In step 3j-45, the terminal calculates a total PDCP data volume pending for transmission to the configured split bearer and an RLC data volume in two RLC entities and compares a predetermined threshold value ul-DataSplit-Threshold to the RRC with the value. If the data volume saved for the transmission is smaller than the threshold value, in step 3j-50, the bearer is changed from the split bearer to the non-split bearer, the secondary/non-primary LCH is deactivated, and a third operation is performed. The third operation occurs by an operation of changing and transmitting the data saved in the split bearer to the non-split bearer and is performed by resetting the Bj saved in the secondary/non-primary LCH (the previous primary LCH) to 0 and stopping the operation of accumulating the Bj in the corresponding LCH. That is, the operation of accumulating buckets by PBR every TTI is stopped. For the operation, two methods below may be applied.

Method 1: A PBR value of a non-preferred path LCH is set to 0 when changing from a split bearer to a non-split bearer Method 2: The PBR accumulating interruption operation is specified for a time T when the split bearer is released because the amount of data is less than the threshold.

In step 3j-55, the terminal performs uplink and downlink data transmission with the base station through the configured preferred path. In step 3j-60, if a change condition from the non-fragmented bearer to the split bearer is satisfied, the terminal restarts the operation of accumulating the Bj which has been stopped with respect to the secondary/non-primary LCH of the configured DRB. That is, with respect to the secondary/non-primary LCH of the corresponding DRB after the change to the split bearer, a bucket corresponding to the PBR every TTI starts to be accumulated and the Bj is saved. The change condition from the non-split bearer to the split bearer is as follows. The total PDCP data volume pending for transmission to the configured split bearer and the RLC data volume of the two RLC entities are calculated, a predetermined threshold value ul-DataSplitThreshold is compared with the value by the RRC, and then the data volume saved for the transmission is larger than the threshold value.

Figure 3K:
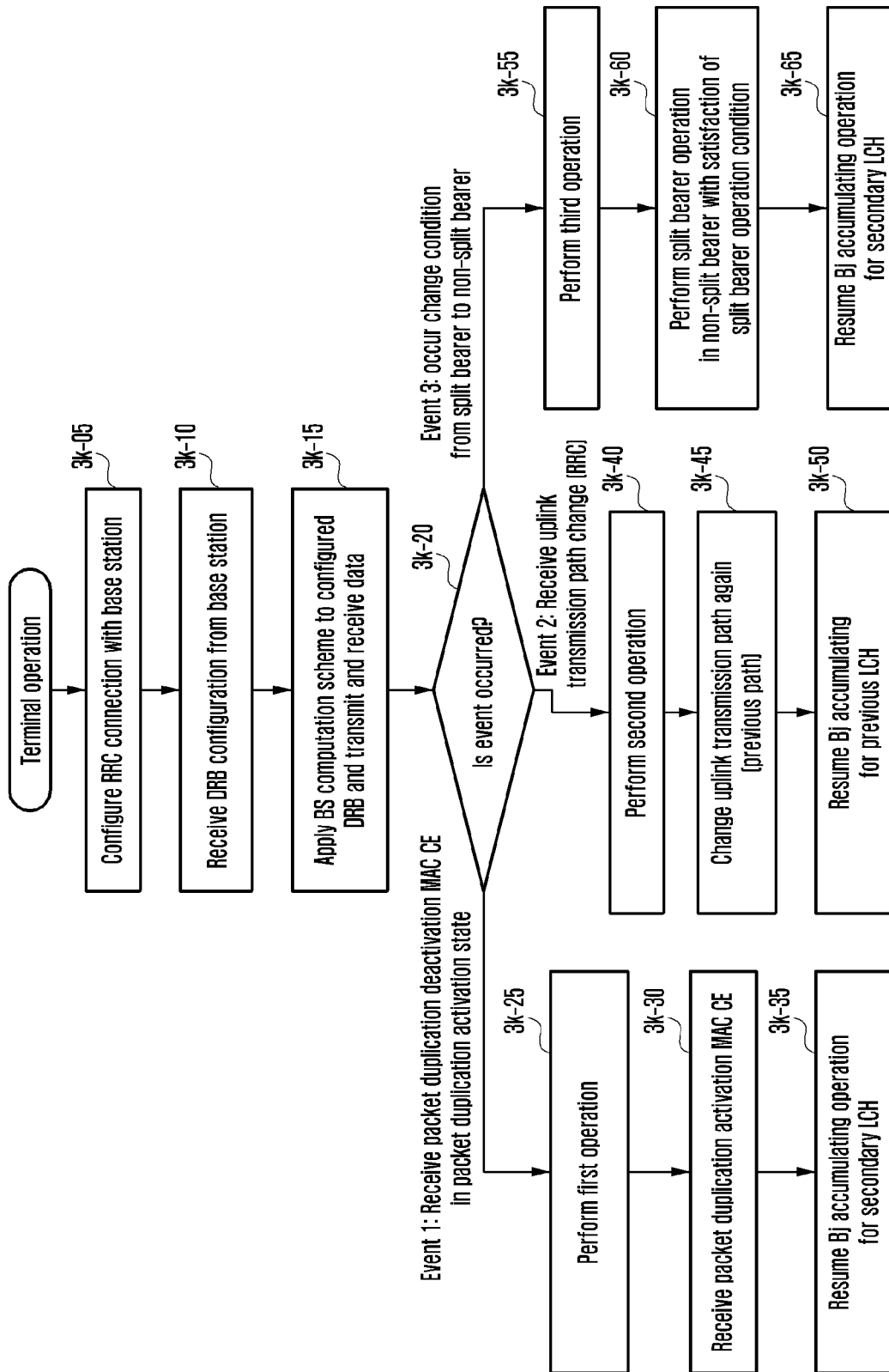
FIG. 3K is an overall diagram related to an operation for processing a priority bit rate of a terminal according to embodiments of the present disclosure.

FIG. 3K is an overall diagram related to an operation for processing PBR according to embodiments of the present disclosure.

The terminal configures the RRC connection with the base station for data transmission and reception (3i-05), and receives the RRC message containing the bearer setup for URLLC from the base station (3k-10). For the operation, CA or DC may be configured, and when the CA is applied, an RLC configured for URLLC transmission among the RLC of the SCell may be additionally configured, and an additional LCG cell group and a serving cell may be configured. If the DC is applied, the configuration for the SCG cell may include a logical channel for URLLC, i.e., an RLC and a serving cell configuration. In addition, the DRB configuration indicates whether duplication is applied for each split bearer, and a preferred path for each split bearer may be configured That is, an indicator for indicating the packet duplication may be indicated to a specific radio bearer (RB) i. In this case, the RB i may be configured with a split bearer so that one PDCP and two RLCs may be configured.

The preferred path may be mapped to a specific logical channel id and designated as a path through which a specific service is delivered. Alternatively, the preferred path may be used to specify the path to which the original data packet is delivered, and may be used for which path is used and the like when the quality of both paths is good. In the DBR configuration, a parameter related to the LCP may be configured (logicalChannelConfig) for each LCH. The priority of the corresponding LCH, PBR, BSD, and LCG may be configured as the corresponding parameter. In the DRB configuration, since two RLCs are configured in the split bearer and the corresponding RLC is designated as a specific LCH. There are two LCH-related configurations, and in particular, two PBRs are configured in response to the respective LCHs.

Thereafter, the terminal performs the uplink and downlink data transmission with the base station, and in the case of the downlink, the base station may immediately perform the downlink packet duplication operation with respect to the split bearer in which the packet duplication is configured. On the other hand, in the case of uplink packet duplication, since the uplink packet duplication is operated after indicating the activation/deactivation through Du A/D MAC CE, the uplink packet duplication is not applied in a current step. In step 3k-15, the terminal applies a buffer status (BS) computation method 1 to all DRBs for uplink data transmission. The base station computation method 1 means calculating the base station by considering only the PDCP data volume for the preferred logical channel when calculating the PDCP data volume of the split DRB Also, in the operation, the terminal configures the corresponding bearer in the RRC and simultaneously accumulates the PBR for the preferred logical channel in each TTI. The PBR does not accumulate above the BSD value, and the amount of buckets accumulated in the corresponding LCH j is called Bj. In the above step, an operation of accumulating the PBR is not performed with respect to the secondary/non-preferred logical channel.

In step 3k-20, the terminal performs a different operation depending on whether a specific event occurs. If an event 1 occurs in which the packet duplication has been previously activated and the terminal receives the packet duplication deactivation MAC CE while performing the corresponding operation, the terminal performs the first operation in step 3k-25 and transmits and receives the data while maintaining the corresponding configuration. In step 3k-30, when receiving the MAC CE for activating the packet duplication of the corresponding DRB again, the terminal restarts the Bj saving operation for the secondary LCH in step 3k-35.

In step 3k-20, if an event 2 occurs in which the terminal receives an RRC message indicating the change of the uplink transmission path from the base station, the terminal performs a second operation in step 3k-40. The RRC message may indicate the change of the primary RLC entity, and it is assumed that the packet duplication is in the deactivated state in the above step. In step 3k-45, when the terminal receives a message of previously changing the uplink transmission path again from the base station, the terminal resumes the Bj saving operation for the previous LCH in step 3k-50.

In step 3k-20, if an event 3 corresponding to a change condition from the split bearer to the non-split bearer occurs, the terminal performs a third operation in step 3k-55. The condition corresponds to a case where a total PDCP data volume pending for transmission to the configured split bearer from the base station and an RLC data volume of the two RLC entities are calculated, a predetermined threshold value ul-DataSplitThreshold is compared with the value by the RRC, and then the data volume saved for the transmission is smaller than the threshold value. In step 3k-60, when the terminal satisfies the condition corresponding to the change from the non-split bearer to the split bearer again, the terminal resumes the Bj saving operation for the secondary LCH in step 3k-65. The condition corresponds to a case where a total PDCP data volume pending for transmission to the configured split bearer from the base station and an RLC data volume of the two RLC entities are calculated, a predetermined threshold value ul-DataSplitThreshold is compared with the value by the RRC, and then the data volume saved for the transmission is larger than the threshold value.

Figure 3L:
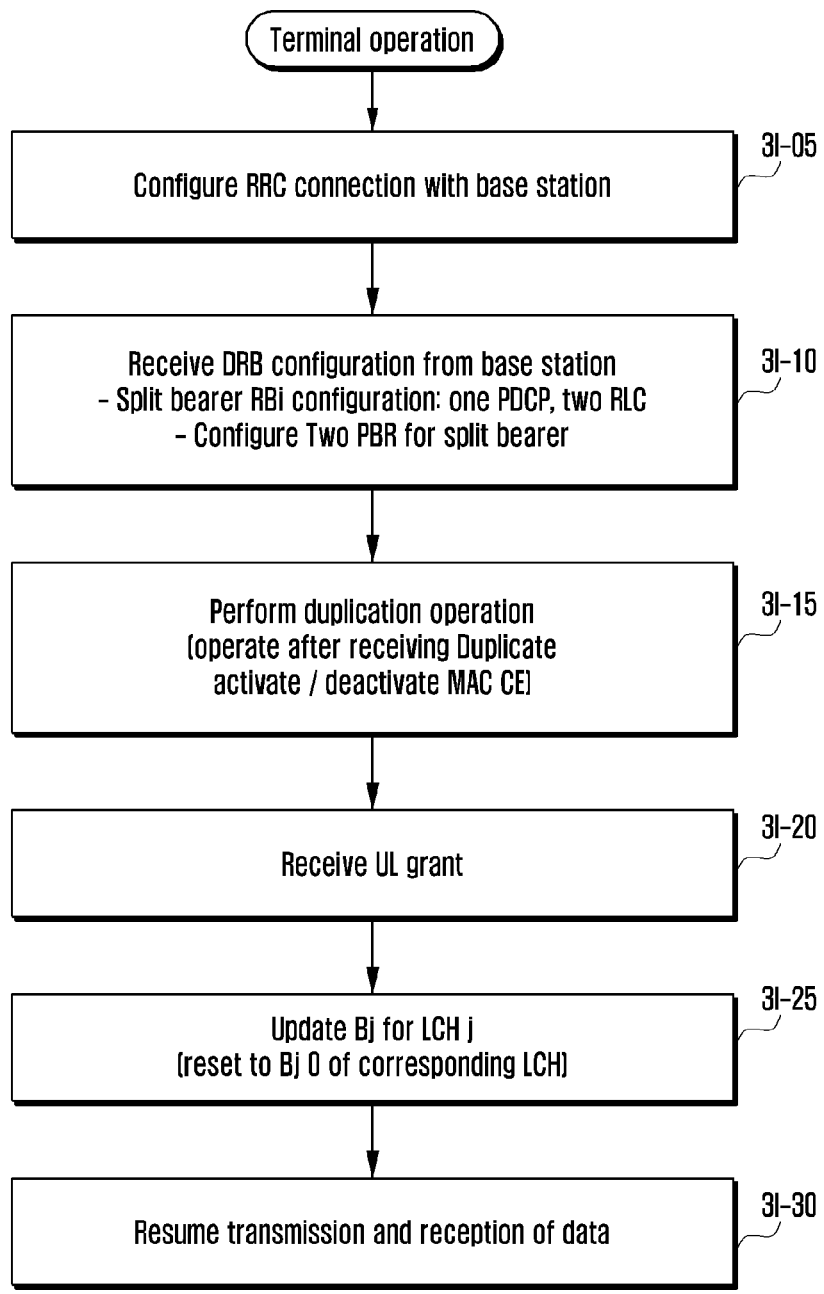
FIG. 3L is a diagram illustrating a method for processing a bucket of LCH when an uplink grant is received from a base station, as a terminal operation according to embodiments of the present disclosure.

FIG. 3L is a diagram illustrating a method for processing a bucket of LCH when an uplink grant is received from a base station, as a terminal operation according to embodiments of the present disclosure.

The terminal configures the RRC connection with the base station for data transmission and reception (3l-05), and receives the RRC message containing the bearer setup for URLLC from the base station (3l-10). In the DBR configuration, a parameter related to the LCP may be configured (logicalChannelConfig) for each LCH. The priority of the corresponding LCH, PBR, BSD, and LCG may be configured as the corresponding parameter. In the DRB configuration, since two RLCs are configured in the split bearer and the corresponding RLC is designated as a specific LCH. There are two LCH-related configurations, and in particular, two PBRs are configured in response to the respective LCHs. In steps 3l-15, the terminal performs a packet duplication operation by receiving a packet duplication activation MAC CE. In steps 3l-20, when the terminal receives an uplink grant for data to be transmitted from the base station, the terminal updates the Bj value for the corresponding LCH in steps 3l-25. This is an operation of updating the Bj value newly because the transmission for the corresponding LCH has been performed. The operation is performed in both the primary LCH and the secondary LCH when the packet duplication is activated. Accurately, this corresponds to a case where the Bj accumulated in a specific LCH is used through an uplink grant. Also, updating the Bj value means that the saved Bj is transmitted to the uplink grant, so that the saved Bj is empty in the LCH by reflecting the transmitted amount. In step 3l-30, the terminal resumes data transmission/reception with the base station.

Figure 3M:
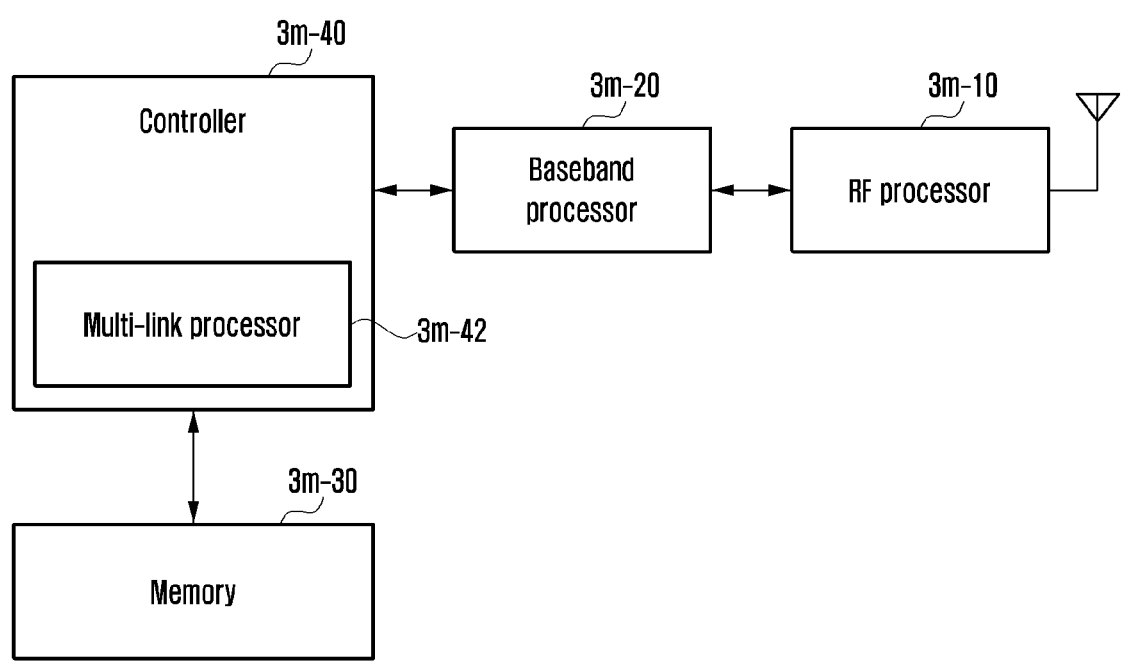
FIG. 3M is a block diagram illustrating the internal structure of the terminal according to embodiments of the present disclosure.

FIG. 3m is a block diagram illustrating the internal structure of the terminal according to embodiments of the present disclosure.

Referring to FIG. 1M, the terminal includes a radio frequency (RF) processor 3m-10, a baseband processor 3m-20, a memory 3m-30, and a controller 3m-40.

The RF processor 3m-10 serves to transmit/receive a signal through a radio channel, such as band conversion and amplification of a signal. That is, the RF processor 3m-10 up-converts a baseband signal provided from the baseband processor 3m-20 into an RF band signal and then transmits the RF band signal through an antenna and down-converts the RF band signal received through the antenna into the baseband signal. For example, the RF processor 3m-10 may include a transmitting filter, a receiving filter, an amplifier, a mixer, an oscillator, a digital to analog converter (DAC), an analog to digital converter (ADC), or the like. In the above figure, only one antenna is illustrated, but the terminal may include a plurality of antennas. Further, the RF processor 3m-10 may include the plurality of RF chains. Further, the RF processor 3m-10 may perform beamforming. For the beamforming, the RF processor 3m-10 may adjust a phase and a size of each of the signals transmitted and received through a plurality of antennas or antenna elements. In addition, the RF processor may perform MIMO and may receive a plurality of layers when performing a MIMO operation.

The baseband processor 3m-20 performs a conversion function between the baseband signal and the bit string according to a physical layer standard of the system. For example, when data are transmitted, the baseband processor 3m-20 generates complex symbols by coding and modulating a transmitting bit string. Further, when data are received, the baseband processor 3m-20 recovers the received bit string by demodulating and decoding the baseband signal provided from the RF processor 3m-10. For example, according to the orthogonal frequency division multiplexing (OFDM) scheme, when data are transmitted, the baseband processor 3m-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 3m-20 divides the baseband signal provided from the RF processor 3m-10 in an OFDM symbol unit and recovers the signals mapped to the sub-carriers by a fast Fourier transform (FFT) operation and then recovers the receiving bit string by the modulation and decoding.

The baseband processor 3m-20 and the RF processor 3m-10 transmit and receive a signal as described above. Therefore, the baseband processor 3m-20 and the RF processor 3m-10 may be called a transmitter, a receiver, a transceiver, or a communication unit. Further, at least one of the baseband processor 3m-20 and the RF processor 3m-10 may include a plurality of communication modules to support a plurality of different radio access technologies. Further, at least one of the baseband processor 3m-20 and the RF processor 3m-10 may include different communication modules to process signals in different frequency bands. For example, different radio access technologies may include the WLAN (e.g., IEEE 802.11), a cellular network (e.g., LTE), or the like. Further, the different frequency bands may include a super high frequency (SHF) (e.g., 2 NRHz, NRhz) band, a millimeter wave (e.g., 60 GHz) band.

The memory 3m-30 stores data such as basic programs, application programs, and configuration information or the like for the operation of the terminal. In particular, the memory 3m-30 may store information associated with a second access node performing wireless communication using a second radio access technology. Further, the memory 3m-30 provides the stored data according to the request of the controller 3m-40.

The controller 3m-40 controls the overall operations of the terminal. For example, the controller 3m-40 transmits/receives a signal through the baseband processor 3m-20 and the RF processor 3m-10. Further, the controller 3m-40 records and reads data in and from the memory 3m-30. For this purpose, the controller 3m-40 may include at least one processor. For example, the controller 3m-40 may include a communication processor (CP) performing a control for communication and an application processor (AP) controlling an upper layer such as the application programs.

Figure 3N:
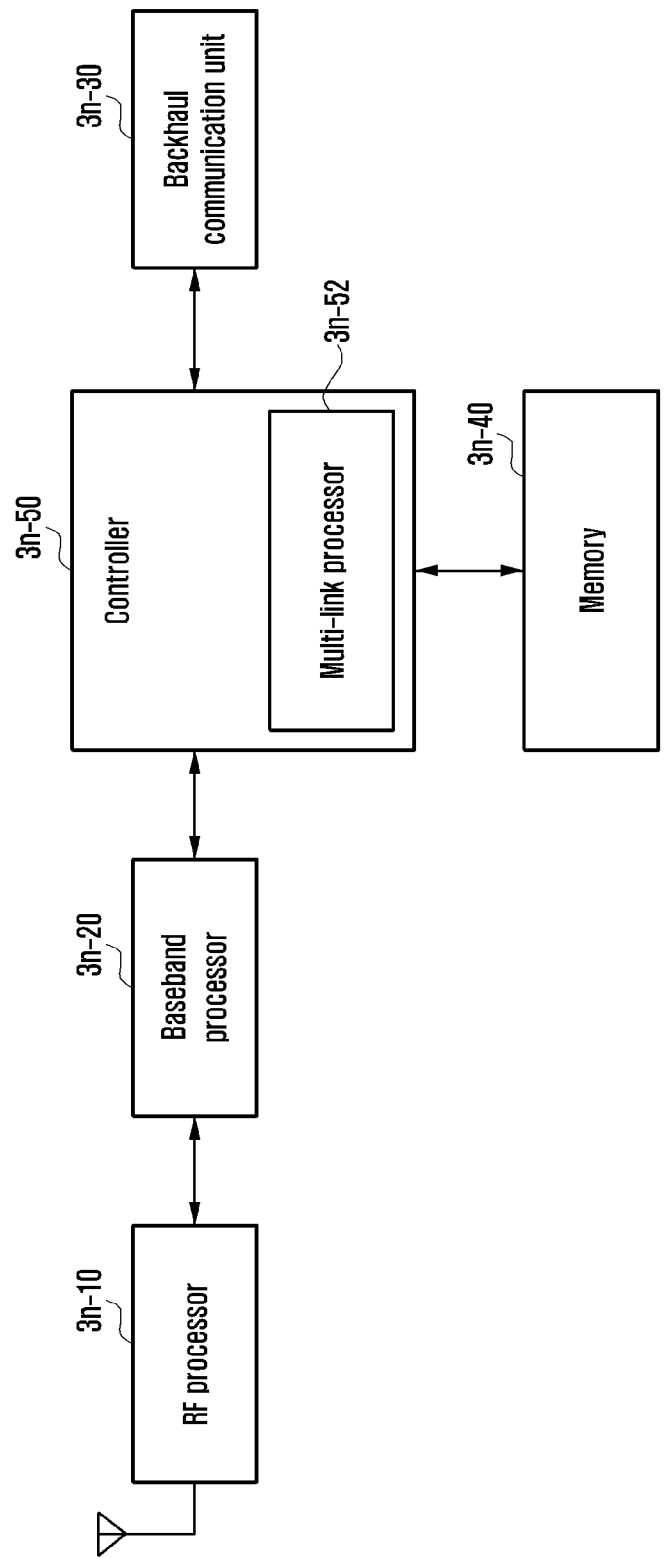
FIG. 3N is a block diagram illustrating a configuration of a base station according to embodiments of the present disclosure.

FIG. 3n is a block diagram illustrating a configuration of a base station according to embodiments of the present disclosure.

As illustrated in FIG. 3N, the base station is configured to include an RF processor 3n-10, a baseband processor 3n-20, a backhaul communication communication interface 3n-30, a memory 3n-40, and a controller 3n-50.

The RF processor 3n-10 serves to transmit and receive a signal through a radio channel, such as band conversion and amplification of a signal. That is, the RF processor 3n-10 up-converts a baseband signal provided from the baseband processor 3n-20 into an RF band signal, transmits the RF band signal through an antenna and down-converts the RF band signal received through the antenna into the baseband signal. For example, the RF processor 3n-10 may include a transmitting filter, a receiving filter, an amplifier, a mixer, an oscillator, a DAC, an ADC, or the like. In the above figure, only one antenna is illustrated, but the first access node may include a plurality of antennas. Further, the RF processor 3n-10 may include a plurality of RF chains. Further, the RF processor 3n-10 may perform the beamforming. For the beamforming, the RF processor 3n-10 may adjust a phase and a size of each of the signals transmitted/received through a plurality of antennas or antenna elements. The RF processor may perform a downward MIMO operation by transmitting one or more layers.

The baseband processor 3n-20 performs a conversion function between the baseband signal and the bit string according to the physical layer standard of the first radio access technology. For example, when data are transmitted, the baseband processor 3n-20 generates complex symbols by coding and modulating a transmitted bit string. Further, when data are received, the baseband processor 3n-20 recovers the received bit string by demodulating and decoding the baseband signal provided from the RF processor 3n-10. For example, according to the OFDM scheme, when data are transmitted, the baseband processor 3n-20 generates the complex symbols by coding and modulating the transmitting bit string, maps the complex symbols to the sub-carriers, and then performs the IFFT operation and the CP insertion to construct the OFDM symbols. Further, when data are received, the baseband processor 3n-20 divides the baseband signal provided from the RF processor 3n-10 in the OFDM symbol unit, recovers the signals mapped to the sub-carriers by the FFT operation, and then recovers the received bit string by the demodulation and decoding. The baseband processor 3n-20 and the RF processor 3n-10 transmit and receive a signal as described above. Therefore, the baseband processor 3n-20 and the RF processor 3n-10 may be called a transmitter, a receiver, a transceiver, a communication unit, or a radio communication unit.

The backhaul communication unit 3n-30 provides an interface for performing communication with other nodes within the network. That is, the backhaul communication unit 3n-30 converts bit strings transmitted from the main base station to other nodes, for example, an auxiliary base station, a core network, etc., into physical signals and converts the physical signals received from other nodes into the bit strings.

The memory 3n-40 stores data such as the basic programs, the application programs, and the configuration information for the operation of the main base station. In particular, the memory 3n-40 may store the information on the bearer allocated to the accessed terminal, the measured results reported from the accessed terminal, or the like. Further, the memory 3n-40 may store information that is a determination criterion on whether to provide the multiple connections to the terminal to the terminal or stop the multiple connections. Further, the memory 3n-40 provides the stored data according to the request of the controller 3n-50.

The controller 3n-50 controls the overall operations of the main base station. For example, the controller 3n-50 transmits/receives a signal through the baseband processor 3n-20 and the RF processor 3n-10 or the backhaul communication unit 3n-30. Further, the controller 3n-50 records and reads data in and from the memory 3n-40. For this purpose, the controller 3n-50 may include at least one processor.

Fourth Embodiment

Hereinafter, if it is determined that the detailed description of the known art related to the disclosure may obscure the gist of the disclosure, the detailed description thereof will be omitted. Hereinafter, embodiments of the disclosure will be described in detail with reference to the accompanying drawings.

Figure 4A:
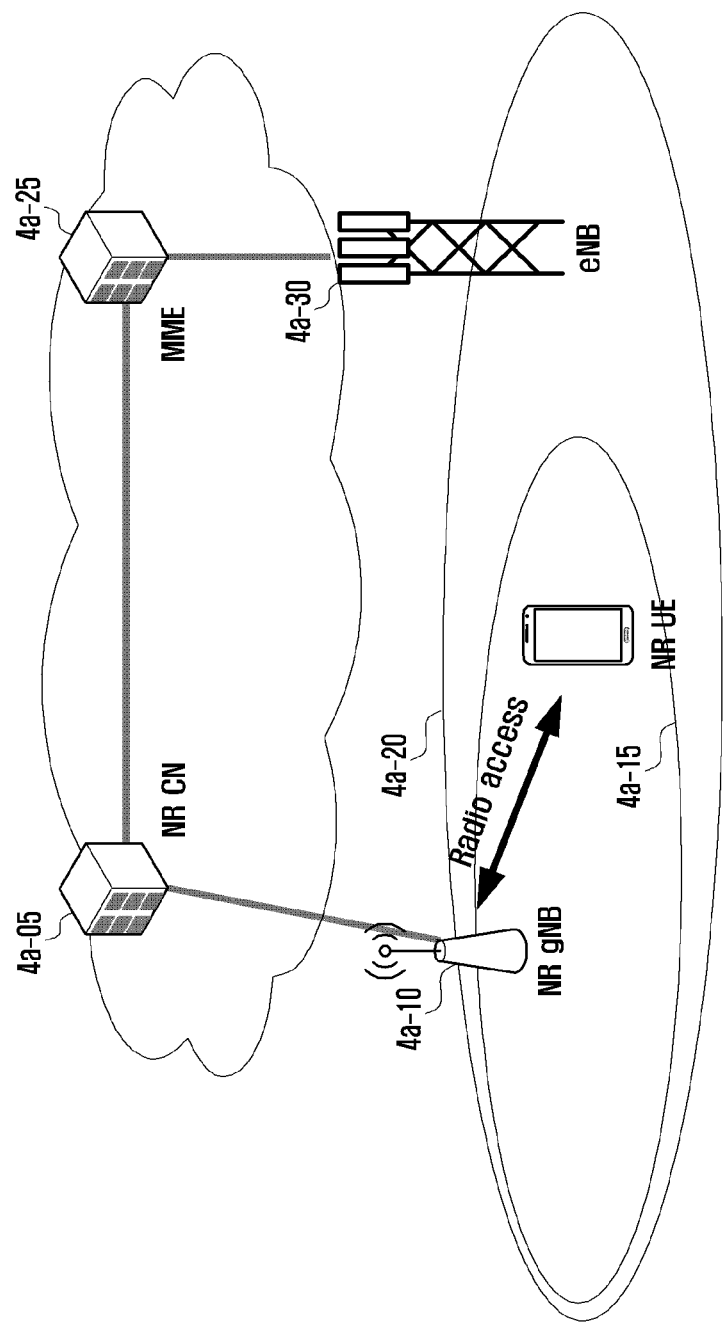
FIG. 4A is a diagram illustrating a structure of the next generation mobile communication system according to embodiments of the present disclosure.

FIG. 4A is a diagram illustrating a structure of the next generation mobile communication system according to embodiments of the present disclosure.

Referring to FIG. 5A, a radio access network of a next generation mobile communication system is configured to include a next generation base station (New radio node B, hereinafter NR NB or NR base station) 4a-10 and a new radio core network (NR CN) 4a-05. The user terminal (new radio user equipment, hereinafter, NR UE or UE) 4a-15 accesses the external network through the NR NB 4a-10 and the NR CN 4a-05.

In FIG. 5A, the NR NB 4a-10 corresponds to an evolved node B (eNB) of the existing LTE system. The NR NB is connected to the NR UE 4a-15 via a radio channel and may provide a service superior to the existing node B. In the next generation mobile communication system, since all user traffics are served through a shared channel, an apparatus for collecting state information such as a buffer state, an available transmission power state, and a channel state of the UEs to perform scheduling is required. The NR NB 4a-10 may serve as the device. One NR NB generally controls a plurality of cells. In order to realize the high-speed data transmission compared with the existing LTE, the NR gNB may have the existing maximum bandwidth or more, and may be additionally incorporated into a beam-forming technology by using orthogonal frequency division multiplexing (hereinafter, referred to as OFDM) as a radio access technology.

Further, an adaptive modulation and coding (hereinafter, referred to as AMC) determining a modulation scheme and a channel coding rate according to a channel status of the terminal is applied. The NR CN 4a-05 may perform functions such as mobility support, bearer setup, QoS setup, and the like. The NR CN is an apparatus for performing a mobility management function for the terminal and various control functions and is connected to a plurality of base stations. In addition, the next generation mobile communication system can interwork with the existing LTE system, and the NR CN is connected to the MME 4a-25 through the network interface. The MME is connected to the eNB 4a-30 which is the existing base station.

FIG. 4B is a diagram for explaining a scenario in which a partial frequency band is applied in a next generation mobile communication system according to embodiments of the present disclosure.

A bandwidth part (BWP) application technology means that a terminal performs communication using only some bandwidths of system bandwidths used by one cell. The BWP is used to reduce the manufacturing cost of the terminal or to save power of the terminal. The BWP may be configured by the base station only for the terminal supporting the purpose.

Referring to FIG. 4B, there are largely three BWP operating scenarios.

A first scenario is to apply the BWP for the terminal that supports only a bandwidth 4b-10 narrower than a system bandwidth 4b-05 used by one cell. To reduce the manufacturing cost, a specific UE may be developed to support a limited bandwidth. The terminal needs to report to the base station supporting only the limited bandwidth, and accordingly, the base station configures the maximum bandwidth or less BWP supported by the terminal.

A second scenario is to apply the BWP for UE power saving. For example, one UE performs communication using the entire system bandwidth 4b-15 or a partial bandwidth 4b-20 used by one cell, but the communication BS may set a narrower bandwidth 4b-25 for the saving purpose.

A third scenario is to apply individual BWPs corresponding to different numerologies. The numerology means that a physical layer configuration is diversified in order to implement optimal data transmission according to various service requirements. For example, in an OFDMA structure having a plurality of subcarriers, a separation distance between the subcarriers may be variably adjusted according to a predetermined requirement. One terminal may communicate by applying a plurality of numerologies at the same time At this time, since the physical layer configuration corresponding to each numerology is described above, it is preferable to divide and apply each numerology into separate BWPs 4b-35 and 4b-40.

The disclosure proposes a method for configuring and changing the BWP. Since a supportable bandwidth is different for each UE, in initial access, communication must be performed with BWP applicable to all UEs and the BWP for a specific UE is applied from a predetermined point in time. The applied BWP may be changed through predetermined signaling and the BWP to be applied in the target cell at the time of handover is indicated to the UE through the predetermined signaling.

Figure 4C:
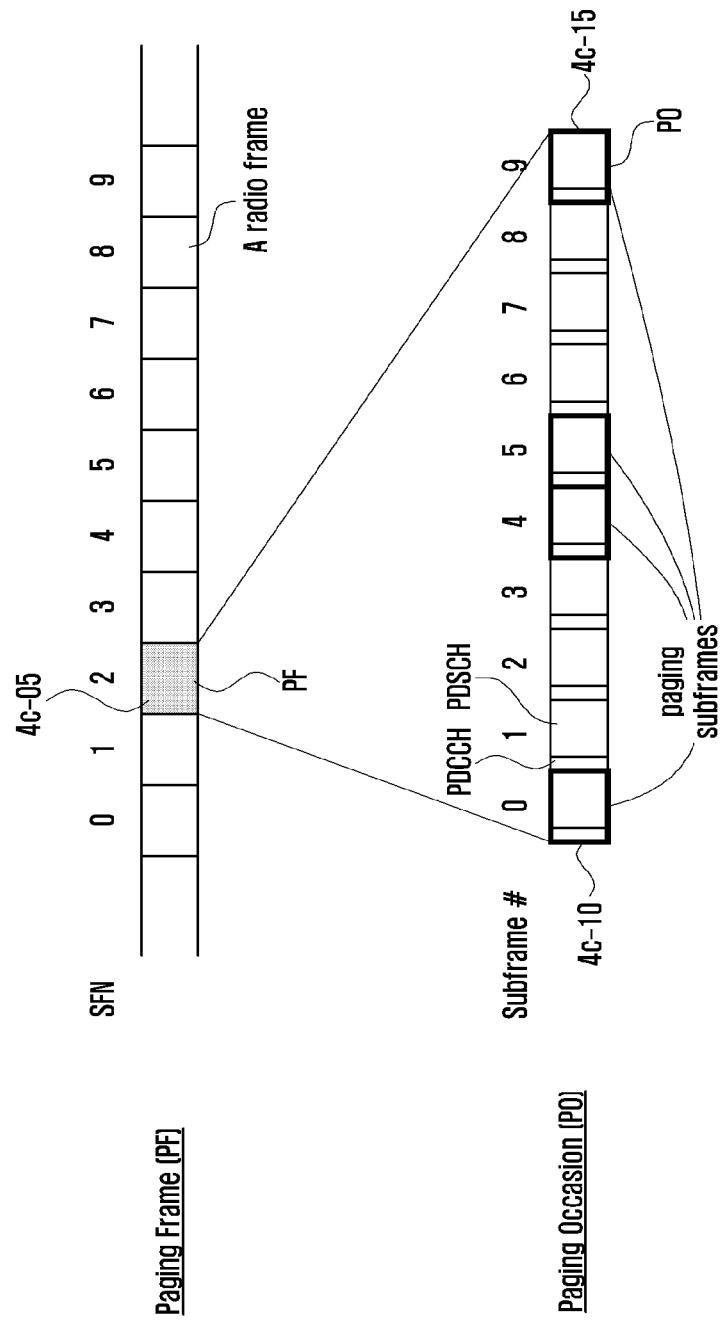
FIG. 4C is a conceptual diagram showing a paging time point in the conventional LTE technology according to embodiments of the present disclosure.

FIG. 4C is a conceptual diagram showing a paging time point in the conventional LTE technology according to embodiments of the present disclosure.

A DRX operation is a method that may improve power consumption. A DRX operation in a standby mode is to monitor the paging periodically, not to monitor the paging at all times. The terminal performs a receiving operation to receive the paging signal from the base station. However, since the paging signal is not transmitted frequently, when the terminal performs the receiving operation until the paging signal is not received, power loss is increased. Therefore, in order to reduce the power consumption, it is possible to attempt to receive the paging signal by performing the receiving operation only during a specific time period periodically, and this is referred to as DRX. In the LTE system, the DRX operation of the UEs in the standby state is performed through Equation 1 below. SFN is incremented by 1 for each radio frame. When a paging signal is delivered in a radio frame satisfying the equation, the UE performs the receiving operation by the DRX. The radio frame is referred to as a paging frame 4c-05.

$$\text{SFN mod } T = (T \text{ div } N)*(UE\_ID \text{ mod } N) \quad \text{<Equation 1>}$$

where,

SFN: System Frame Number. 10 bits (MSB 8 bits explicit, LBS 2 bits implicit)

T: DRX cycle of the UE. Transmitted on SIB2. ENUMERATED {rf32, rf64, rf128, rf256}

N: min(T,nB)

nB: Transmitted on SIB2. ENUMERATED {4T, 2T, T, T/2, T/4, T/8, T/16, T/32}.

UE_ID: IMSI mod 1024 (IMSI represents a unique number assigned to each terminal)

8 bits of the MasterInformationBlock (MIB) of the Physical Broadcast Channel (PBCH) indicate the SFN. T and nB are values included in SystemInformationBlockType2 (SIB2) and provided from the base station. T may have one value of {rf32, rf64, rf128, and rf356} values and rf32 represents a length of a 32 Radio frame. That is, rf32 refers to 320 ms. The T value actually applied in the above equation is derived through coordination between the terminal, the base station, and the MME. The base station provides a default DRX value to the UE using SIB1 which is one of the broadcast system information. When the terminal desires a DRX period shorter than the default DRX value, a UE specific DRX value is provided to the MME through an ATTACH process as a desired DRX value. When there is paging for the terminal, the MME transmits the paging and the UE specific DRX value provided from the terminal to the base station. The terminal determines as the DRX period a shorter value between the UE specific DRX value transmitted to the MME and the default DRX value received from the base station. The base station also determines as the DRX period the shorter value between the UE specific DRX value received from the MME and the default DRX value broadcasted by the base station. The DRX period value becomes an actual T value applied in the equation. Accordingly, the terminal and the base station select the same DRX period, and the base station determines the PF based on the DRX period and then transmits the paging to the terminal.

A subframe capable of transmitting the paging is defined in one PF. This is referred to as a paging sub-frame 4c-10. The terminal monitors the paging thereof in one paging subframe in the PF derived from the above equation. The one paging subframe is referred to as paging occasion (PO) 4c-15. The PO is derived through the following equation.

$$i\_s = \text{floor}(UE\_ID/N) \text{ mod } Ns \quad \text{<Equation 2>}$$

The i_s value derived by the above equation is substituted into the following table to derive its own PO.

FDD:

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TDD (all UL/DL configurations):

TABLE 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

Figure 4D:
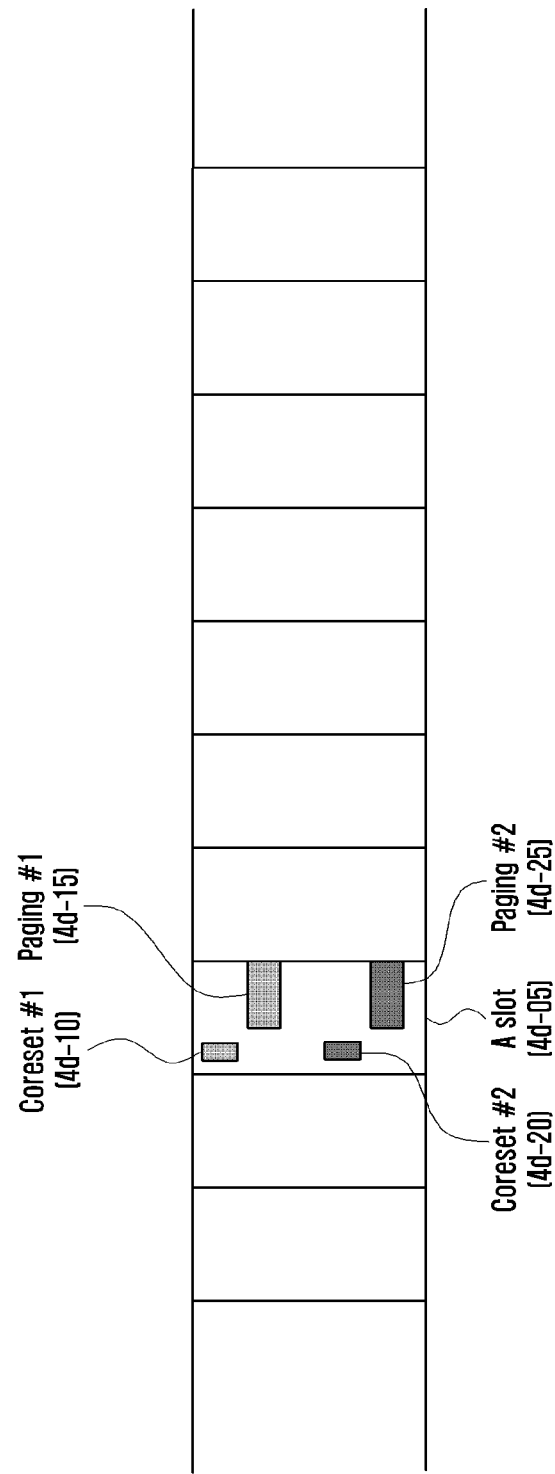
FIG. 4D illustrates a scenario in which a plurality of CORESETS and a plurality of paging messages are transmitted per slot according to embodiments of the present disclosure.

FIG. 4D illustrates a scenario in which a plurality of CORESETS and a plurality of paging messages are transmitted per slot according to embodiments of the present disclosure.

In the next generation mobile communication system, a plurality of CORESETS 4d-10 and 4d-20) may be set in one time unit, for example, a slot 4d-05. The CORESET refers to a time and frequency space for transmitting a control signal such as scheduling information like the PDCCH in the LTE technology in the related art. The CORESET may exist at any position of the slot and the position is provided to the terminal as the system information. A paging record that may be stored in one paging message may be limited. Accordingly, a plurality of paging messages 4d-15 and 4d-25 may exist and the scheduling information of each paging message is provided to the terminal through each corresponding CORESET. When there is a plurality of paging messages in the slot, the terminal needs to determine which paging message to monitor. The disclosure proposes a method for selecting one of the plurality of paging messages existing in the paging reception timing.

BWPs are generally classified into three types. Initial BWP has a frequency bandwidth that all terminals may receive and a plurality of BWPs may exist in one carrier. In the Initial BWP, sync signal block (SSB), PBCH, and remaining minimum system information (RMSI) are broadcasted. The PBCH and the RMSI contain required system information such as MIB and SIB1 in the LTE in the related art, respectively. In the disclosure, it is characterized in that the UE monitors the Initial BWP for paging monitoring. The disclosure proposes two embodiments.

In Embodiment 4-1, the terminal selects one Initial BWP through a predetermined equation based on the UE_ID. The PBCH or RMSI broadcasted in the Initial BWP includes one common search space (CSS) information for paging reception. The terminal receives CORESETS in time and frequency resources indicated by the CSS. The terminal determines whether the P-RNTI is included in the CORESET, and if so, receives the paging message in the time and frequency resources indicated by the P-RNTI. The UE_ID is defined as IMSI mod X. The X value may be predetermined or may be determined as a multiple of the maximum number of CORESETS or paging messages that may include a multiple of the initial BWP maximum or the P-RNTI.

In Embodiment 4-2, the UE selects one Initial BWP in terms of implementation. The PBCH or RMSI broadcasted in the Initial BWP includes plural common search space (CSS) information for paging reception. The terminal selects one CSS through the predetermined equation based on the UE_ID. The terminal determines whether the P-RNTI is included in the CORESET, and if so, receives the paging message in the time and frequency resources indicated by the P-RNTI. The UE_ID is defined as IMSI mod X. The X value may be predetermined or may be determined as a multiple of the maximum number of CORESETS or paging messages that may include a multiple of the initial BWP maximum or the P-RNTI for a specific time interval (e.g., slot-wise).

FIG. 4E is a flowchart of a terminal operation for paging reception in a 4-1th embodiment of the present disclosure.

A terminal 4e-05 selects one Initial BWP in the most optimal carrier through a predetermined equation based on the UE_ID (4e-15). A base station 4e-10 broadcasts a PBCH or an RMSI including one common search space (CSS) information for paging reception in the Initial BWP (4e-20). The terminal monitors the CORESETS in the time and frequency resources indicated by the CSS (4e-25). The terminal determines whether the P-RNTI is included in the CORESET, and if so, receives the paging message in the time and frequency resources indicated by the P-RNTI (4e-30). The terminal receiving the paging message performs the RRC connection establishment process and is switches to a connected mode (4e-35). The base station configures a dedicated (UE-specific) search space for paging reception to be applied in the connected mode by an RRC reconfiguration message, which is a dedicated signaling (4e-40). The terminal performs paging monitoring using the DSS (4e-45).

Figure 4F:
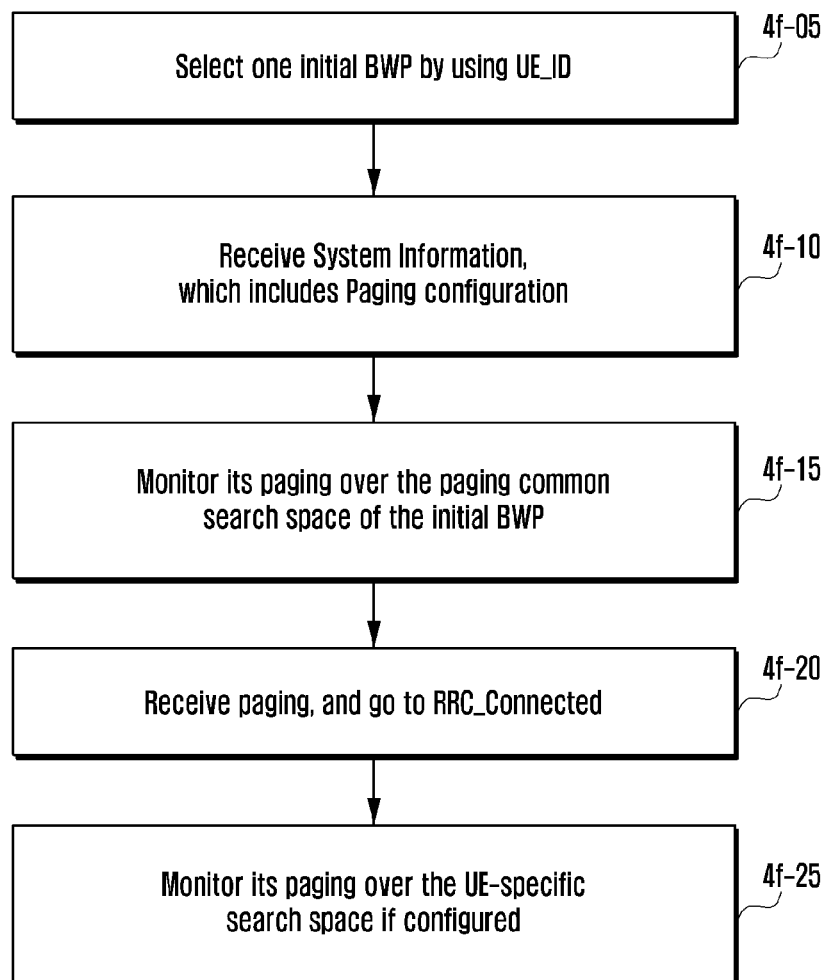
FIG. 4F is a flowchart of a terminal operation for paging reception in the 4-1th embodiment in the present disclosure.

FIG. 4F is a flowchart of a terminal operation for paging reception in the 4-1th embodiment of the present disclosure.

The terminal selects one Initial BWP in the most optimal carrier through a predetermined equation based on the UE_ID in step 4e-15.

The terminal receives a PBCH or an RMSI including one common search space (CSS) information for paging reception in the Initial BWP in step 4f-10.

The terminal monitors the CORESETS including the P-RNTI in the time and frequency resources indicated by the CSS in step 4f-15.

In step 4f-20, the terminal receives the CORESET including a P-RNTI and receives the paging message using the scheduling information indicated by the P-RNTI. In addition, the terminal performs an RRC connection establishment procedure and switched to the connected mode.

In step 4f-25, when the terminal is configured with the dedicated (UE-specific) search space for paging reception to be applied in the connected mode, the terminal monitors the paging in the DSS. Otherwise, the terminal monitors the paging by using the common search space.

Figure 4G:
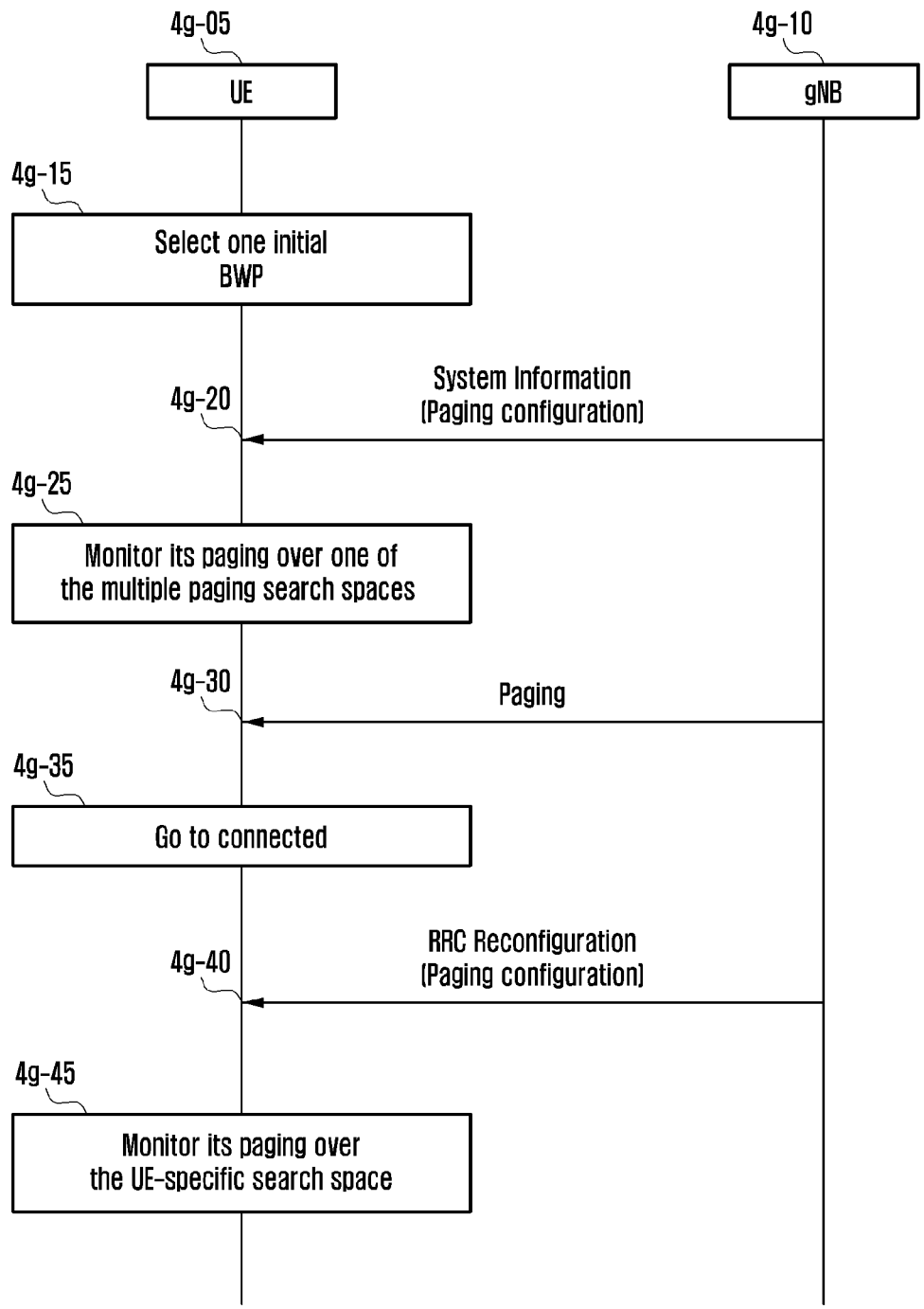
FIG. 4G is a flowchart of a terminal operation for paging reception in a 4-2th embodiment in the present disclosure.

FIG. 4G is a flowchart of a terminal operation for paging reception in a 4-2th embodiment of the present disclosure.

A terminal 4g-05 selects one Initial BWP in terms of implementation (4g-15). For example, the terminal 4g-05 may select the initial BWP with the highest signal strength in one carrier. A base station 4g-10 broadcasts a PBCH or an RMSI including one or more, i.e., plural one common search space (CSS) information for paging reception in the Initial BWP. The terminal selects one CSS through the predetermined equation based on the UE_ID and the terminal monitors whether the P-RNTI is included in the CORESET transmitted in the time and frequency resources indicated by the CSS (4g-25). If so, the paging message is received in the time and frequency resources indicated by the P-RNTI (4g-30). The terminal receiving the paging message performs the RRC connection establishment process and is switches to the connected mode (4g-35). The base station configures a dedicated (UE-specific) search space for paging reception to be applied in the connected mode by an RRC reconfiguration message, which is a dedicated signaling (4g-40). The terminal performs the paging monitoring using the DSS (4g-45).

Figure 4H:
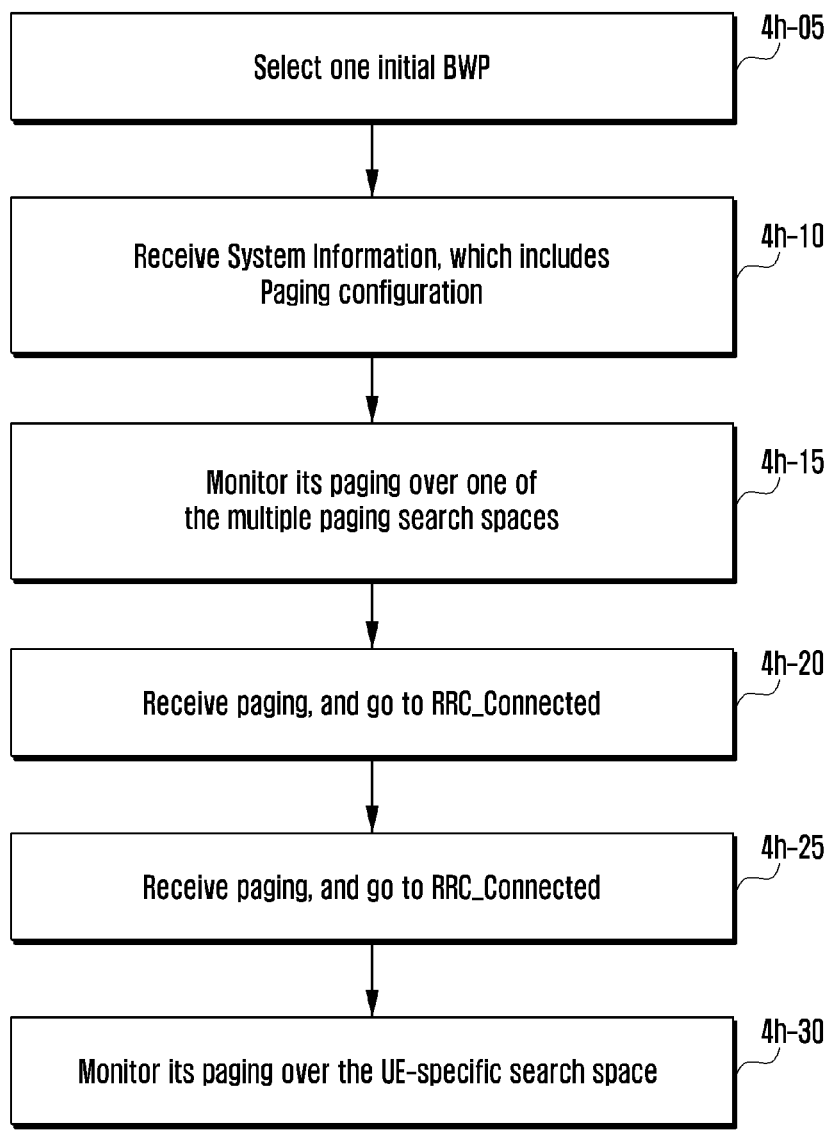
FIG. 4H is a flowchart of a terminal operation for paging reception in the 4-2th embodiment in the present disclosure.

FIG. 4H is a flowchart of a terminal operation for paging reception in the embodiment 4-2 of the present disclosure.

In step 4h-05, the terminal selects one Initial BWP in terms of implementation.

The terminal receives a PBCH or an RMSI including one or more, i.e., plural common search space (CSS) information for paging reception in the Initial BWP in step 4h-10. The terminal selects one CSS through the predetermined equation based on the UE_ID.

The terminal monitors the CORESET including the P-RNTI in the time and frequency resources indicated by the CSS in step 4h-15.

In step 4h-20, the terminal receives the CORESET including a P-RNTI and receives the paging message using the scheduling information indicated by the P-RNTI. In addition, the terminal performs an RRC connection establishment procedure and switched to the connected mode.

In step 4h-25, when the terminal is configured with the dedicated (UE-specific) search space for paging reception to be applied in the connected mode, the terminal monitors the paging in the DSS. Otherwise, the terminal monitors the paging by using the Common Search Space.

The paging message may be used for notifying that updating the system information is required or for notifying the reception of a disaster alert. However, in order to receive the paging message, the CORESET must be received in advance. Therefore, the disclosure proposes that the CORESET is used for notifying that updating the system information is required or for notifying the reception of the disaster alert in order to reduce the signaling overhead. The CORESET includes predetermined information indicated by the P-RNTI and the information is used to notify that updating the system information is required or for notifying the reception of the disaster alert. The information includes value tag information, systemInfoAreaIdentifier information, and a disaster alert indicator for each SIB or SI message. The value tag information is incremented by 1 at the same time as the corresponding SIB or SI message is updated.

The value tag information has a finite value range. When the SIB or SI message is updated after reaching the maximum value, the value tag information returns to 0 again. The systemInfoAreaIdentifier is used to indicate a cell or a cell group-unit area to which the matched system information is broadcasted. At this time, some cell-specific information may be different between the cells. For example, if a first cell and a second cell broadcast the same system information except for some cell-specific information, the systemInfoAreaIdentifier information broadcasted by the two cells is the same.

Figure 4I:
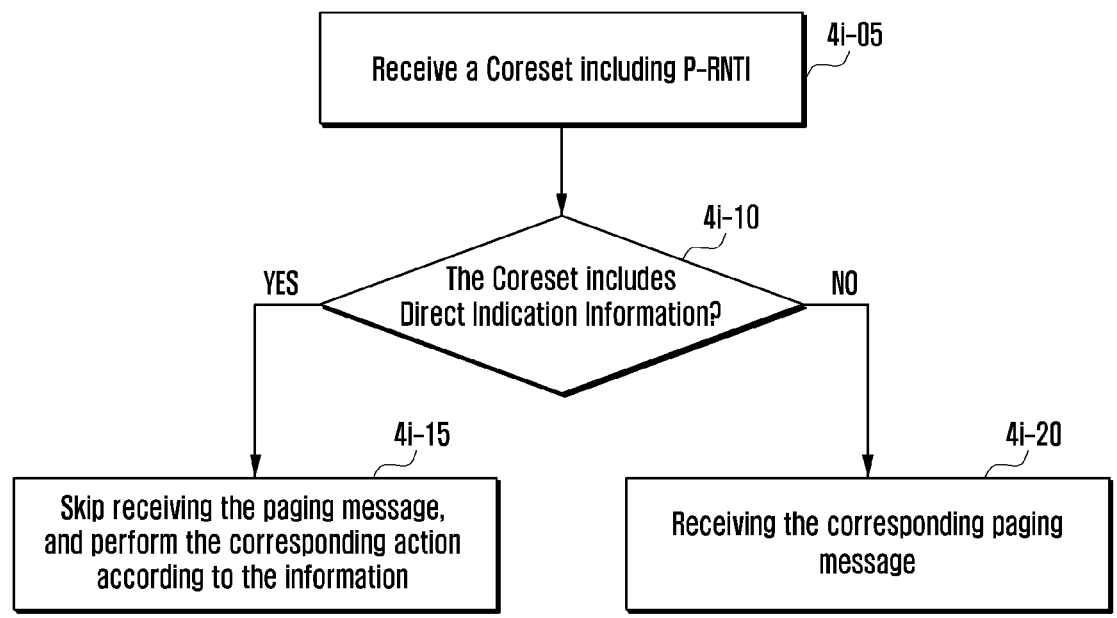
FIG. 4I is a flowchart of a terminal operation for processing specific contents of a paging message in CORESET according to embodiments of the present disclosure.

FIG. 4I is a flowchart of a terminal operation for processing specific contents of a paging message in CORESET according to embodiments of the present disclosure.

In step 4i-05, the terminal receives the Coreset including the P-RNTI.

In step 4i-10, the terminal determines whether direct indication information is included in the CORESET. The information includes the value tag information, the systemInfoAreaIdentifier information, and the disaster alert indicator for each SIB or SI message.

When the information is included in steps 4i-15, the terminal skips an operation of receiving the paging message and performs a subsequent operation according to the contents of the information. For example, when value tag information corresponding to a specific SIB or SI message stored in the terminal is different from value tag information corresponding to the specific SIB or SI message included in the Direct Indication Information and the systemInfoAreaIdentifier stored in the terminal and the systemInfoAreaIdentifier included in the Direct Indication Information are the same, the terminal performs an operation of updating the SIB or SI message indicated by the value tag. The updating operation is constituted by a process of receiving at least an RMSI, a process of obtaining the scheduling information of the SIB or SI message included in the RMSI, and a process of receiving and storing the SIB or SI message requiring the updating using the scheduling information.

When the systemInfoAreaIdentifier stored in the terminal differs from the systemInfoAreaIdentifier included in the Direct Indication Information, the terminal updates at least the MIB and the RMSI or all SIB or SI messages.

If the Direct Indication Information includes an indicator for informing the reception of the disaster alert, the terminal performs an operation of receiving the system information including the disaster alert. The operation of receiving the disaster information is constituted by a process of receiving at least an RMSI, a process of obtaining the scheduling information of the SIB or SI message including the disaster information included in the RMSI, and a process of receiving and storing the SIB or SI message requiring the updating using the scheduling information.

In step 4i-20, when the information is not included, the terminal receives the paging message as the subsequent operation.

Figure 4J:
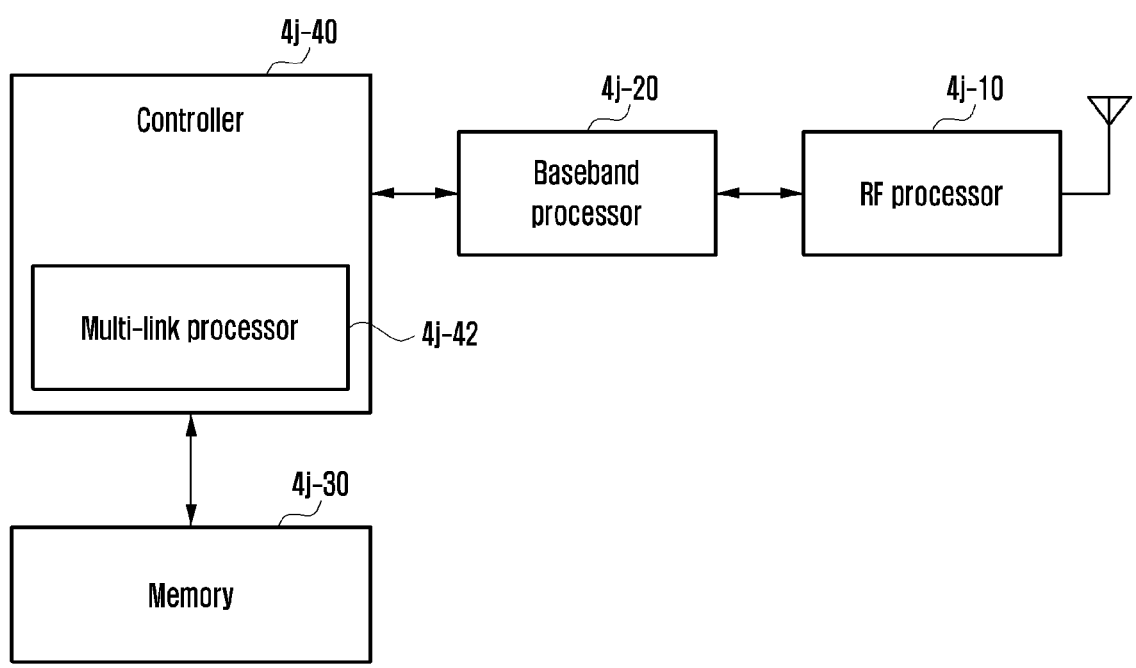
FIG. 4J is a block diagram illustrating an internal structure of the terminal according to embodiments of the present disclosure.

The structure of the terminal is illustrated in FIG. 4J.

Referring to FIG. 7J, the terminal includes a radio frequency (RF) processor 4j-10, a baseband processor 4j-20, a memory 4j-30, and a controller 4j-40.

The RF processor 4j-10 serves to transmit and receive a signal through a radio channel, such as band conversion and amplification of a signal. That is, the RF processor 4j-10 up-converts a baseband signal provided from the baseband processor 4j-20 into an RF band signal and then transmits the RF band signal through an antenna and down-converts the RF band signal received through the antenna into the baseband signal. For example, the RF processor 4j-10 may include a transmitting filter, a receiving filter, an amplifier, a mixer, an oscillator, a digital to analog converter (DAC), an analog to digital converter (ADC), or the like. In the above figure, only one antenna is illustrated, but the terminal may include a plurality of antennas. Further, the RF processor 4j-10 may include a plurality of RF chains. Further, the RF processor 4j-10 may perform beamforming. For the beamforming, the RF processor 4j-10 may adjust a phase and a size of each of the signals transmitted and received through a plurality of antennas or antenna elements. In addition, the RF processor may perform MIMO and may receive a plurality of layers when performing a MIMO operation.

The baseband processor 4j-20 performs a conversion function between a baseband signal and a bit string according to a physical layer standard of a system. For example, when data are transmitted, the baseband processor 4j-20 generates complex symbols by coding and modulating a transmitted bit string. Further, when data are received, the baseband processor 4j-20 recovers the received bit string by demodulating and decoding the baseband signal provided from the RF processor 4j-10. For example, according to the orthogonal frequency division multiplexing (OFDM) scheme, when data are transmitted, the baseband processor 4j-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 4*j*-20 divides the baseband signal provided from the RF processor 4*j*-10 in an OFDM symbol unit and recovers the signals mapped to the sub-carriers by a fast Fourier transform (FFT) operation and then recovers the received bit string by the modulation and decoding.

The baseband processor 4*j*-20 and the RF processor 4*j*-10 transmit and receive a signal as described above. Therefore, the baseband processor 4*j*-20 and the RF processor 4*j*-10 may be called a transmitter, a receiver, a transceiver, or a communication unit. Further, at least one of the baseband processor 4*j*-20 and the RF processor 4*j*-10 may include a plurality of communication modules to support a plurality of different radio access technologies. Further, at least one of the baseband processor 4*j*-20 and the RF processor 4*j*-10 may include different communication modules to process signals in different frequency bands. For example, different radio access technologies may include the WLAN (e.g., IEEE 802.11), a cellular network (e.g., LTE), or the like. Further, the different frequency bands may include a super high frequency (SHF) (e.g., 2 NRHz, NRhz) band, a millimeter wave (e.g., 60 GHz) band.

The memory 4*j*-30 stores data such as basic programs, application programs, and configuration information for the operation of the terminal. In particular, the memory 4*j*-30 may store information associated with a second access node performing wireless communication using a second access technology. Further, the memory 4*j*-40 provides the stored data according to the request of the controller 5*j*-50.

The controller 4*j*-40 controls the overall operations of the terminal. For example, the controller 4*j*-40 transmits and receives a signal through the baseband processor 4*j*-20 and the RF processor 4*j*-10. Further, the controller 4*j*-40 records and reads data in and from the memory 4*j*-30. For this purpose, the controller 4*j*-40 may include at least one processor. For example, the controller 4*j*-40 may include a communication processor (CP) performing a control for communication and an application processor (AP) controlling a higher layer such as the application programs.

Figure 4K:
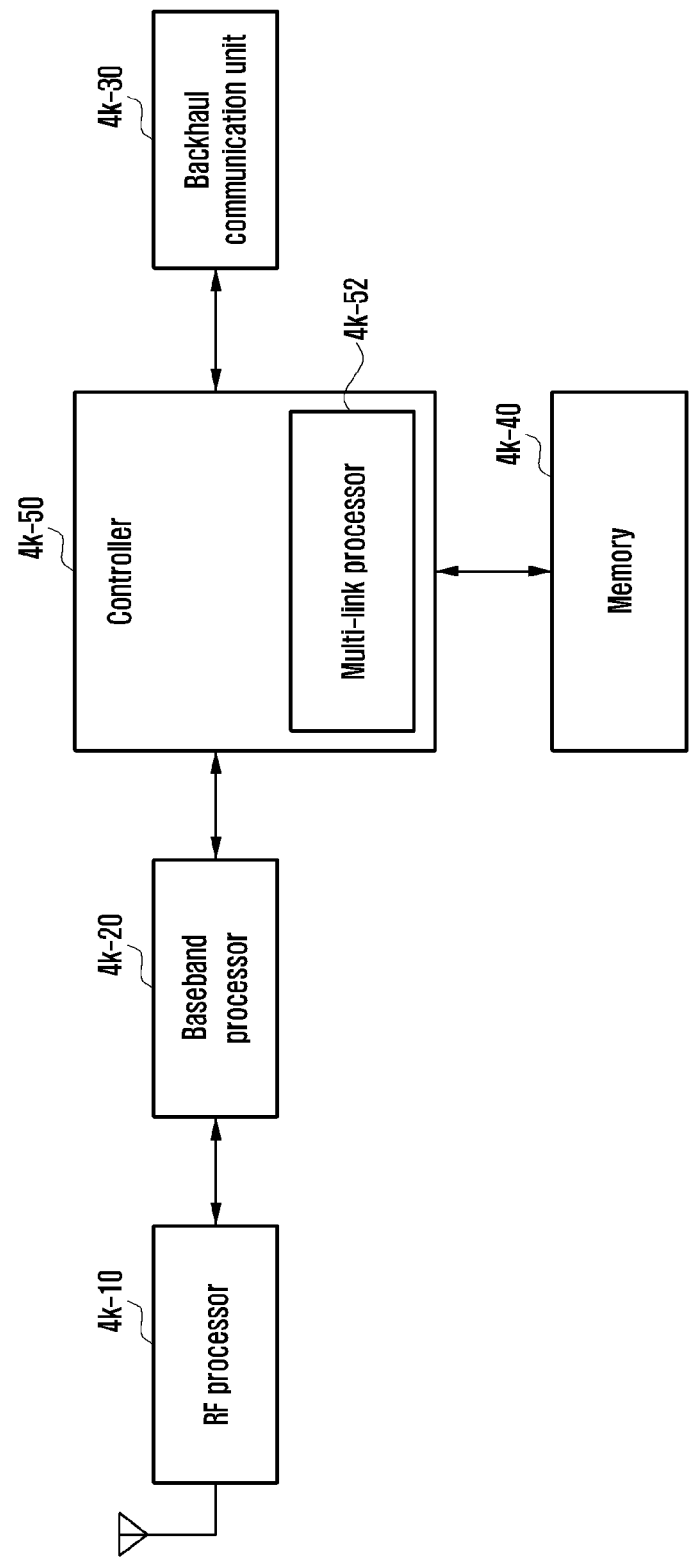
FIG. 4K is a block diagram illustrating a configuration of the base station according to embodiments of the present disclosure.

FIG. 4*k* is a block configuration diagram of a main base station in a wireless communication system according to embodiments of the present disclosure.

As illustrated in FIG. 4K, the base station is configured to include an RF processor 4*k*-10, a baseband processor 4*k*-20, a backhaul communication unit 4*k*-30, a storage unit 4*k*-40, and a controller 4*k*-50.

The RF processor 4*k*-10 serves to transmit and receive a signal through a radio channel, such as band conversion and amplification of a signal. That is, the RF processor 4*k*-10 up-converts a baseband signal provided from the baseband processor 4*k*-20 into an RF band signal and then transmits the RF band signal through an antenna and down-converts the RF band signal received through the antenna into the baseband signal. For example, the RF processor 4*k*-10 may include a transmitting filter, a receiving filter, an amplifier, a mixer, an oscillator, a DAC, an ADC, or the like. In the above figure, only one antenna is illustrated, but the first access node may include a plurality of antennas. Further, the RF processor 4*k*-10 may include a plurality of RF chains. Further, the RF processor 4*k*-10 may perform the beamforming. For the beamforming, the RF processor 4*k*-10 may adjust a phase and a size of each of the signals transmitted/received through a plurality of antennas or antenna elements. The RF processor may perform a downward MIMO operation by transmitting one or more layers.

The baseband processor 4*k*-20 performs a conversion function between the baseband signal and the bit string according to the physical layer standard of the first radio access technology. For example, when data are transmitted, the baseband processor 4*k*-20 generates complex symbols by coding and modulating a transmitted bit string. Further, when data are received, the baseband processor 4*k*-20 recovers the received bit string by demodulating and decoding the baseband signal provided from the RF processor 4*k*-10. For example, according to the OFDM scheme, when data are transmitted, the baseband processor 4*k*-20 generates the complex symbols by coding and modulating the transmitting bit string, maps the complex symbols to the sub-carriers, and then performs the IFFT operation and the CP insertion to configure the OFDM symbols. Further, when data are received, the baseband processor 4*k*-20 divides the baseband signal provided from the RF processor 4*k*-10 in the OFDM symbol unit and recovers the signals mapped to the sub-carriers by the FFT operation and then recovers the receiving bit string by the modulation and decoding. The baseband processor 4*k*-20 and the RF processor 4*k*-10 transmit and receive a signal as described above. Therefore, the baseband processor 4*k*-20 and the RF processor 4*k*-10 may be called a transmitter, a receiver, a transceiver, or a communication unit.

The backhaul communication unit 4*k*-30 provides an interface for performing communication with other nodes within the network. That is, the backhaul communication unit 4*k*-30 converts bit strings transmitted from the main base station to other nodes, for example, an auxiliary base station, a core network, etc., into physical signals and converts the physical signals received from other nodes into the bit strings.

The memory 4*k*-40 stores data such as basic programs, application programs, and configuration information for the operation of the main base station. In particular, the memory 4*k*-40 may store the information on the bearer allocated to the accessed terminal, the measured results reported from the accessed terminal, etc. Further, the memory 4*k*-40 may store information that is a determination criterion on whether to provide a multiple connection to the terminal or stop the multiple connection to the terminal. Further, the memory 4*k*-40 provides the stored data according to the request of the controller 4*k*-50.

The controller 4*k*-50 controls the general operations of the main base station. For example, the controller 4*k*-50 transmits/receives a signal through the baseband processor 4*k*-20 and the RF processor 4*k*-10 or the backhaul communication unit 4*k*-30. Further, the controller 4*k*-50 records and reads data in and from the memory 4*k*-40. For this purpose, the controller 4*k*-50 may include at least one processor.

Although the present disclosure has been described with various embodiments, various changes and modifications may be suggested to one skilled in the art. It is intended that the present disclosure encompass such changes and modifications as fall within the scope of the appended claims.

What is claimed:

1. A method performed by a terminal in a wireless communication system, the method comprising:
    receiving, from a base station, a message including configuration information for handover, the configuration information for handover including information on contention-free random access (RA) resources for handover;
    performing a contention-free RA procedure for handover based on the information on the contention-free RA resources for handover;

discarding the information on the contention-free RA resources for handover upon completion of the contention-free RA procedure for handover;

receiving, from the base station, a message including configuration information for beam failure recovery (BFR), the configuration information for BFR including information on contention-free RA resources for BFR;

performing a contention-free RA procedure for BFR based on the information on the contention-free RA resources for BFR upon detecting a beam failure; and not discarding the information on the contention-free RA resources upon completion of the contention-free RA procedure for BFR.

2. The method of claim 1,
wherein the information on the contention-free RA resources for handover includes information on dedicated preamble resources and an identifier for the terminal.

3. The method of claim 1, further comprising:
in case that the configuration information for BFR includes backoff time related information, identifying values based on the backoff time related information;
in case that a contention-free RA procedure for BFR is not completed, selecting a backoff time from the identified values; and
performing the contention-free RA procedure for BFR irrespective of the selected backoff time.

4. The method of claim 1, wherein the information on the contention-free RA resources for BFR includes at least one pair of a synchronization signal block (SSB) and a corresponding preamble index, and wherein performing the contention-free RA procedure for BFR comprises:
identifying an SSB index of an SSB with a reception power above a threshold, among the at least one pair of the SSB index and the corresponding preamble index;
identifying a preamble index corresponding to the identified SSB index, among the at least one pair of the SSB index and the corresponding preamble index; and
transmitting, to the base station, a preamble corresponding to the identified preamble index.

5. A method performed by a base station in a wireless communication system, the method comprising:
transmitting, to a terminal, a message including configuration information for handover, the configuration information for handover including information on contention-free random access (RA) resources for handover;
performing a contention-free RA procedure for handover with the terminal based on the information on the contention-free RA resources for handover;
transmitting, to the terminal, a message including configuration information for beam failure recovery (BFR), the configuration information for BFR including information on contention-free RA resources for BFR; and
performing a contention-free RA procedure for BFR with the terminal based on information on the contention-free RA resources for BFR upon beam failure being detected by the terminal,
wherein the information on the contention-free RA resources for handover is discarded by the terminal upon completion of the contention-free RA procedure for handover, and wherein the information on the contention-free RA resources are not discarded at the terminal upon completion of the contention-free RA procedure for BFR.

6. The method of claim 5,
wherein the information on the contention-free RA resources for handover includes information on dedicated preamble resources and an identifier for the terminal.

7. The method of claim 5,
wherein, in case that the configuration information for BFR includes backoff time related information, values are identified by the terminal based on the backoff time related information,
wherein, in case that a contention-free RA procedure for BFR is not completed, a backoff time is selected by the terminal from the identified values, and
wherein the contention-free RA procedure for BFR is performed irrespective of the selected backoff time.

8. The method of claim 5,
wherein the information on the contention-free RA resources for BFR includes at least one pair of a synchronization signal block (SSB) and a corresponding preamble index,
wherein an SSB index of an SSB with a reception power above a threshold is identified among the at least one pair of the SSB index and the corresponding preamble index,
wherein a preamble index corresponding to the identified SSB index is identified, among the at least one pair of the SSB index and the corresponding preamble index, and
wherein the contention-free RA procedure comprises receiving, from the terminal, a preamble corresponding to the identified preamble index.

9. A terminal in a wireless communication system, comprising:
a transceiver configured to transmit and receive signals; and
a controller configured to:
receive, via the transceiver from a base station, a message including configuration information for handover, the configuration information for handover including information on contention-free random access (RA) resources for handover;
perform a contention-free RA procedure for handover based on the information on the contention-free RA resources for handover;
discard the information on the contention-free RA resources for handover upon completion of the contention-free RA procedure for handover;
receive, via the transceiver from the base station, a message including configuration information for beam failure recovery (BFR),
the configuration information for BFR including information on contention-free RA resources for BFR;
perform a contention-free RA procedure for BFR based on the information on the contention-free RA resources for BFR upon detecting a beam failure,
perform a contention-based RA procedure for the BFR in case that the message does not include the contention-free RA resources; and
not discard the information on the contention-free RA resources upon completion of the contention-free RA procedure for BFR.

10. The terminal of claim 9,
wherein the information on the contention-free RA resources for handover includes information on dedicated preamble resources and an identifier for the terminal.

11. The terminal of claim 9, wherein the controller is further configured to:
in case that the configuration information for BFR includes backoff time related information, identify values based on backoff time related information;
in case that a contention-free RA procedure for BFR is not completed, select a backoff time from the identified values; and
perform the contention-free RA procedure for BFR irrespective of the selected backoff time.

12. The terminal of claim 9,
wherein the information on the contention-free RA resources for BFR includes at least one pair of a synchronization signal block (SSB) and a corresponding preamble index, and
wherein the controller is configured to identify an SSB index of an SSB with a reception power above a threshold, among the at least one pair of the SSB index and the corresponding preamble index, identify a preamble index corresponding to the identified SSB index, among the at least one pair of the SSB index and the corresponding preamble index, and transmit, via the transceiver to the base station, a preamble corresponding to the identified preamble index.

13. A base station in a wireless communication system, comprising:
a transceiver configured to transmit and receive signals; and
a controller configured to:
transmit, via the transceiver to a terminal, a message including configuration information for handover, the configuration information for handover including information on contention-free random access (RA) resources for handover;
perform a contention-free RA procedure for handover with the terminal based on the information on the contention-free RA resources for handover;
transmit, via the transceiver to the terminal, a message including configuration information for beam failure recovery (BFR), the configuration information for BFR including information on contention-free RA resources for BFR; and
perform a contention-free RA procedure for BFR with the terminal based on information on the contention-free RA resources for BFR upon beam failure being detected by the terminal,
wherein the information on the contention-free RA resources for handover is discarded by the terminal upon completion of the contention-free RA procedure for handover, and
wherein the information on the contention-free RA resources are not discarded at the terminal upon completion of the contention-free RA procedure for BFR.

14. The base station of claim 13, wherein the information on the contention-free RA resources for handover includes information on dedicated preamble resources and an identifier for the terminal.

15. The base station of claim 13, wherein, in case that the configuration information includes backoff time related information, values are identified by the terminal based on the backoff time related information,
wherein, in case that a contention-free RA procedure for BFR is not completed, a backoff time is selected by the terminal from the identified values, and
wherein the contention-free RA procedure for BFR is performed irrespective of the selected backoff time.

16. The base station of claim 13,
wherein the information on the contention-free RA resources for BFR includes at least one pair of a synchronization signal block (SSB) and a corresponding preamble index,
wherein an SSB index of an SSB with a reception power above a threshold is identified among the at least one pair of the SSB index and the corresponding preamble index,
wherein a preamble index corresponding to the identified SSB index is identified, among the at least one pair of the SSB index and the corresponding preamble index, and
wherein the contention-free RA procedure comprises receiving, from the terminal, a preamble corresponding to the identified preamble index.

17. The method of claim 1, further comprising:
in case that the configuration information for BFR includes backoff time related information, identifying values based on the backoff time related information;
in case that the contention-free RA procedure for BFR is not completed, selecting a backoff time from the identified values; and
performing a contention-based RA procedure for BFR after the selected backoff time,
wherein the selected backoff time is 0.

18. The method of claim 5,
wherein, in case that the configuration information for BFR includes backoff time related information, values are identified by the terminal based on the backoff time related information,
wherein, in case that the contention-free RA procedure for BFR is not completed, a backoff time is selected by the terminal from the values,
wherein a contention-based RA procedure for BFR is performed after the selected backoff time, and
wherein the selected backoff time is 0.

19. The terminal of claim 9, wherein the controller is further configured to:
in case that the configuration information for BFR includes backoff time related information, identify values based on the backoff time related information;
in case that the contention-free RA procedure for BFR is not completed, select a backoff time from the identified values; and
perform the contention-based RA procedure for BFR after the selected backoff time,
wherein the selected backoff time is 0.

20. The base station of claim 13,
wherein, in case that the configuration information for BFR includes backoff time related information, values are identified by the terminal based on the backoff time related information,
wherein, in case that the contention-free RA procedure for BFR is not completed, a backoff time is selected by the terminal from the values,
wherein a contention-based RA procedure for BFR is performed after the selected backoff time, and
wherein the selected backoff time is 0.

* * * * *